US012686402B2

(12) United States Patent
Tang et al.

(10) Patent No.: US 12,686,402 B2
(45) Date of Patent: Jul. 21, 2026

(54) INFORMATION PROCESSING DEVICE, INFORMATION PROCESSING SYSTEM, AND INFORMATION PROCESSING METHOD

(71) Applicant: SONY GROUP CORPORATION, Tokyo (JP)

(72) Inventors: Yifu Tang, Tokyo (JP); Shinichiro Tsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 192 days.

(21) Appl. No.: 18/253,733

(22) PCT Filed: Oct. 20, 2021

(86) PCT No.: PCT/JP2021/038812
§ 371 (c)(1),
(2) Date: May 19, 2023

(87) PCT Pub. No.: WO2022/113584
PCT Pub. Date: Jun. 2, 2022

(65) Prior Publication Data
US 2023/0406336 A1 Dec. 21, 2023

(30) Foreign Application Priority Data
Nov. 27, 2020 (JP) ................................. 2020-196670

(51) Int. Cl.
B60W 50/14 (2020.01)
B60W 40/08 (2012.01)
(52) U.S. Cl.
CPC ............ B60W 50/14 (2013.01); B60W 40/08 (2013.01); *B60W 2050/143* (2013.01); *B60W 2050/146* (2013.01); *B60W 2556/45* (2020.02)

(58) Field of Classification Search
CPC .. B60W 60/00; B60W 60/001; B60W 60/005; B60W 50/14; B60W 50/12;
(Continued)

(56) References Cited

U.S. PATENT DOCUMENTS

2017/0015331 A1 1/2017 Laur
2017/0313314 A1* 11/2017 Sen ........................ B60W 40/08
(Continued)

FOREIGN PATENT DOCUMENTS

| JP | 6330903 | B2 | 5/2018 | |
| JP | 2019-018842 | A | 2/2019 | |
| WO | WO-2020067009 | A1 * | 4/2020 | ............. G01C 21/26 |

OTHER PUBLICATIONS

International Search Report and Written Opinion of PCT Application No. PCT/JP2021/038812, issued on Nov. 30, 2021, 09 pages of ISRWO.

*Primary Examiner* — Benyam Haile
(74) *Attorney, Agent, or Firm* — CHIP LAW GROUP

(57) ABSTRACT

Provided is a control unit that acquires an automated driving level-corresponding allowable activity list in which the automated driving level and the allowable activity are associated with each other from an external server or a storage unit, refers to the automated driving level-corresponding allowable activity list, acquires the allowable activity corresponding to the automated driving level, and notifies the driver of the acquired allowable activity. Furthermore, in a case where the automated driving level of the mobile device is changed, a difference between the allowable activities according to the change of the automated driving level is analyzed, and in a case where there is a difference, notification of difference information is provided.

18 Claims, 31 Drawing Sheets

(58) Field of Classification Search
CPC .......... B60W 50/082; B60W 2050/146; B60K
2360/172; G05D 1/0061
See application file for complete search history.

(56) References Cited

U.S. PATENT DOCUMENTS

| | | | |
|---|---|---|---|
| 2018/0113474 A1* | 4/2018 | Koda | .................. G05D 1/0274 |
| 2020/0139992 A1 | 5/2020 | Oba | |
| 2021/0206394 A1* | 7/2021 | Suyama | ................ G01C 21/26 |

* cited by examiner

FIG. 2

| LEVEL | DRIVING STATE |
|---|---|
| LEVEL 0 | DRIVER EXECUTES ALL DRIVING OPERATIONS (= MANUAL DRIVING) |
| LEVEL 1 | AUTOMATED DRIVING SYSTEM EXECUTES EITHER ACCELERATOR OPERATION AND BRAKE OPERATION OR STEERING WHEEL OPERATION |
| LEVEL 2 | AUTOMATED DRIVING SYSTEM EXECUTES ACCELERATOR OPERATION, BRAKE OPERATION, AND STEERING WHEEL OPERATION |
| LEVEL 3 | AUTOMATED DRIVING SYSTEM EXECUTES ALL AUTOMATED DRIVING UNDER PRESCRIBED CONDITIONS (FOR EXAMPLE, PREDETERMINED EXPRESSWAY SECTION AND THE LIKE). HOWEVER, IT IS NECESSARY FOR DRIVER TO CONSTANTLY MONITOR AND RETURN TO MANUAL DRIVING IN EMERGENCY |
| LEVEL 4 | AUTOMATED DRIVING SYSTEM EXECUTES ALL AUTOMATED DRIVING UNDER PRESCRIBED CONDITIONS |
| LEVEL 5 | AUTOMATED DRIVING SYSTEM EXECUTES ALL AUTOMATED DRIVING WITHOUT CONDITION |

*FIG. 8*

| (a) AUTOMATED DRIVING LEVEL | (b) ACTIVITIES ALLOWED FOR DRIVER |
|---|---|
| LEVEL 0 (MANUAL DRIVING) | NONE |
| LEVEL 1 | NONE |
| LEVEL 2 | PHONE CALL |
| LEVEL 3 | (1) MEAL, (2) PHONE CALL, (3) CHECKING AND REPLYING TO E-MAIL, (4) READING BOOK, AND (5) PLAYING GAME |
| LEVEL 4 | (1) MEAL, (2) PHONE CALL, (3) CHECKING AND REPLYING TO E-MAIL, (4) READING BOOK, (5) PLAYING GAME, (6) VIDEO CALL, AND (7) NAP |
| LEVEL 5 (AUTONOMOUS DRIVING) | (1) MEAL, (2) PHONE CALL, (3) CHECKING AND REPLYING TO E-MAIL, (4) READING BOOK, (5) PLAYING GAME, (6) VIDEO CALL, (7) NAP, AND (8) ALL OTHER ACTIVITIES |

Figure 12:
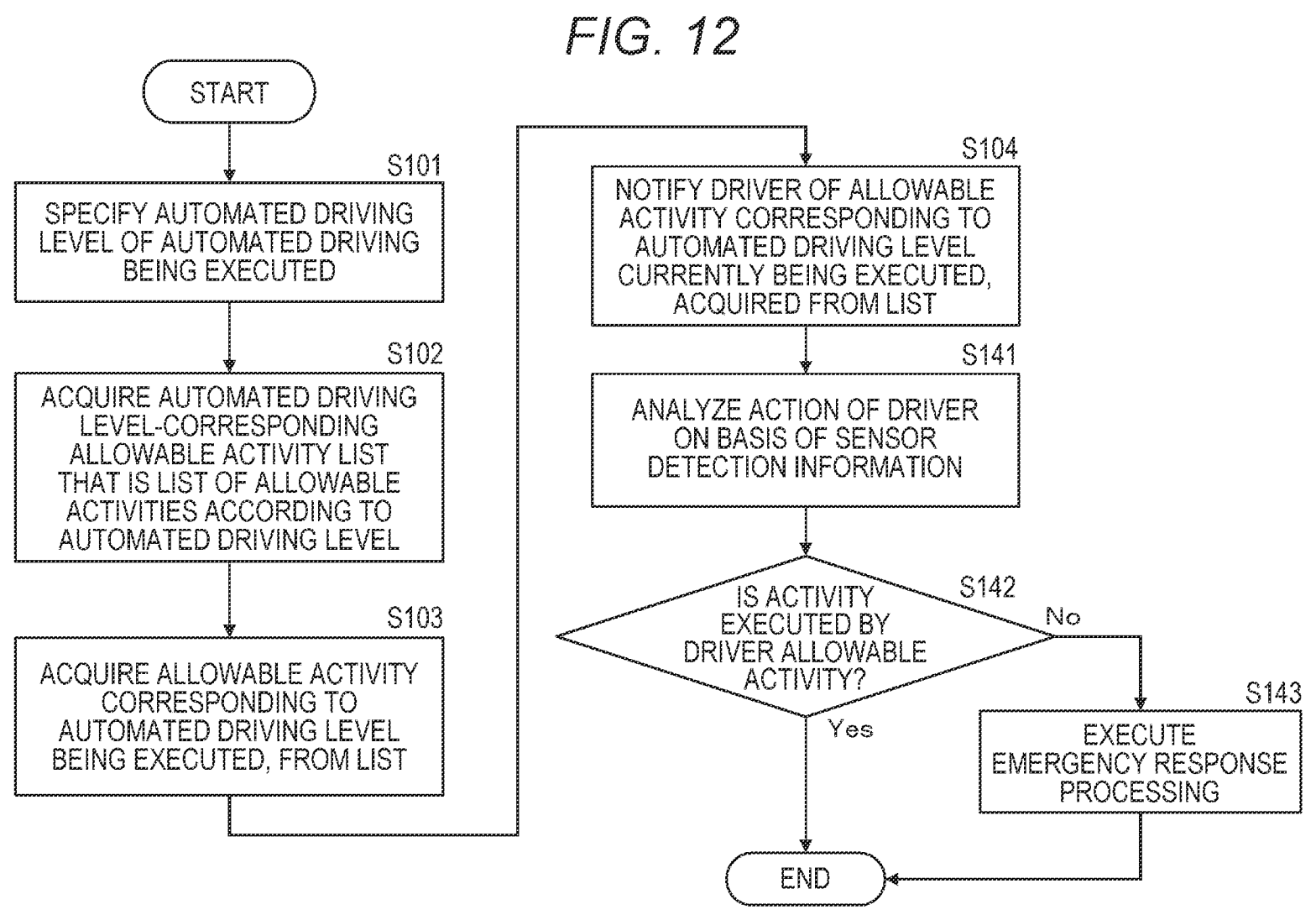

START

S101
SPECIFY AUTOMATED DRIVING LEVEL OF AUTOMATED DRIVING BEING EXECUTED

S102
ACQUIRE AUTOMATED DRIVING LEVEL-CORRESPONDING ALLOWABLE ACTIVITY LIST THAT IS LIST OF ALLOWABLE ACTIVITIES ACCORDING TO AUTOMATED DRIVING LEVEL

S103
ACQUIRE ALLOWABLE ACTIVITY CORRESPONDING TO AUTOMATED DRIVING LEVEL BEING EXECUTED, FROM LIST

S104
NOTIFY DRIVER OF ALLOWABLE ACTIVITY CORRESPONDING TO AUTOMATED DRIVING LEVEL CURRENTLY BEING EXECUTED, ACQUIRED FROM LIST

S141
ANALYZE ACTION OF DRIVER ON BASIS OF SENSOR DETECTION INFORMATION

S142
IS ACTIVITY EXECUTED BY DRIVER ALLOWABLE ACTIVITY?

No

S143
EXECUTE EMERGENCY RESPONSE PROCESSING

Yes

END

Figure 14:
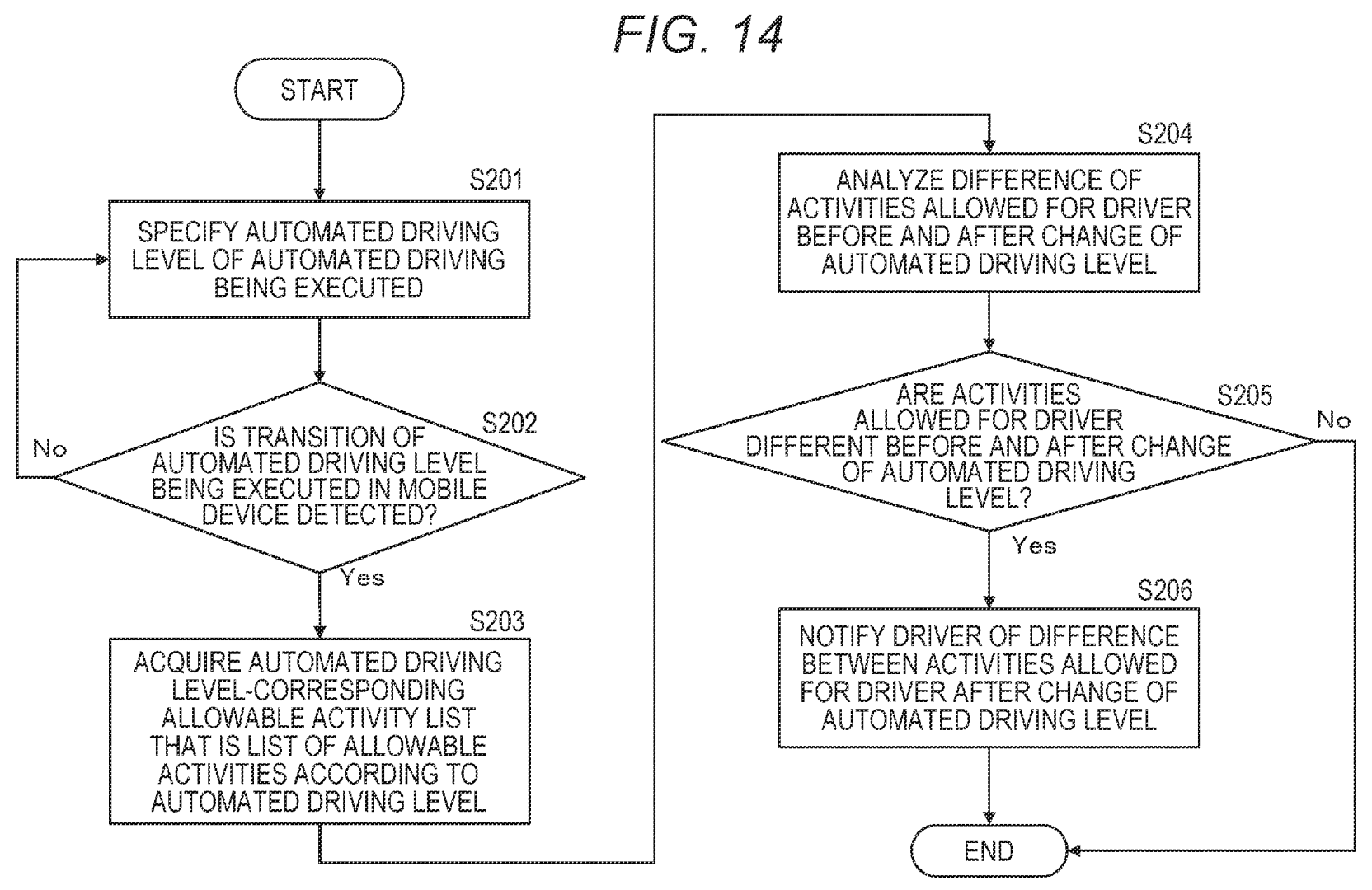

START

S201
SPECIFY AUTOMATED DRIVING LEVEL OF AUTOMATED DRIVING BEING EXECUTED

S202
IS TRANSITION OF AUTOMATED DRIVING LEVEL BEING EXECUTED IN MOBILE DEVICE DETECTED?

No

Yes

S203
ACQUIRE AUTOMATED DRIVING LEVEL-CORRESPONDING ALLOWABLE ACTIVITY LIST THAT IS LIST OF ALLOWABLE ACTIVITIES ACCORDING TO AUTOMATED DRIVING LEVEL

S204
ANALYZE DIFFERENCE OF ACTIVITIES ALLOWED FOR DRIVER BEFORE AND AFTER CHANGE OF AUTOMATED DRIVING LEVEL

S205
ARE ACTIVITIES ALLOWED FOR DRIVER DIFFERENT BEFORE AND AFTER CHANGE OF AUTOMATED DRIVING LEVEL?

No

Yes

S206
NOTIFY DRIVER OF DIFFERENCE BETWEEN ACTIVITIES ALLOWED FOR DRIVER AFTER CHANGE OF AUTOMATED DRIVING LEVEL

END

FIG. 16
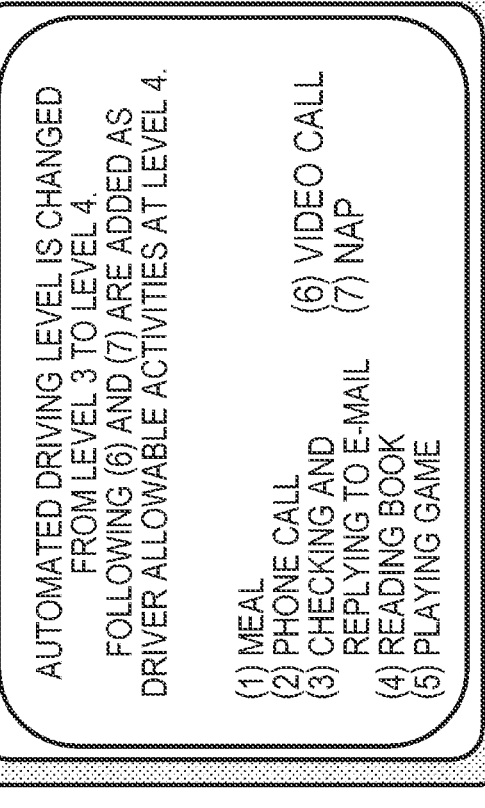
AUTOMATED DRIVING LEVEL IS CHANGED
FROM LEVEL 3 TO LEVEL 4.
FOLLOWING (6) AND (7) ARE ADDED AS
DRIVER ALLOWABLE ACTIVITIES AT LEVEL 4.
(1) MEAL
(2) PHONE CALL
(3) CHECKING AND
    REPLYING TO E-MAIL
(4) READING BOOK
(5) PLAYING GAME
(6) VIDEO CALL
(7) NAP
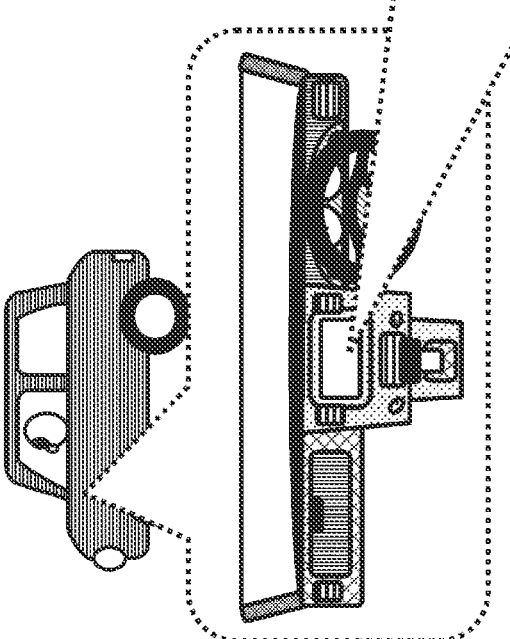

AUTOMATED DRIVING LEVEL IS CHANGED
FROM LEVEL 3 TO LEVEL 4.
FOLLOWING (1) AND (2) ARE ADDED AS
DRIVER ALLOWABLE ACTIVITIES AT LEVEL 4.

(1) VIDEO CALL
(2) NAP (3) MEAL
(4) PHONE CALL
(5) CHECKING AND
    REPLYING TO E-MAIL
(6) READING BOOK
(7) PLAYING GAME

*FIG. 20*
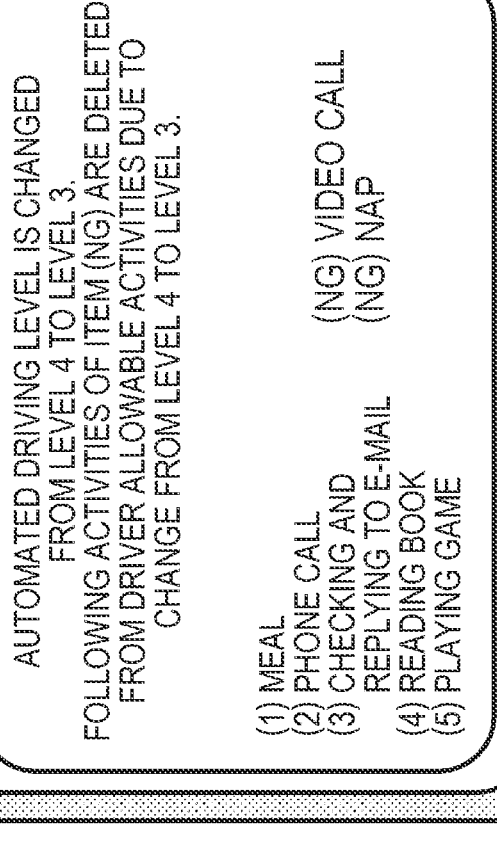
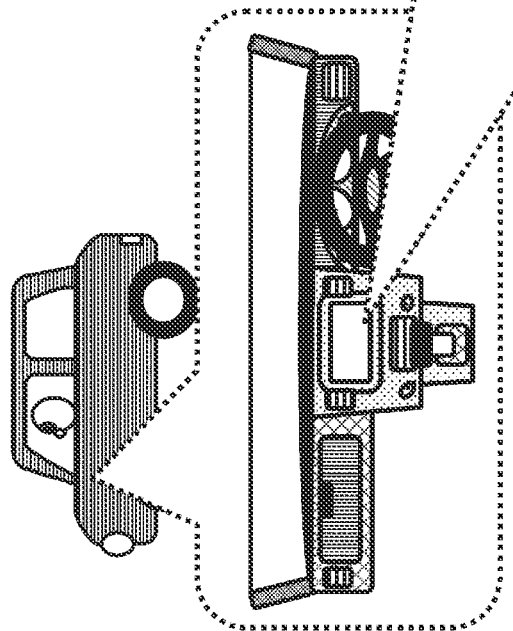
AUTOMATED DRIVING LEVEL IS CHANGED
FROM LEVEL 4 TO LEVEL 3.
FOLLOWING ACTIVITIES OF ITEM (NG) ARE DELETED
FROM DRIVER ALLOWABLE ACTIVITIES DUE TO
CHANGE FROM LEVEL 4 TO LEVEL 3.
(1) MEAL
(2) PHONE CALL
(3) CHECKING AND
    REPLYING TO E-MAIL
(4) READING BOOK
(5) PLAYING GAME
(NG) VIDEO CALL
(NG) NAP FIG. 22
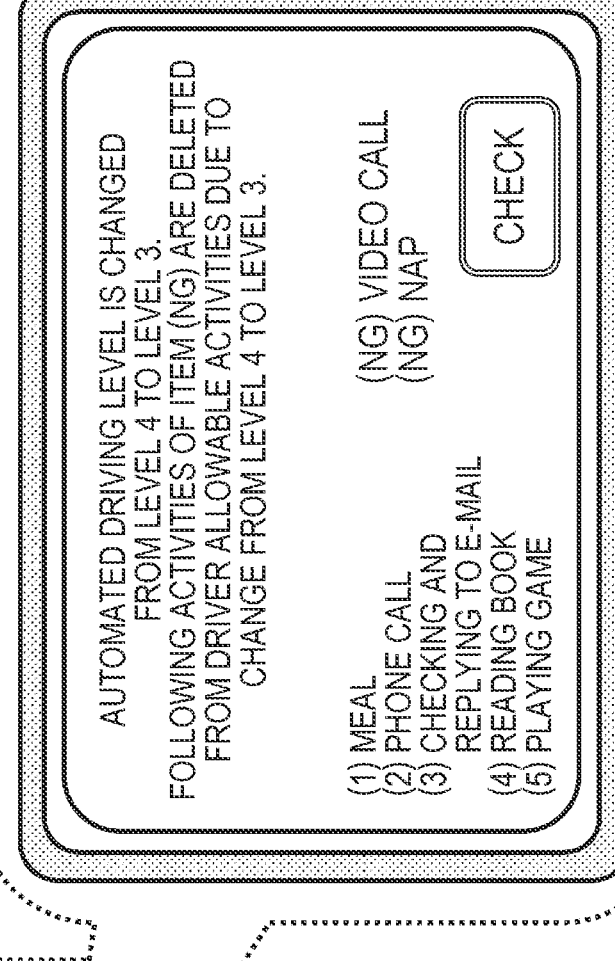
AUTOMATED DRIVING LEVEL IS CHANGED
FROM LEVEL 4 TO LEVEL 3.
FOLLOWING ACTIVITIES OF ITEM (NG) ARE DELETED
FROM DRIVER ALLOWABLE ACTIVITIES DUE TO
CHANGE FROM LEVEL 4 TO LEVEL 3.
(1) MEAL
(2) PHONE CALL
(3) CHECKING AND
    REPLYING TO E-MAIL
(4) READING BOOK
(5) PLAYING GAME
(NG) VIDEO CALL
(NG) NAP
CHECK
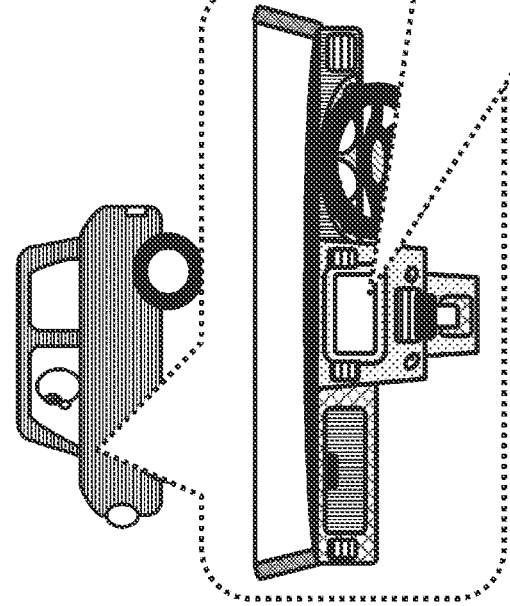

FIG. 28
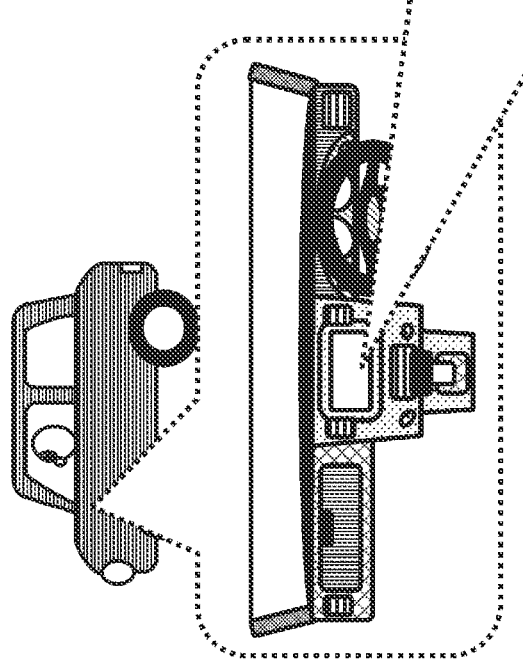
CURRENT AUTOMATED DRIVING LEVEL IS LEVEL 4, AND DURATION OF LEVEL 4 IN FUTURE IS SCHEDULED TO BE ABOUT 2 HOURS.
UNDER CONDITIONS OF LEVEL 4 AND DURATION = 2 HOURS, ACTIVITIES ALLOWED FOR DRIVER ARE AS FOLLOWS:
(1) MEAL
(2) PHONE CALL
(3) CHECKING AND REPLYING TO E-MAIL
(4) READING BOOK
(5) PLAYING GAME
(6) VIDEO CALL
(7) NAP CURRENT AUTOMATED DRIVING LEVEL IS LEVEL 4, AND DURATION OF LEVEL 4 IN FUTURE IS SCHEDULED TO BE ABOUT 1 HOUR.

UNDER CONDITIONS OF LEVEL 4 AND DURATION = 1 HOUR, FOLLOWING (1) TO (6) ARE ACTIVITIES ALLOWED FOR DRIVER. (NG) IS ALLOWED, BUT IS NOT RECOMMENDED.

(1) MEAL
(2) PHONE CALL
(3) CHECKING AND REPLYING TO E-MAIL
(4) READING BOOK
(5) PLAYING GAME
(6) VIDEO CALL
(NG) NAP

*FIG. 30*
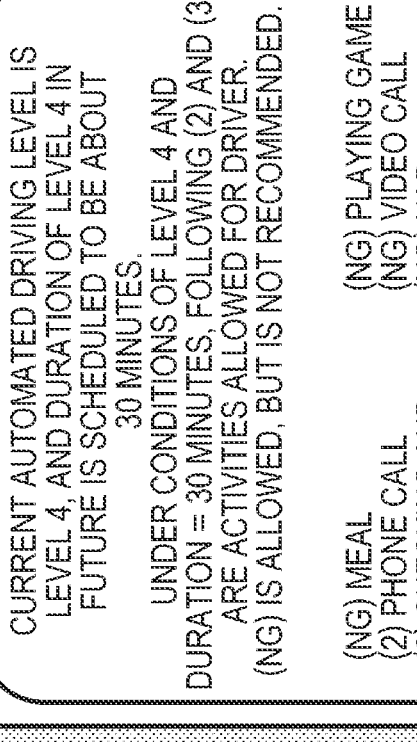
CURRENT AUTOMATED DRIVING LEVEL IS LEVEL 4, AND DURATION OF LEVEL 4 IN FUTURE IS SCHEDULED TO BE ABOUT 30 MINUTES.
UNDER CONDITIONS OF LEVEL 4 AND DURATION = 30 MINUTES, FOLLOWING (2) AND (3) ARE ACTIVITIES ALLOWED FOR DRIVER. (NG) IS ALLOWED, BUT IS NOT RECOMMENDED.
(NG) MEAL
(2) PHONE CALL
(3) CHECKING AND
    REPLYING TO E-MAIL
(NG) READING BOOK
(NG) PLAYING GAME
(NG) VIDEO CALL
(NG) NAP
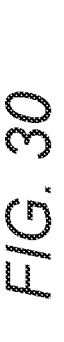
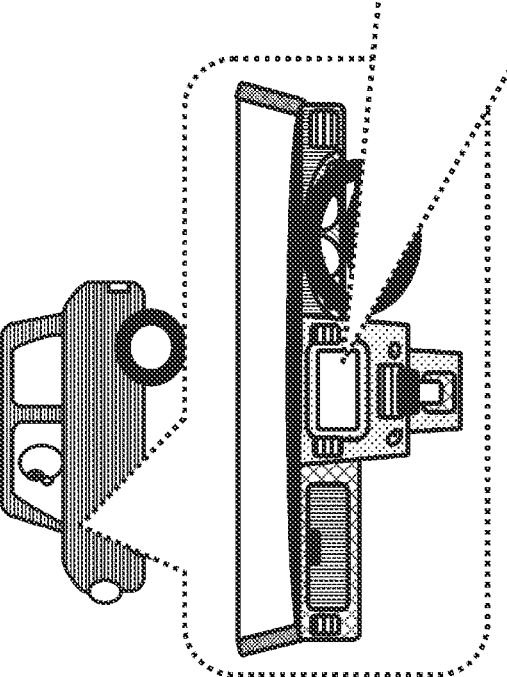

1

INFORMATION PROCESSING DEVICE, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2021/038812 filed on Oct. 20, 2021, which claims priority benefit of Japanese Patent Application No. JP 2020-196670 filed in the Japan Patent Office on Nov. 27, 2020. Each of the above-referenced applications is hereby incorporated herein by reference in its entirety.

TECHNICAL FIELD

The present disclosure relates to an information processing device, an information processing system, and an information processing method. In more detail, the present disclosure relates to an information processing device, an information processing system, and an information processing method which enable safe automated traveling by notifying a driver of activities permitted for the driver of a vehicle during automated driving.

BACKGROUND ART

In recent years, various sensors are mounted on vehicles, and functions for assisting the driving are being introduced. Furthermore, technology development relating to the automated driving is also actively performed.

The automated driving technology is a technology that enables automated traveling on a road using various sensors such as a position detection unit provided in a vehicle (automobile), and is predicted to rapidly spread in the future.

For example, Institute of Electrical and Electronics Engineers (IEEE), which is an academic association of electrical and information engineering, has proposed a communication system for vehicle-to-vehicle communication called Dedicated Short Range Communication (DSRC) based on the communication standard IEEE 802.11p.

Moreover, a standard specification of Celler-V2X (C-V2X), which is a communication standard based on Long Term Evolution (LTE) Device to Device (D2D) communication, has been formulated as Release 14 (Rel. 14) in Third Generation Partnership Project (3GPP), which is a formulation organization of a standard specification of a third generation (3G) mobile communication system.

Celler-V2X (C-V2X) is a communication standard including vehicle-to-vehicle communication (V2V), vehicle-to-infrastructure communication (V2I), and the like.

Furthermore, introduction of an advanced safe driving system called advanced driver-assistance systems (ADAS) by vehicle-to-vehicle communication (V2V) and sensor fusion utilizing various sensors mounted on vehicles is starting. Moreover, development of autonomous driving which does not involve human operation and utilizes artificial intelligence (AI), machine learning (ML), or deep learning (DL) is also in progress.

Note that Society of Automotive Engineers (SAE), which is an automotive technical committee in the United States of America, defines six levels of automated driving levels from level 0 (manual driving) to level 5 (autonomous driving) as levels of automated driving.

Each country of the world including Japan adopts this automated driving level definition of SAE.

For example, automobile manufacturers in various countries around the world often specify which level of automated driving of the automated driving levels 0 to 5 is possible for each vehicle.

Furthermore, also in the traffic rules of each country, measures are taken such as establishing a rule that allows automated driving at level 3, for example, in a part of an expressway.

For example, the automated driving level 5 is autonomous driving, and the driver does not need to perform any driving operation or monitoring operation, and can perform any activity. For example, the user can perform his or her favorite activities such as a nap, reading a book, and playing a game.

However, for example, the automated driving level 3 is defined as a level at which the driver needs to constantly monitor and return to manual driving in an emergency, and the driver can only perform an activity while monitoring the front. For example, a nap or the like is not allowed.

At present, automated driving is in a development stage, and it is considered that it takes time until the automated driving level 5, which is 100% autonomous driving, can be performed in all road sections. For a while, it is predicted that processing of traveling while switching the automated driving levels according to the road section and the situation is required.

For example, on a straight road with a sufficient road width such as an expressway, traveling at the automated driving levels 4 and 5 is allowed, but it is predicted that it is necessary to switch to a level at which traveling is performed under the monitoring or operation of the driver by switching to the automated driving levels 0 to 3 in a case where the vehicle leaves the expressway and stops at a desired position in a parking lot or in a mountain road or the like with a narrow road width.

Note that examples of the technologies disclosed for the automated driving technology include, for example, Patent Document 1 (Japanese Patent Application Laid-Open No. 2020-029238), Patent Document 2 (Japanese Patent Application Laid-Open No. 2019-018842), Patent Document 3 (Japanese Patent Application Laid-Open No. 2019-185246), and the like.

Patent Document 1 discloses a technology for changing a driving mode according to a traveling environment during traveling. Patent Document 2 discloses a configuration for detecting a design defect of a driver assistance system. Furthermore, Patent Document 3 describes measures for a failure of an automated driving control device.

As described above, Society of Automotive Engineers (SAE), which is an automotive technical committee in the United States of America, defines six levels of automated driving levels from level 0 (manual driving) to level 5 (autonomous driving) as levels of automated driving, and at present, it is predicted that processing of traveling while switching the automated driving levels according to the road section and the situation is required As described above, the activities allowed for the driver greatly differ depending on the automated driving level. For example, the automated driving level 5 is autonomous driving, and the driver does not need to perform any driving operation or monitoring operation, and can perform any activity. For example, the user can perform his or her favorite activities such as a nap, reading a book, and playing a game.

However, for example, the automated driving level 3 is defined as a level at which the driver needs to constantly monitor and return to manual driving in an emergency, and the driver can only perform an activity while monitoring the front. For example, a nap or the like is not allowed.

In this manner, the activities allowed for the driver greatly differ depending on the automated driving level, but there is a problem that there is no way for the driver to check what activity is allowed depending on each level.

CITATION LIST

Patent Document

Patent Document 1: Japanese Patent Application Laid-Open No. 2020-029238

Patent Document 2: Japanese Patent Application Laid-Open No. 2019-018842

Patent Document 3: Japanese Patent Application Laid-Open No. 2019-185246

SUMMARY OF THE INVENTION

Problems to be Solved by the Invention

In a manual driving type vehicle in the related art, the driver is required to concentrate on a driving operation. Accordingly, the activity allowed for the driver of the manual driving type vehicle other than the driving operation is, for example, about conversation, and other activities are not allowed.

However, in an automated driving vehicle, since the driver is released from the driving operation, it is expected that the activities allowed for the driver are increased.

At the current point of time, a vehicle that realizes autonomous driving (for example, the automated driving level 5 defined by SAE) in which a driver does not need to be involved in the driving operation at all has not been put into practical use, but vehicles corresponding to various levels of automated driving such as the automated driving level 3 have appeared.

There is a possibility that vehicles corresponding to various levels of automated driving coexist on the public road before all the vehicles are replaced with the automated driving level 5. At a stage where the various automated driving levels are mixed and put into practical use, it is considered that the activities allowed for each level of the automated driving are different. That is, it is necessary to define allowable activities and non-allowable activities for the driver depending on the automated driving level.

Moreover, in a case where the level of the automated driving is switched, the allowable activity and the non-allowable activity are also changed.

Accordingly, in a case where the level of the automated driving is switched, it is necessary to notify the driver of the change in the allowable activity, and maintain the safety in the driving.

For example, the present disclosure has been made in view of the above-described problems, and an object thereof is to provide an information processing device, an information processing system, and an information processing method which enable safe automated traveling by notifying a driver of activities permitted for the driver of a vehicle during automated driving.

Solutions to Problems

A first aspect of the present disclosure is an information processing device including a control unit that acquires an automated driving level of automated driving being executed by a mobile device, and notifies a driver of an allowable activity for the driver according to the acquired automated driving level.

Moreover, a second aspect of the present disclosure is an information processing system including: a mobile device; and an external device, in which the mobile device acquires an automated driving level of automated driving being executed by the mobile device, the external device provides an automated driving level-corresponding allowable activity list in which an automated driving level and an allowable activity are associated with each other, to the mobile device, and the mobile device refers to the automated driving level-corresponding allowable activity list, acquires the allowable activity corresponding to the automated driving level being executed by the mobile device, and notifies the driver of the acquired allowable activity.

Moreover, a third aspect of the present disclosure is an information processing method executed in an information processing device, in which a control unit acquires an automated driving level of automated driving being executed by a mobile device, and notifies a driver of an allowable activity for the driver according to the acquired automated driving level.

Moreover, a fourth aspect of the present disclosure is a program causing an information processing device to execute information processing, the program causing a control unit to:

acquire an automated driving level of automated driving being executed by a mobile device, and notify a driver of an allowable activity for the driver according to the acquired automated driving level.

Note that, the program of the present disclosure is, for example, a program that can be provided by a storage medium or a communication medium provided in a computer-readable format to an information processing device or a computer system that can execute various program codes. By providing such a program in a computer-readable format, processing according to the program is realized on the information processing device or the computer system.

Other objects, features, and advantages of the present disclosure will be apparent from a more detailed description based on the embodiments of the present disclosure as described later and the accompanying drawings. Note that, in the present specification, the system is a logical set configuration of a plurality of devices, and is not limited to a system in which the devices of the respective configurations are in the same housing.

According to the configuration of one embodiment of the present disclosure, a configuration for notifying the driver of the allowable activity for the driver according to the automated driving level is realized.

Specifically, for example, the automated driving level of the automated driving being executed by the mobile device is acquired, and the driver is notified of the allowable activity for the driver according to the acquired automated driving level. The control unit acquires the automated driving level-corresponding allowable activity list in which the automated driving level and the allowable activity are associated with each other from an external server or the storage unit, refers to the automated driving level-corresponding allowable activity list, acquires the allowable activity corresponding to the automated driving level, and notifies the driver of the acquired allowable activity. Furthermore, in a case where the automated driving level of the mobile device is changed, a difference between the allowable activities according to the change of the automated driving level is analyzed, and in a case where there is a difference, notification of difference information is provided.

With the present configuration, a configuration for notifying the driver of the allowable activity for the driver according to the automated driving level is realized.

Note that, the effects described in the specification are merely examples and are not limited, and may have additional effects.

BRIEF DESCRIPTION OF DRAWINGS

FIG. 2 is a diagram for describing automated driving levels.

FIG. 8 is a diagram for describing an example of an automated driving level-corresponding allowable activity list including correspondence data of automated driving levels and activities allowable for a driver who is a user.

FIG. 10 is a diagram illustrating a flowchart for describing a processing sequence executed by an information processing device of the present disclosure.

FIG. 12 is a diagram illustrating a flowchart for describing a processing sequence executed by an information processing device of the present disclosure.

FIG. 13 is a diagram for describing a configuration example of a sensor unit in a control unit of an information processing device of the present disclosure.

FIG. 14 is a diagram illustrating a flowchart for describing a processing sequence executed by an information processing device of the present disclosure.

FIG. 16 is a diagram for describing an example of display data output by an information processing device of the present disclosure.

FIG. 20 is a diagram for describing an example of display data output by an information processing device of the present disclosure.

FIG. 22 is a diagram for describing an example of display data output by an information processing device of the present disclosure.

FIG. 28 is a diagram for describing an example of display data output by an information processing device of the present disclosure.

FIG. 30 is a diagram for describing an example of display data output by an information processing device of the present disclosure.

MODE FOR CARRYING OUT THE INVENTION

Figure 1:
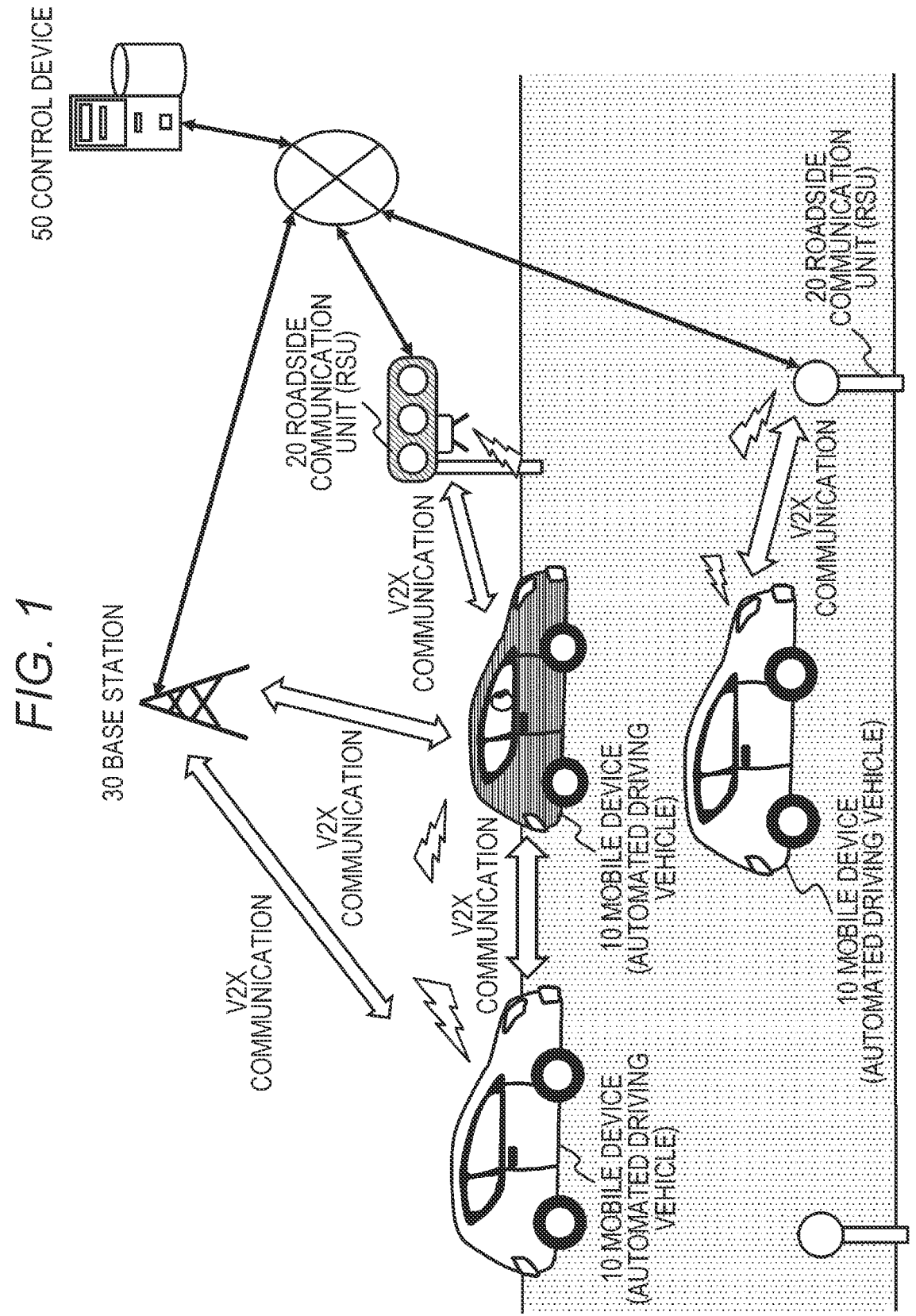
FIG. 1 is a diagram for describing a configuration example of an information processing system of the present disclosure.

Hereinafter, an information processing device, an information processing system, and an information processing method of the present disclosure will be described in detail with reference to the drawings. Note that, the description will be given according to the following items.

1. Regarding outline of processing and configuration example of information processing system of present disclosure
2. Regarding configuration example of information processing device in mobile device of present disclosure
3. Regarding a basic sequence of processing executed by information processing device of present disclosure 4. Regarding processing sequence of analyzing check state of driver for notification of allowable activity and performing emergency response in case where notification is not checked 5. Regarding processing sequence of monitoring action of driver after notification of allowable activity and performing emergency response in case where driver is executing non-allowable activity 6. Regarding processing sequence of detecting transition of automated driving level and executing change notification of allowable activity 7. Regarding processing sequence of analyzing check state of driver for difference notification of allowable activity associated with transition of automated driving level and performing emergency response in case where notification is not checked 8. Regarding processing sequence of monitoring action of driver after difference notification of allowable activity associated with transition of automated driving level and performing emergency response in case where driver is executing non-allowable activity 9. Regarding other processing examples executed by information processing device of present disclosure 9-a. (Processing example a) Processing example of selecting and providing notification of allowable activity according to user's request 9-b. (Processing example b) Processing example of selecting and providing notification of allowable activity in consideration of duration of automated driving level 10. Regarding hardware configuration example of information processing device of present disclosure 11. Summary of configuration of present disclosure

[1. Regarding Outline of Processing and Configuration Example of Information Processing System of Present Disclosure]

The outline of processing and a configuration example of an information processing system of the present disclosure will be described with reference to FIG. 1.

FIG. 1 is a diagram illustrating a configuration example of the information processing system of the present disclosure.

FIG. 1 illustrates a mobile device (automated driving vehicle) 10 that travels on a road, a roadside communication unit (roadside unit: RSU) 20 as a road infrastructure (road facility), a base station 30, and a control device 50.

For example, the control device 50 is a device constituting a core network, and performs control and management necessary for communication between the mobile device (automated driving vehicle) 10 and the base station 30 or communication between the mobile device (automated driving vehicle) 10 and the roadside communication unit (RSU) 20.

The base station 30 or the roadside communication unit (RSU) 20 provides information relating to traffic in the area to the mobile device (automated driving vehicle) 10. Here, the information relating to traffic may be all of high-precision three-dimensional map information called a dynamic map, or some information constituting the dynamic map, for example, dynamic information, semi-dynamic information, semi-static information, or static information. For example, the roadside communication unit (RSU) 20 is installed in a traffic light, a street light, or the like.

Furthermore, the base station 30 or the roadside communication unit (RSU) 20 receives a V2X message transmitted from the mobile device (automated driving vehicle) 10. Here, for example, the V2X message is a message called Decentralized Environmental Notification Message (DENM), Cooperative Awareness Messages (CAM), or Basic Safety Message (BSM).

The control device 50 generates dynamic information or semi-dynamic information constituting, for example, the dynamic map by utilizing the information included in the V2X message acquired from a plurality of mobile devices (automated driving vehicles) 10.

Furthermore, the base station 30 or the roadside communication unit (RSU) 20 is equipped with a camera module such as an image sensor, and acquires surrounding image information. The image information acquired by the camera module is provided to the mobile device (automated driving vehicle) 10 via V2X communication.

Moreover, the base station 30 or the roadside communication unit (RSU) 20 may generate dynamic information, semi-dynamic information, or a V2X message such as DENM, CAM, or BSM constituting a dynamic map from an output obtained by inputting the image information acquired by the camera module to artificial intelligence (AI), for example, machine learning or a neural network model generated by deep learning. Note that the base station 30 or the roadside communication unit (RSU) 20 may cause an external device such as a cloud server to execute processing related to the AI.

Moreover, the mobile device (automated driving vehicle) 10 performs vehicle-to-vehicle communication with another mobile device (automated driving vehicle) 10 via V2X communication. In the vehicle-to-vehicle communication, in addition to the V2X message such as DENM, CAM, or BSM, the information acquired by the sensor mounted on the mobile device (automated driving vehicle) for example, information related to speed, acceleration, angular velocity, position, image, and the like are shared.

The mobile device (automated driving vehicle) 10 is an automated driving vehicle.

Note that, as described above, Society of Automotive Engineers (SAE), which is an automotive technical committee in the United States of America, defines six levels of automated driving levels from level 0 (manual driving) to level 5 (autonomous driving) as levels of automated driving. Many countries around the world including Japan adopt this automated driving level definition of SAE.

The definition of the automated driving levels of SAE will be described with reference to FIG. 2.

SAE defines six levels of automated driving levels from level 0 (manual driving) to level 5 (autonomous driving) illustrated in FIG. 2 as levels of automated driving.

The definition (driving state) of each automated driving level is as follows.

Level 0=driver executes all driving operations (=manual driving)

Level 1=automated driving system executes either an accelerator operation and a brake operation or a steering wheel operation Level 2=automated driving system executes an accelerator operation, a brake operation, and a steering wheel operation Level 3=automated driving system executes all automated driving under prescribed conditions (for example, predetermined expressway section and the like). However, it is necessary for the driver to constantly monitor and return to manual driving in an emergency.

Level 4=automated driving system executes all automated driving under prescribed conditions Level 5=automated driving system executes all automated driving without condition SAE defines six levels of automated driving levels from level 0 (manual driving) to level 5 (autonomous driving).

Note that the prescribed condition at level 3 or level 4 is, for example, a condition for traveling at a specific place. Specifically, the condition is, for example, traveling on an expressway, in an area with relatively small traffic volume and good visibility such as a depopulated area, or in an area with a relatively simple traveling environment such as a university campus or an airport facility, or the like.

The mobile device (automated driving vehicle) 10 illustrated in FIG. 1 is a vehicle capable of switching at least a plurality of levels of automated driving levels which are the definition levels of SAE. For example, such a vehicle is a vehicle capable of switching from level 0 (manual driving) to level 2 (partial automated driving), a vehicle capable of switching from level 0 (manual driving) to level 4 (semi-automated driving), or a vehicle capable of switching from level 0 (manual driving) to level 5 (autonomous driving).

Returning to FIG. 1, the description of the configuration of the information processing system of the present disclosure will be continued.

The mobile device 10 can perform communication with mobile devices 10, and communication with the roadside communication unit (roadside unit: RSU) 20.

Moreover, the mobile device 10 and the roadside communication unit (RSU) 20 can communicate with the control device 50 via a communication network such as the base station 30.

As described above, for example, the control device 50 is a device constituting a core network, and performs control and management necessary for communication between the mobile device (automated driving vehicle) 10 and the base station 30 or communication between the mobile device (automated driving vehicle) 10 and the roadside communication unit (RSU) 20.

For example, the control device 50 acquires, from the mobile device 10, various kinds of data such as setting information of an automated driving level, data indicating a driving situation, or sensor detection information, and control information of a power system, a braking device, and a steering device mounted on the mobile device 10, and performs management related to the movement, that is, traveling of the mobile device 10. Note that the management related to traveling is management or the like for automated driving control in a driving assistance processing unit in an information processing device mounted on the mobile device 10. Here, the control device 50 may be an external device connected to a network function (NF) that constitutes the core network via a service-based interface.

Moreover, the control device 50 performs data processing such as machine learning (ML) or deep learning (DL), and as a result, generates a learning model such as a neural network model. For example, a learning model for each automated driving level is generated and managed.

Moreover, the control device 50 provides map information to the mobile device 10. Note that a map information provision server different from the control device 50 may be used to provide map information from the map information provision server to the mobile device 10.

For example, the control device 50 and the map information provision server generate a so-called local dynamic map (LDM) that constantly updates traveling map information of the road on which the vehicle travels, at high density, and provide the generated local dynamic map to the mobile device 10.

The outline of the local dynamic map (LDM) will be described with reference to FIG. 3. There is a local dynamic map (LDM) as one of pieces of information necessary for performing the automated driving. Here, the LDM is, for example, high-definition three-dimensional map information.

Figure 3:
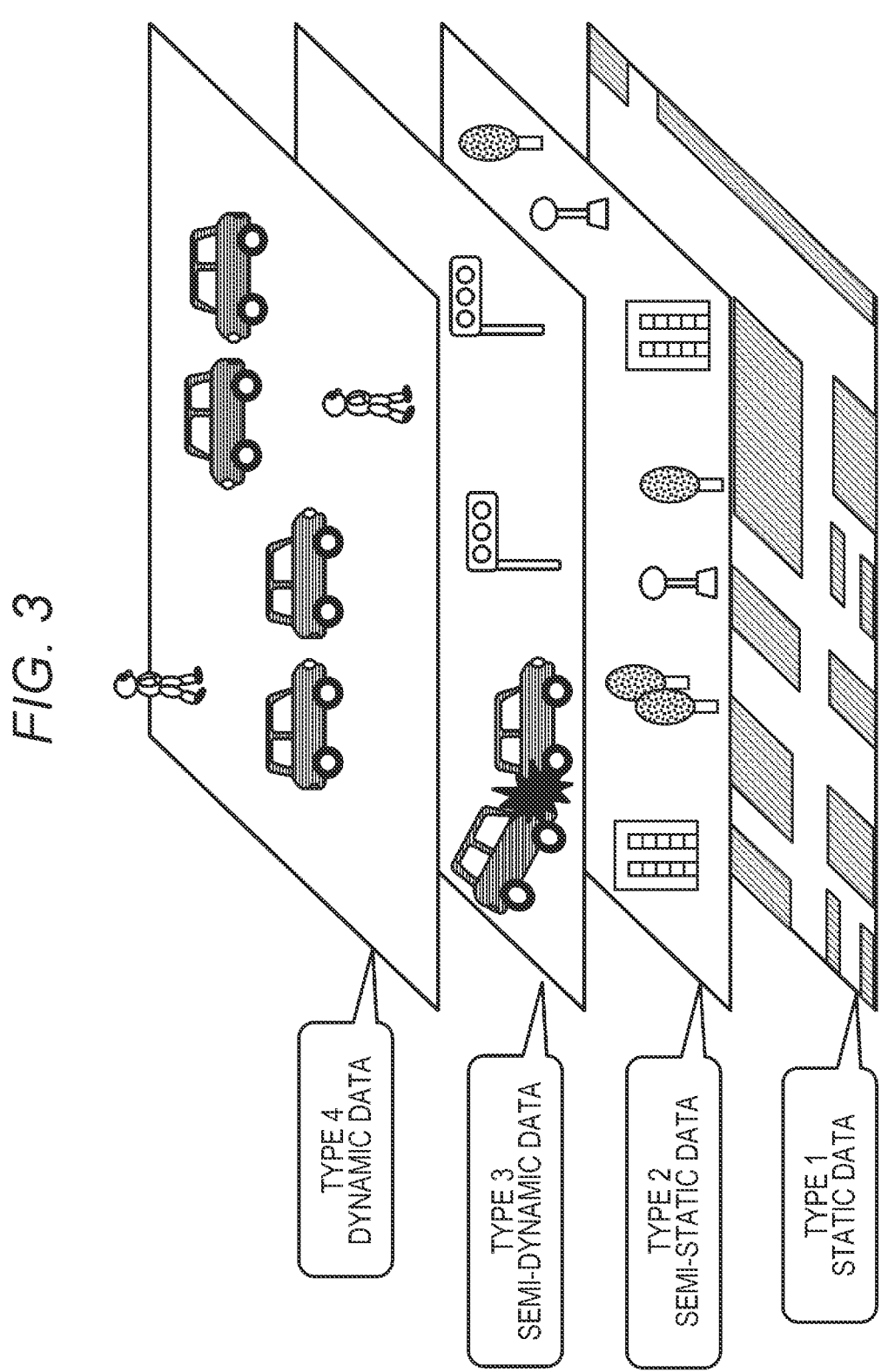
FIG. 3 is a diagram for describing a local dynamic map (LDM).

As illustrated in FIG. 3, the LDM includes information groups of a plurality of types of layered layers. For example, the LDM includes the following four types of information.

Type 1=static data

Type 2=semi-static data

Type 3=semi-dynamic data

Type 4=dynamic data

Type 1=static data includes, for example, data such as map information generated based on a Geospatial Information Authority of Japan map or the like updated in the medium to long term.

Type 2=semi-static data includes, for example, data in which there is no large change in a short term but there is a change in a long term, such as architectures such as a building, trees, or signs, and the like.

Type 3=semi-dynamic data includes data that can be changed in a certain time unit, such as a signal, a traffic jam, or an accident.

Type 4=dynamic data is, for example, traffic information of a vehicle, a person, or the like, and includes data that is changed sequentially.

The control device 50 and the map information provision server transmit a local dynamic map (LDM) including these pieces of data to the mobile device 10. The mobile device 10 can analyze the LDM, and use the LDM for automated driving control such as setting of a traveling route, and control of a traveling speed, and a lane.

Note that the control device 50 and the map information provision server continuously execute update processing of the local dynamic map (LDM) based on the latest information, and each mobile device 10 can acquire the latest information from the server, and use the information at the time of using the LDM.

However, at present, a section in which the automated driving vehicle can perform automated driving using the LDM information is a limited section such as a partial section of an expressway, and there are many sections in which manual driving by the driver is required. Furthermore, there is a case where the current LDM is not updated in a timely manner, and in such a case, there is a possibility that the map information of the old LDM is different from the current map information. The present disclosure enables reliable handling even in such a case.

An overall configuration example and each component of the information processing system of the present disclosure will be described with reference to FIG. 4.

Figure 4:
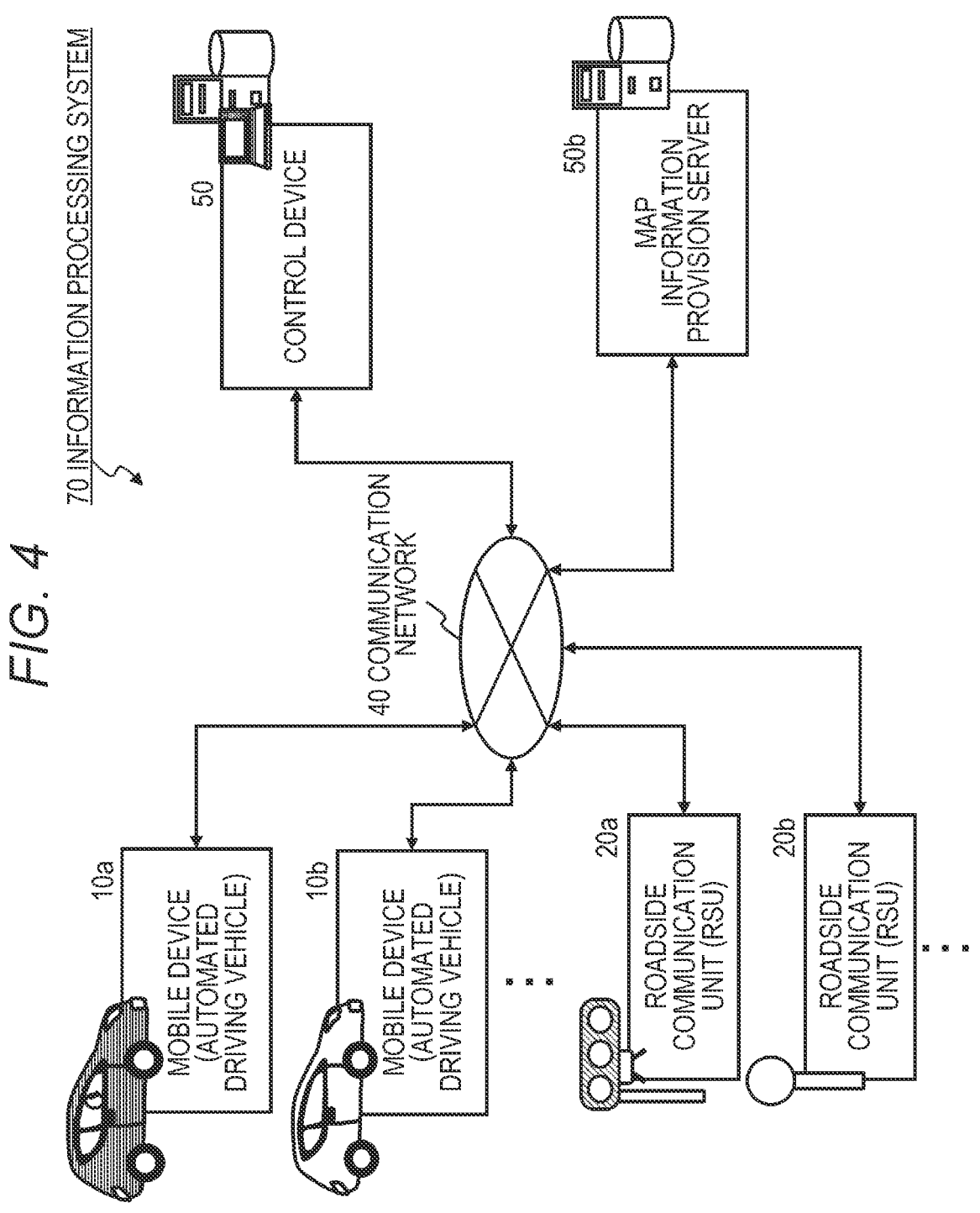
FIG. 4 is a diagram for describing a configuration example of an information processing system of the present disclosure.

FIG. 4 is a diagram illustrating a configuration example of an information processing system 70 of the present disclosure.

As illustrated in FIG. 4, the information processing system 70 of the present disclosure includes mobile devices (automated driving vehicles) 10a and 10b, roadside communication units (RSUs) 20a and 20b, and the control device 50. Moreover, the information processing system may include a map information provision server 50b.

These devices can communicate with each other via a communication network 40.

Note that FIG. 4 illustrates two mobile devices (automated driving vehicles) 10a and 10b and two roadside communication units (RSUs) 20a and 20b, but a large number of mobile devices (automated driving vehicles) 10 and roadside communication units (RSUs) 20 can be present. Furthermore, a plurality of control devices 50 and map information provision servers 50b can be present, and various other servers can also be present.

The communication network 40 includes, for example, a plurality of base stations and the like. Here, the mobile device (automated driving vehicle) 10 selects a nearby device from the plurality of control devices 50 and map information provision servers 50b on the basis of the position information, for example.

As described above, the mobile device (automated driving vehicle) 10 is a vehicle capable of switching at least a plurality of levels of automated driving levels which are the definition levels of SAE.

The mobile device 10 can perform communication with mobile devices 10, and communication with the roadside communication unit (roadside unit: RSU) 20.

Note that communication between vehicles is called vehicle-to-vehicle communication (V2V communication). Furthermore, communication between a vehicle and an infrastructure facility such as a roadside communication unit (RSU) is called vehicle-to-infrastructure communication (V2I communication). Furthermore, these are collectively referred to as V2X communication. The V2X communication includes communication between a vehicle and a vehicle, between a vehicle and a pedestrian (V2P), between a vehicle and a network (V2N), between a vehicle and an infrastructure facility, between a vehicle and a server, and the like.

The mobile device 10 is a vehicle capable of performing the V2X communication described above.

The mobile device 10 and the roadside communication unit (RSU) 20 can communicate with the control device 50 and the map information provision server 50b via the communication network 40 such as the base station 30.

As described above, the control device 50 acquires, from the mobile device 10, various kinds of data such as setting information of an automated driving level, data indicating a driving situation, or sensor detection information, and control information of a power system, a braking device, and a steering device mounted on the mobile device 10, and performs management related to the movement, that is, traveling of the mobile device 10. Note that the management related to traveling is automated driving control management or the like in the driving assistance processing unit in the information processing device mounted on the mobile device 10.

Moreover, the control device 50 performs data processing such as machine learning (ML) or deep learning (DL) by using the data acquired from the mobile device 10, and as a result, generates a learning model such as a neural network model. For example, a learning model for each automated driving level is generated and managed.

The control device 50 and the map information provision server 50b provide the map information to the mobile device 10. For example, a local dynamic map (LDM) having a configuration described with reference to FIG. 3 is generated, and is provided to the mobile device 10.

The mobile device 10 can analyze the LDM, and use the LDM for automated driving control such as setting of a traveling route, and control of a traveling speed, and a lane.

[2. Regarding Configuration Example of Information Processing Device in Mobile Device of Present Disclosure]

Next, a configuration example of the information processing device mounted on the mobile device of the present disclosure will be described.

Figure 5:
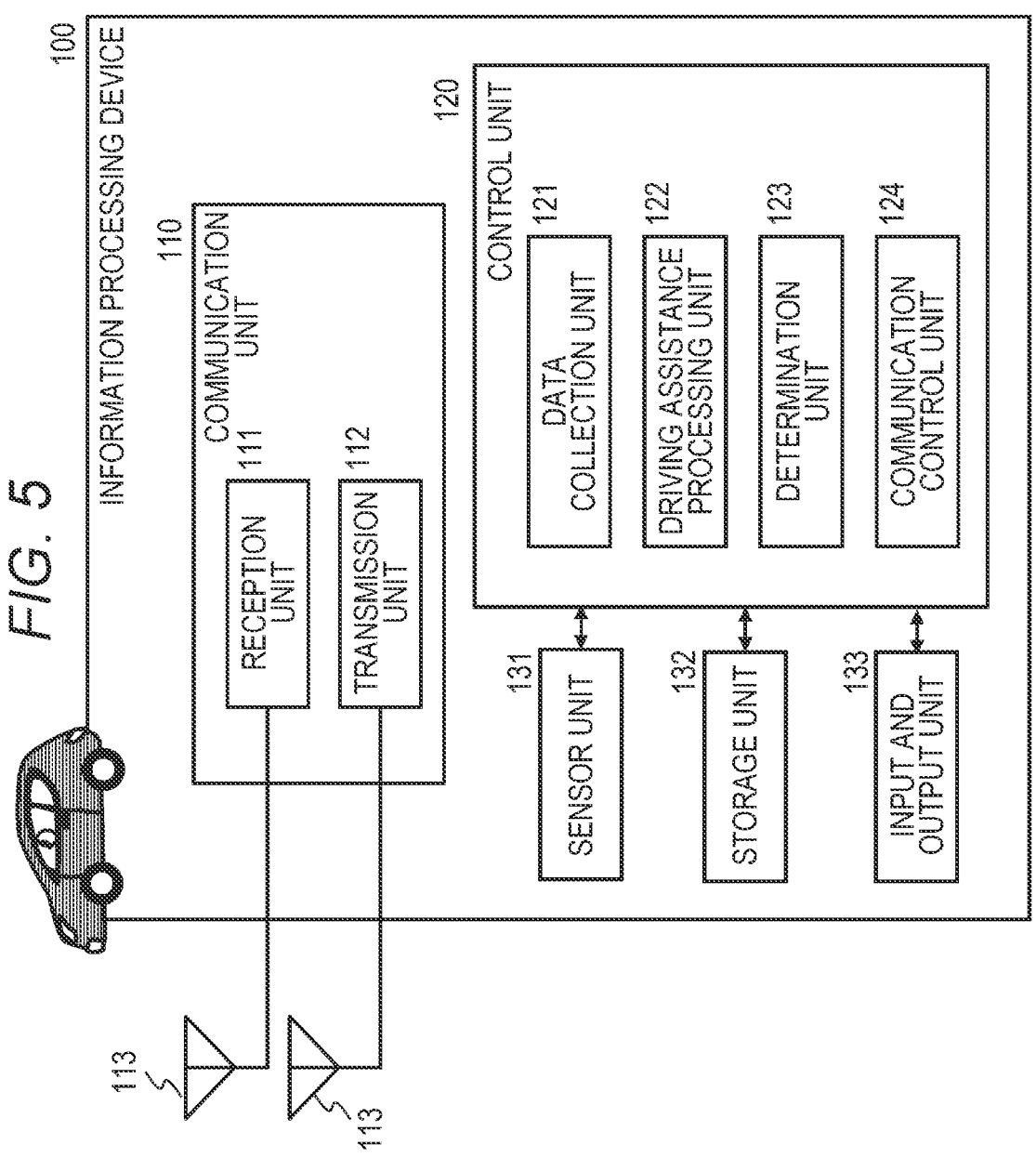
FIG. 5 is a diagram for describing a configuration example of an information processing device of the present disclosure.

FIG. 5 is a diagram illustrating a configuration example of an information processing device 100 mounted on the mobile device 10 of the present disclosure.

As illustrated in FIG. 5, the information processing device 100 includes a communication unit 110, a control unit 120, a sensor unit 131, a storage unit 132, and an input and output unit 133.

Note that the configuration illustrated in FIG. 5 is an example, the hardware configuration is not limited to the configuration illustrated in FIG. 5, and various different configurations can be adopted. Furthermore, the functions of the information processing device 100 mounted on the mobile device 10 may be implemented in a distributed manner in a plurality of physically separated configurations.

The communication unit 110 includes a reception unit 111, and a transmission unit 112.

The control unit 120 includes a data collection unit 121, a driving assistance processing unit 122, a determination unit 123, and a communication control unit 124.

Note that the configuration illustrated in FIG. 5 is a partial configuration of the information processing device 100 mounted on the mobile device 10, and illustrates only main configurations used for the processing of the present disclosure.

The communication unit 110 communicates with an external device under the communication control unit 124 of the control unit 120. For example, communication is performed with external devices such as another mobile device 10, the base station 30, the roadside communication unit (RSU) 20, the control device 50, and the map information provision server 50b illustrated in FIG. 4.

The communication unit 110 supports one or a plurality of wireless communication access systems. For example, the communication unit 110 supports both a long term evolution (LTE) system and a 5G new radio (NR) system. Moreover, the communication unit 110 may be configured to support various communication systems such as W-CDMA and CDMA2000 in addition to the LTE system and the 5G NR system.

The communication unit 110 includes the reception unit 111, the transmission unit 112, and an antenna 113. Note that the communication unit 110 may include a plurality of the reception units 111, the transmission units 112, and the antennas 113. For example, in a case where the communication unit 110 supports a plurality of wireless access systems, each unit of the communication unit 110 can be individually configured for each wireless access system. For example, the reception unit 111 and the transmission unit 112 may be individually configured by the LTE system and the 5G NR system.

The sensor unit 131 includes a plurality of different sensors.

Sensor detection information of the sensor unit 131 is acquired by the data collection unit 121 of the control unit 120, and is stored in the driving assistance processing unit 122 or the accessible storage unit 132 of the driving assistance processing unit 122. Furthermore, the sensor detection information of the sensor unit 131 is provided to an external device, for example, the control device 50 via the communication unit 110 as necessary.

Figure 6:
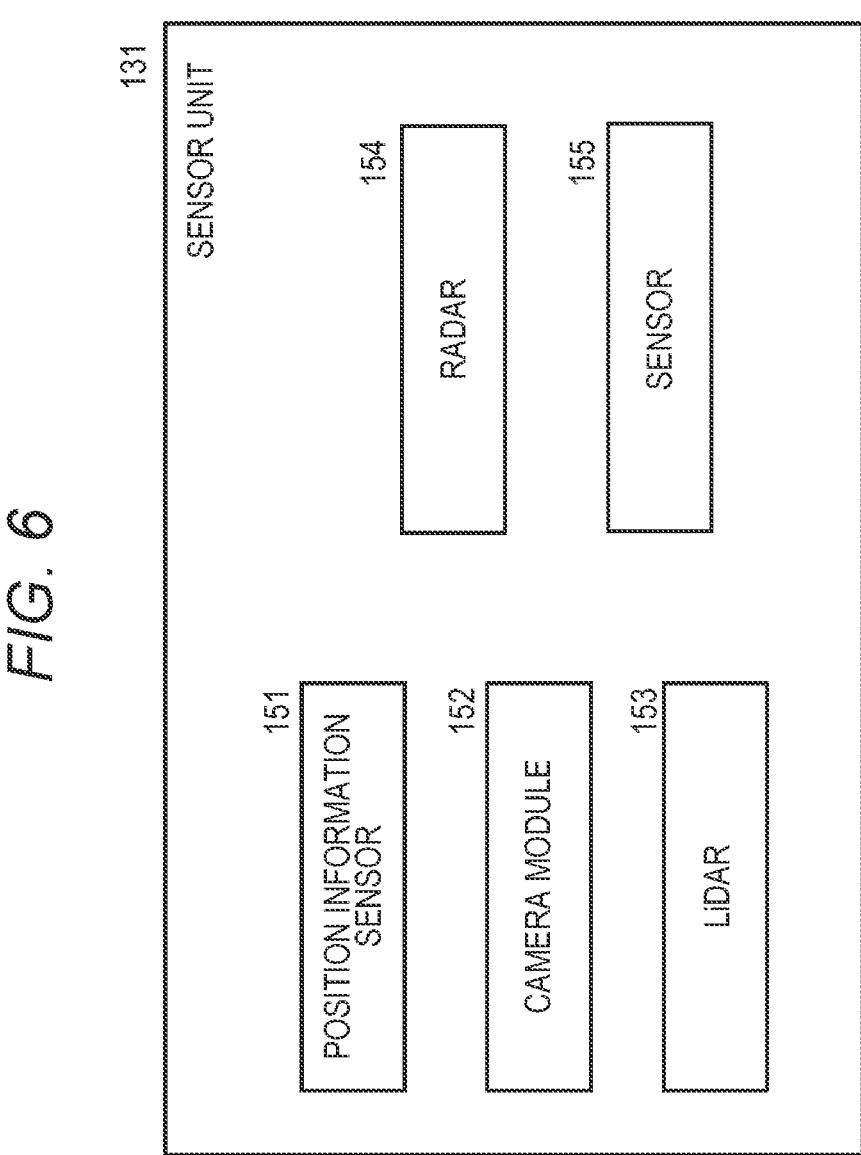
FIG. 6 is a diagram for describing a configuration example of a sensor unit in a control unit of an information processing device of the present disclosure.

A detailed configuration example of the sensor unit 131 is illustrated in FIG. 6.

As illustrated in FIG. 6, the sensor unit 131 includes a position information sensor 151, a camera module (including an image sensor) 152, Light Detection and Ranging or Laser Imaging Detection and Ranging (LiDAR) 153, radar 154, a sensor 155, and the like.

The position information sensor 151 is, for example, a global navigation satellite system (GLASS) represented by a Global Positioning System (GPS).

In addition, the position information sensor may be a sensor using a positioning technology using a signal transmitted and received via the communication unit 110 supporting an odometer, and the LTE, 4G, or the 5G cellular systems.

The camera module 152 is equipped with a plurality of image sensors, and acquires image information on the outside of the mobile device (vehicle) and image information on the inside of the vehicle including the movement and expression of the driver.

The LiDAR 153 and the radar 154 detect various objects such as other vehicles and obstacles around the mobile device, and acquire data necessary for measuring the distance to the detected object.

The sensor 155 includes, for example, an inertial measurement unit (IMU) that is a unit in which an acceleration sensor, a rotation angle acceleration sensor, a gyro sensor, a magnetic field sensor, a barometric pressure sensor, a temperature sensor, and the like are integrated.

As described above, the information acquired by the sensor unit 131 is provided to the driving assistance processing unit 122 via the data collection unit 121 of the control unit 120, and is stored in the accessible storage unit 132 of the driving assistance processing unit 122. Furthermore, the information acquired by the sensor unit 131 is provided to an external device, for example, the control device 50 via the communication unit 110 as necessary.

For example, the storage unit 132 is a storage device capable of reading and writing data, such as a DRAM, an SRAM, a flash memory, or a hard disk. The storage unit 132 functions as a storage section of the information processing device 100.

The input and output unit 133 is an interface for exchanging information with a user such as a driver, for example. For example, the input and output unit 133 functions as an interface that can be operated by a driver, such as an operation key and a touch panel.

The input and output unit 133 may be configured as a display device such as a liquid crystal display or an organic electroluminescence (EL) display. Furthermore, the input and output unit 133 may be a sound device such as a speaker, a microphone, or a buzzer. Furthermore, the input and output unit 133 may be a lighting device such as a light emitting diode (LED) lamp. The input and output unit 133 functions as an input and output section (an input section, an output section, an operation section, or a notification section) of the information processing device 100.

The control unit 120 is a controller that controls each unit of the information processing device 100. For example, the control unit 120 includes a processor such as a CPU, an MPU, and a GPU, and a memory such as a RAM and a ROM. The processor of the control unit 120 executes various programs stored in the storage unit 132 using the memory such as a RAM as a work area, and executes various kinds of processing necessary in the information processing device 100.

Note that the control unit 120 may be realized by an integrated circuit such as an ASIC or an FPGA. Any of the CPU, the MPU, the GPU, the ASIC, and the FPGA can be regarded as the controller.

As illustrated in FIG. 5, the control unit 120 includes the data collection unit 121, the driving assistance processing unit 122, the determination unit 123, and the communication control unit 124.

Each block (the data collection unit 121 to the communication control unit 124) constituting the control unit 120 is a functional block indicating a function of the control unit 120. These functional blocks may be software blocks or hardware blocks.

For example, each of the functional blocks described above may be one software module realized by software (including a microprogram) or one circuit block on a semiconductor chip (die). Furthermore, each functional block may be one processor or one integrated circuit. A configuration method of the functional block is arbitrary. Note that the control unit 120 may be configured by a functional unit different from the above-described functional block.

Note that the information processing device 100 illustrated in FIG. 5 is a device mounted in the mobile device 10, and for example, the driving assistance processing unit 122 of the control unit 120 controls each component of the vehicle such as an engine, an accelerator, a brake, a steering wheel (steering), and a transmission, and executes the automated driving control.

The data collection unit 121 acquires sensor detection information of the sensor unit 131. The sensor detection information collected by the data collection unit 121 is provided to the driving assistance processing unit 122, and is stored in the accessible storage unit 132 of the driving assistance processing unit 122. Furthermore, the sensor detection information of the sensor unit 131 is provided to an external device, for example, the control device 50 via the communication unit 110 as necessary.

The driving assistance processing unit 122 controls each component of the vehicle such as an engine, an accelerator, a brake, a steering wheel (steering), and a transmission of the mobile device 10 as described above, and executes the automated driving control.

The driving assistance processing unit 122 performs the automated driving control by controlling a driving steering unit of the mobile device 10 on the basis of an output obtained by inputting the data collected by the data collection unit 121 to artificial intelligence (AI), for example, machine learning or a neural network model generated by deep learning.

For example, automated driving control by advanced driver-assistance systems (ADAS) or autonomous driving (AD) is executed.

The driving assistance processing unit 122 performs, for example, processing of supplying control information on acceleration, deceleration, and the like of the mobile device 10 to the power system, supplying control information on deceleration, stop, and the like to the braking device, and supplying control information on xx [cm] left, yy [cm] right, and the like to the steering device (steering), and the like.

Note that the neural network model (learning model) used for the automated driving control by the driving assistance processing unit 122 may be mounted in the driving assistance processing unit 122 in advance, or may be acquired from the external control device 50 or another external server via the base station 30, the roadside communication unit (RSU) 20, or the like, may be stored in the storage unit 132, and may be updated as appropriate.

Furthermore, the neural network model (learning model) used for the automated driving control by the driving assistance processing unit 122 may be one neural network model or may be configured by a plurality of neural network models. The plurality of neural network models may be a neural network model prepared for each sensor as so-called edge AI, or a neural network model prepared for each control of the control unit 120.

The information processing device 100 mounted on the mobile device 10 according to the present embodiment detects the presence or absence of an abnormality in automated driving or manual driving on the basis of the information acquired via the data collection unit 121 of the control unit 120 or the communication unit 110. Moreover, in a case where an abnormality is detected, an appropriate response according to a situation of the detected abnormality is performed, and processing for maintaining safe driving is executed.

Moreover, in a case where the mobile device 10 performs automated driving, the information processing device 100 mounted on the mobile device 10 according to the present embodiment notifies the driver of an allowable activity that is an action allowed for the driver according to the automated driving level being executed.

For example, the user is notified of an allowable activity according to the automated driving level being executed, such as being able to make a phone call in a case where the automated driving level is level 2, and being able to read a book or take a nap in a case where the automated driving level is level 4.

By notifying the driver of such an allowable activity according to the automated driving level, the driver can check the allowed activity, and perform only the allowed activity.

For example, in a case where the automated driving level is level 2, it is possible to prevent a situation where an accident occurs by taking a nap that is an activity not allowed, and it is possible to perform safe automated traveling.

Hereinafter, specific processing will be described.

[3. Regarding a Basic Sequence of Processing Executed by Information Processing Device of Present Disclosure]

Next, a basic sequence of the processing executed by the information processing device of the present disclosure will be described.

A basic sequence of the processing executed by the information processing device 100 of the present disclosure described with reference to FIG. 5, that is, the information processing device 100 mounted on the mobile device 10 will be described with reference to a flowchart illustrated in FIG. 7.

Note that the processing according to the flow described below can be executed according to a program stored in the storage unit 132 of the information processing device 100, for example. For example, the processing is executed under the control of a data processing unit (control unit) including a CPU or the like having a program execution function.

Hereinafter, the processing of each step of the flowchart illustrated in FIG. 7 will be described in sequence.

(Step S101)

First, in step S101, the control unit 120 of the information processing device 100 specifies the level of the automated driving currently being executed by the mobile device 10.

This processing is executed by the data collection unit 121, the communication unit 110, and the driving assistance processing unit 122 in the control unit 120 of the information processing device 100.

For example, the data collected by the data collection unit 121, the data acquired from the outside by the communication unit 110, or the like is used for the specification processing of the automated driving level.

The driving assistance processing unit 122 inputs the data collected by the data collection unit 121 and the data acquired from the outside by the communication unit 110, and specifies the level of the automated driving currently being executed by the mobile device 10 on the basis of these pieces of data.

The data collection unit 121 collects sensor detection information of the sensor unit 131. As described above with reference to FIG. 6, the sensor unit 131 includes the position information sensor 151, the camera module 152, the LiDAR 153, the radar 154, and the sensor 155.

The data collection unit 121 acquires detection information of these various sensors of the sensor unit 131. The information acquired by the data collection unit 121 includes, for example, self-position information, a camera-imaged image, object distance information, and the like.

The information acquired by the data collection unit 121 is input to the driving assistance processing unit 122.

Furthermore, the communication unit 110 inputs the information acquired from other mobile devices, on-road infrastructures such as the base station 30 and the roadside communication unit (RSU) 20, and external servers, for example, the control device 50 and the map information provision server 50b, to the driving assistance processing unit 122.

For example, in a case where the control device 50 holds the automated driving management data of the mobile device 10, the information on the level of the automated driving currently being executed by the mobile device 10 can be acquired from the control device 50.

Furthermore, automated driving allowable level information for each road section registered in the map information provided by the map information provision server 50b may be acquired, and the level of the automated driving currently being executed by the mobile device 10 may be determined using the automated driving allowable level information.

Furthermore, in a case where the level information of the automated driving currently being executed by the mobile device 10 is set or recorded in the storage unit 131 or the memory in the mobile device 10, the information may be acquired.

For example, the driving assistance processing unit 122 can specify the level of the automated driving currently being executed by the mobile device 10 on the basis of any of the methods described above.

As described above, in step S101, the driving assistance processing unit 122 inputs the data collected by the data collection unit 121 and the data acquired from the outside by the communication unit 110, and specifies the level of the automated driving currently being executed by the mobile device 10 on the basis of these pieces of data.

(Step S102)

Next, in step S102, the control unit 120 of the information processing device 100 acquires a list in which activities (action) allowed for the driver according to the automated driving level are set as list data, that is, an allowable activity list associated with the automated driving level.

The allowable activity list is a list in which items of activities allowed for the driver for each of the levels (levels 0 to 5) of the automated driving described above with reference to FIG. 2 are set as list data.

The driving assistance processing unit 122 of the control unit 120 of the information processing device 100 receives the allowable activity list from the control device 50 via the communication unit 110, for example.

Note that the allowable activity list associated with the automated driving level can also be stored in the storage unit 131 in the information processing device 100 of the mobile device 10, and in this case, the driving assistance processing unit 122 of the control unit 120 of the information processing device 100 acquires the allowable activity list from the storage unit 131.

FIG. 8 illustrates an example of the allowable activity list associated with the automated driving level.

As illustrated in FIG. 8, the allowable activity list is a list including correspondence data of the automated driving levels (0 to 5) and the activities allowed for the driver who is the user at each of the automated driving levels (0 to 5).

As illustrated in FIG. 8, the activities allowed for the driver are different depending on the automated driving levels (0 to 5).

In the list example illustrated in FIG. 8, there is no activity allowed for the driver at the automated driving level 0 (manual driving) and the level 1.

In automated driving level 2, the activity allowed for the driver is a phone call.

At the automated driving level 3, the activities allowed for the driver are (1) a meal, (2) a phone call, (3) checking and replying to an e-mail, (4) reading a book, and (5) playing a game.

At the automated driving level 4, the activities allowed for the driver are (1) a meal, (2) a phone call, (3) checking and replying to an e-mail, (4) reading a book, (5) playing a game, (6) a video call, and (7) a nap.

At the automated driving level 5, the activities allowed for the driver are (1) a meal, (2) a phone call, (3) checking and replying to an e-mail, (4) reading a book, (5) playing a game, (6) a video call, (7) a nap, and (8) all other activities.

The allowable activity list is configured by data in which the automated driving level and the activity allowed for the driver are associated as described above.

In step S102, the control unit 120 of the information processing device 100 acquires the allowable activity list associated with the automated driving level as illustrated in FIG. 8.

(Step S103)

Next, in step S103, the control unit 120 of the information processing device 100 selects an activity allowed for the driver associated with the automated driving level currently being executed by the mobile device 10, from the automated driving level-corresponding allowable activity list acquired in step S102.

This processing is executed by the driving assistance processing unit 122 in the control unit 120 of the information processing device 100.

(Step S104)

Finally, in step S104, the control unit 120 of the information processing device 100 outputs the activity allowed for the driver acquired from the allowable activity list in step S103, that is, the activity allowed for the driver associated with the automated driving level currently being executed by the mobile device 10, to the input and output unit 133 of the mobile device 10.

For example, a message describing an activity allowed for the driver is output via a display unit or a voice output unit constituting the input and output unit 133.

Note that notification of an activity that cannot be performed by the driver may be provided. Alternatively, a unit that determines the activity that can be performed by the driver and the activity that cannot be performed by the driver may be provided, and notification of both the activities may be provided together.

A notification example of the allowable activity corresponding to the automated driving level using the display unit will be described with reference to FIG. 9.

Figure 9:
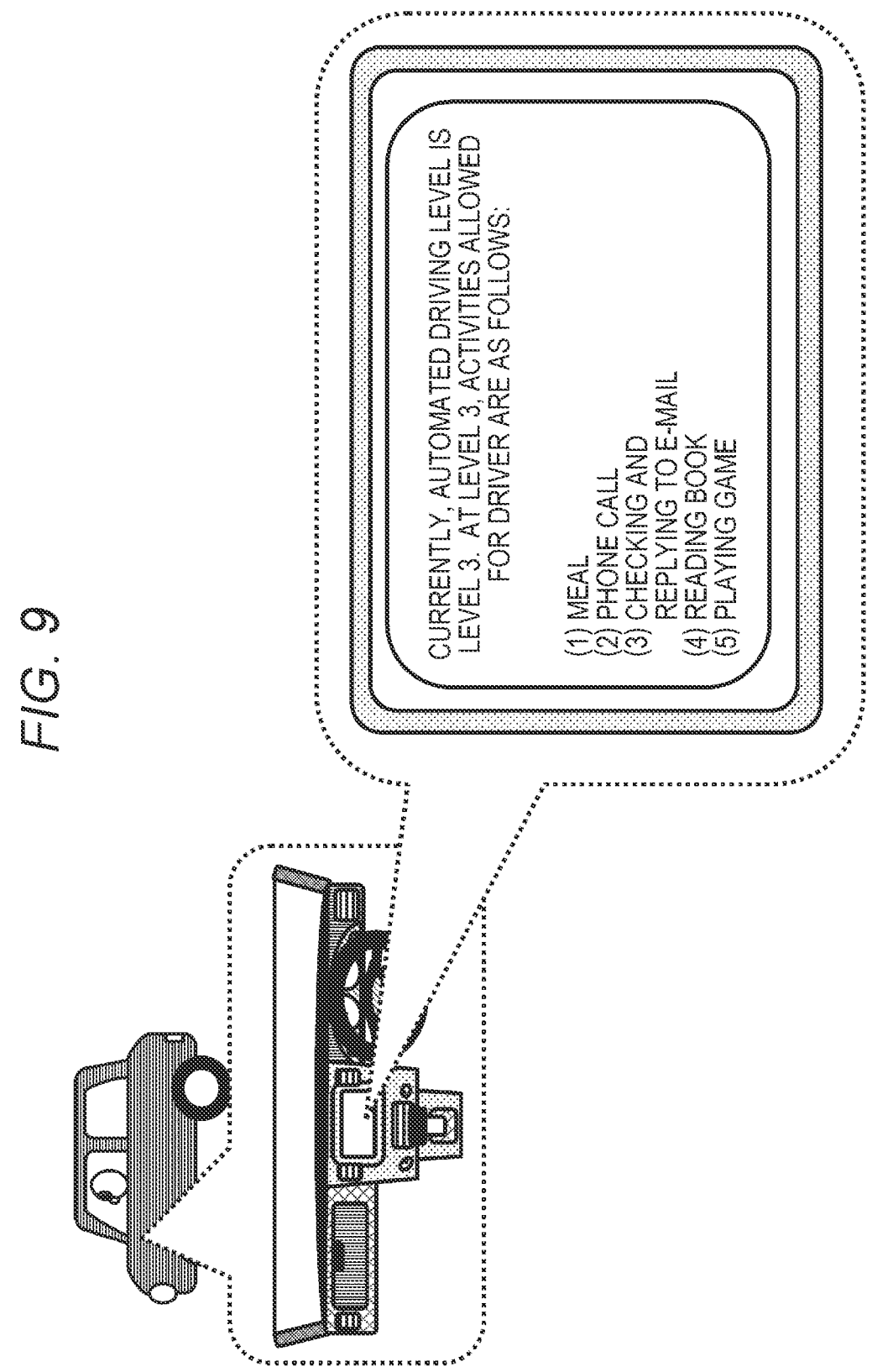
FIG. 9 is a diagram for describing an example of display data output by an information processing device of the present disclosure.

As illustrated in FIG. 9, a message including list data of allowable activities corresponding to the automated driving level is displayed on the display unit of the mobile device which can be observed by the driver.

A display information example illustrated in FIG. 9 is an example in which the following message is displayed.

"Currently, the automated driving level is level 3. At level 3, the activities allowed for the driver are as follows:

(1) a meal (2) a phone call (3) checking and replying to an e-mail (4) reading a book (5) playing a game The driver who is the user can see the message displayed on the display unit to check that the current automated driving level of the mobile device 10 is level 3, and moreover, activities such as (1) a meal, (2) a phone call, (3) checking and replying to an e-mail, (4) reading a book, and (5) playing a game are allowed for the driver at the current automated driving level 3.

The user can check the allowable activities corresponding to the automated driving level 3 displayed on the display unit, and act in an effort to perform an action within a range of the displayed allowable activities.

Note that the notification processing of the allowable activity corresponding to the automated driving level is not limited to the display processing on the display unit as illustrated in FIG. 9, and the notification may be performed by voice information, for example.

[4. Regarding Processing Sequence of Analyzing Check State of Driver for Notification of Allowable Activity and Performing Emergency Response in Case where Notification is not Checked]

Next, the processing sequence of analyzing the check state of the driver for the notification of the allowable activity and performing an emergency response in a case where notification is not checked will be described.

In the processing sequence described with reference to the flowchart illustrated in FIG. 7, only the notification of the allowable activity corresponding to the automated driving level is performed, and the analysis as to whether or not the driver has checked the notification is not executed.

The processing described below is processing of analyzing the check state of the driver for the notification of the allowable activity and performing the emergency response in a case where the notification is not checked.

A sequence of the processing will be described with reference to the flowchart illustrated in FIG. 10.

Figure 7:
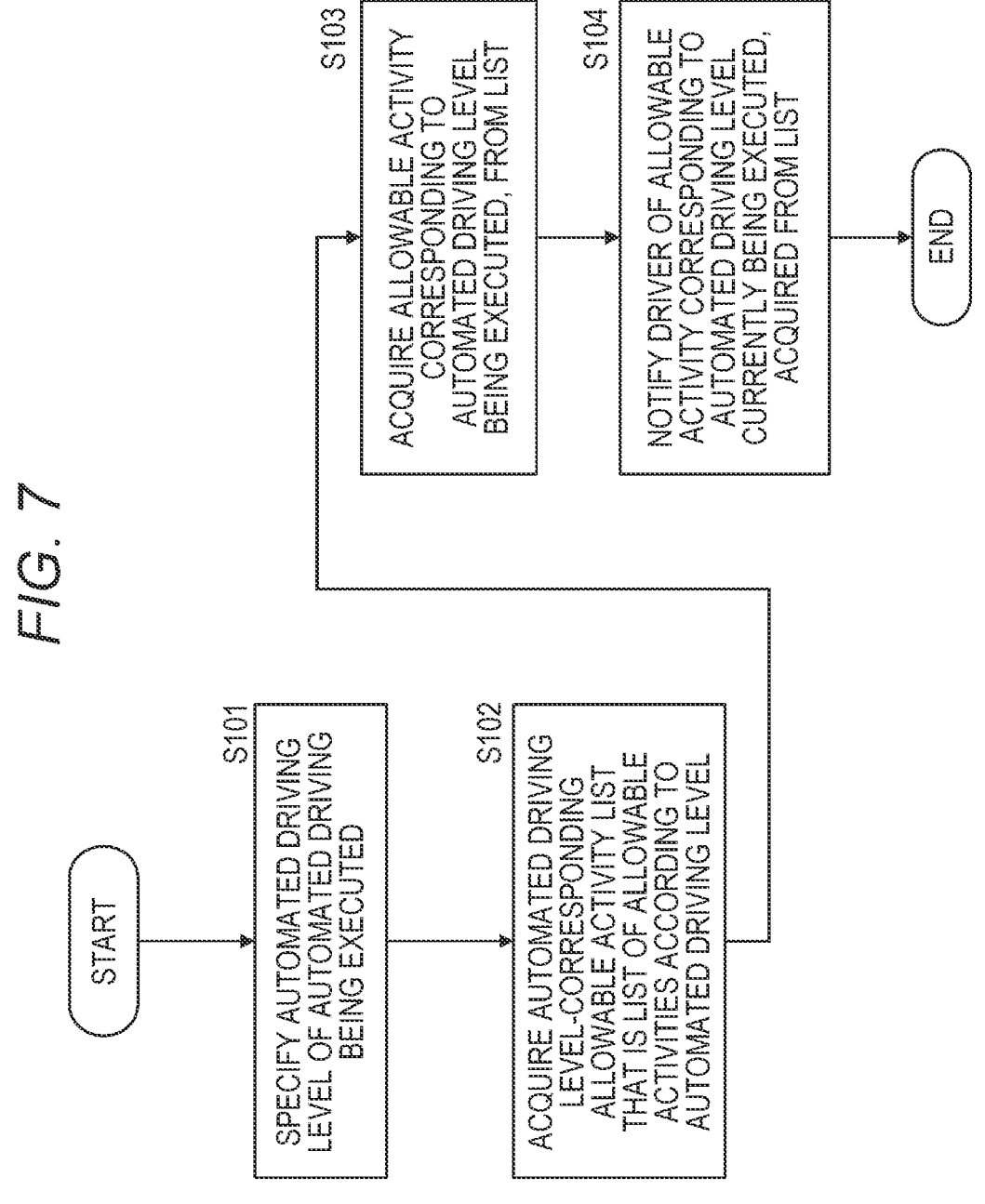
FIG. 7 is a diagram illustrating a flowchart for describing a processing sequence executed by an information processing device of the present disclosure.
Figure 10:
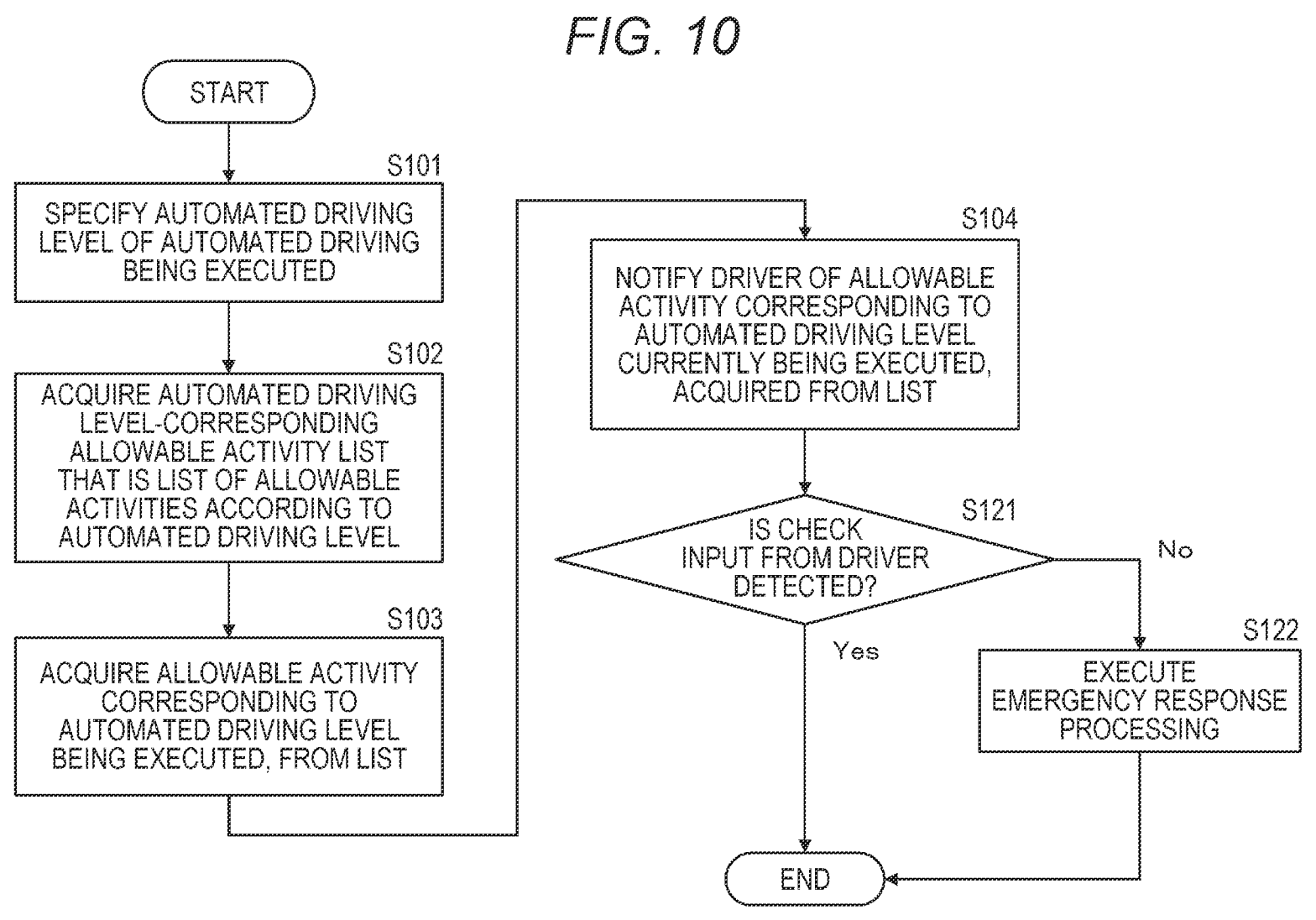

The flowchart illustrated in FIG. 10 is a flow in which steps S121 and S122 are added after step S104 of the flowchart illustrated in FIG. 7 described above.

Hereinafter, the processing of each step of the flowchart illustrated in FIG. 10 will be described.

(Steps S101 to S104)

The processing of steps S101 to S104 is similar to the processing described with reference to FIG. 7.

The processing will be briefly described.

First, in step S101, the control unit 120 of the information processing device 100 specifies the level of the automated driving currently being executed by the mobile device 10.

Next, in step S102, a list in which activities (action) allowed for the driver according to the automated driving level are set as list data, that is, an automated driving level-corresponding allowable activity list is acquired.

Moreover, in step S103, the control unit 120 of the information processing device 100 selects an activity allowed for the driver associated with the automated driving level currently being executed by the mobile device 10, from the automated driving level-corresponding allowable activity list acquired in step S102.

Next, in step S104, the control unit 120 of the information processing device 100 outputs the activity allowed for the driver acquired from the allowable activity list in step S103, that is, the activity allowed for the driver associated with the automated driving level currently being executed by the mobile device 10, to the input and output unit 133 of the mobile device 10.

The processing up to this point is similar to the processing described with reference to FIG. 7.

(Step S121)

Next, in step S121, the control unit 120 of the information processing device 100 determines whether or not a check input from the driver is detected for the allowable activity corresponding to the automated driving level notified to the driver in step S104.

Figure 11:
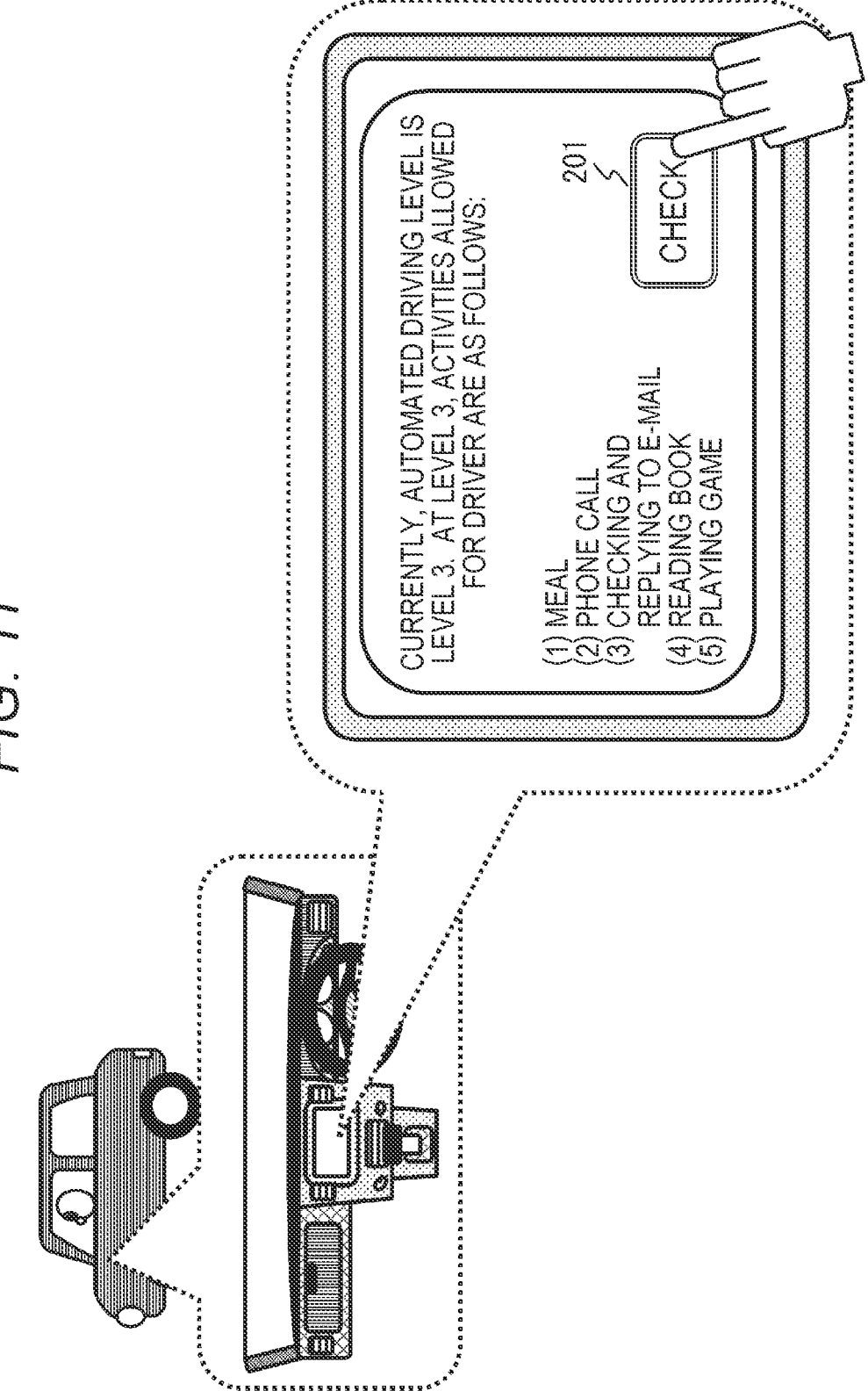
FIG. 11 is a diagram for describing an example of display data output by an information processing device of the present disclosure.

FIG. 11 illustrates an example of a user interface that enables detection of the check input from the driver.

FIG. 11 illustrates display data obtained by adding a check button 201 for the user's input to the display data similar to the notification example of the allowable activity corresponding to the automated driving level described above with reference to FIG. 9.

The display unit is a touch panel, and in a case where the user (driver) touches the check button 201, a detection signal indicating that check by the user has been performed is input to the control unit 120 of the information processing device 100.

In step S121 of the flow illustrated in FIG. 10, the presence or absence of the detection signal is determined.

In a case where the user (driver) touches the check button 201 and the detection signal is input to the control unit 120 of the information processing device 100, the determination in step S121 is Yes. That is, it is determined that the driver has checked the allowable activity data corresponding to the automated driving level displayed on the display unit, and the processing is ended.

On the other hand, in a case where the detection signal is not input to the control unit 120 of the information processing device 100 without the user (driver) touching the check button 201 within a predetermined time, for example, 10 seconds, the determination in step S121 is No. That is, it is determined that the driver has not checked the allowable activity data corresponding to the automated driving level displayed on the display unit.

In this case, the processing proceeds to step S122.

(Step S122)

In the determination processing of step S121, in a case where it is determined that the driver has not checked the allowable activity data corresponding to the automated driving level displayed on the display unit, the processing proceeds to step S122.

In this case, the control unit 120 of the information processing device 100 executes emergency response processing in step S122.

For example, the emergency response processing is any one of (a) emergency stop of the mobile device 10;

(b) switching the mobile device 10 to slow driving; and (c) outputting a warning sound, or processing obtained by combining a plurality of the processing.

For example, in a case where it is determined that the allowable activity data corresponding to the automated driving level displayed on the display unit has not been checked, the driving assistance processing unit 122 of the control unit 120 performs the emergency stop of the mobile device 10 and outputs the warning sound as the emergency response processing.

By executing such emergency response processing, it is possible to avoid a situation in which the mobile device 10 travels while the driver is performing an activity that is not allowed, and it is possible to prevent an accident in advance.

[5. Regarding Processing Sequence of Monitoring Action of Driver after Notification of Allowable Activity and Performing Emergency Response in Case where Driver is Executing Non-Allowable Activity]

Next, the processing sequence of monitoring the action of the driver after the notification of the allowable activity and performing the emergency response in a case where the driver is executing a non-allowable activity will be described.

A sequence of the processing will be described with reference to the flowchart illustrated in FIG. 12.

The flowchart illustrated in FIG. 12 is a flow in which steps S141 to S143 are added after step S104 of the flowchart illustrated in FIG. 7 described above.

Hereinafter, the processing of each step of the flowchart illustrated in FIG. 12 will be described.

(Steps S101 to S104)

The processing of steps S101 to S104 is similar to the processing described with reference to FIG. 7.

The processing will be briefly described.

First, in step S101, the control unit 120 of the information processing device 100 specifies the level of the automated driving currently being executed by the mobile device 10.

Next, in step S102, a list in which activities (action) allowed for the driver according to the automated driving level are set as list data, that is, an automated driving level-corresponding allowable activity list is acquired.

Moreover, in step S103, the control unit 120 of the information processing device 100 selects an activity allowed for the driver associated with the automated driving level currently being executed by the mobile device 10, from the automated driving level-corresponding allowable activity list acquired in step S102.

Next, in step S104, the control unit 120 of the information processing device 100 outputs the activity allowed for the driver acquired from the allowable activity list in step S103, that is, the activity allowed for the driver associated with the automated driving level currently being executed by the mobile device 10, to the input and output unit 133 of the mobile device 10.

The processing up to this point is similar to the processing described with reference to FIG. 7.

(Step S141)

Next, in step S141, the control unit 120 of the information processing device 100 analyzes the action of the driver on the basis of the sensor detection information.

Note that, in a case where the processing of the present embodiment is performed, a sensor such as a camera that acquires information for analyzing the action of the driver in the vehicle is required.

Figure 13:
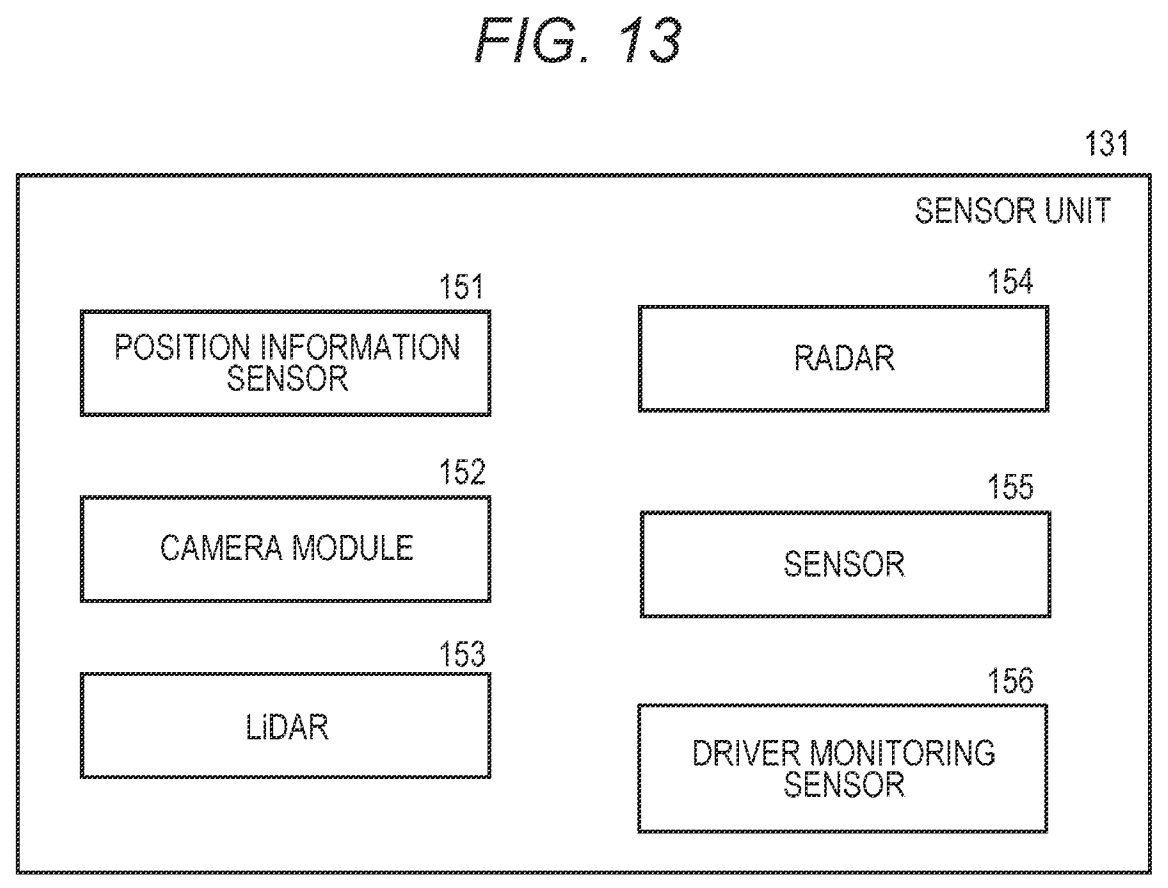

FIG. 13 illustrates a configuration example of the sensor unit 131 in a case where the present embodiment is performed.

The sensor unit 131 illustrated in FIG. 13 has a configuration in which a driver monitoring sensor 156 is added to the sensor unit 131 described above with reference to FIG. 6.

The driver monitoring sensor 156 is a sensor that acquires information for analyzing the action of the driver in the vehicle, and includes, for example, a camera, a microphone, a distance sensor, an odor sensor, and the like.

The data collection unit 121 of the control unit 120 inputs information acquired by the driver monitoring sensor 156, and inputs the acquired information to the determination unit 123.

The determination unit 123 analyzes the information acquired by the driver monitoring sensor 156, and estimates the activity that is being performed by the driver. This estimation may be performed on the basis of an output result obtained by inputting the information acquired by the driver monitoring sensor 156 to a neural network model generated by AI, for example, machine learning or deep learning.
(Step S142)

In step S142, it is determined whether or not the activity for the driver estimated in step S141 is an allowable activity corresponding to the current automated driving level.

This processing is executed by the determination unit 123 of the control unit 120.

The determination unit 123 determines whether or not the estimated activity for the driver is an allowable activity corresponding to the current automated driving level.

In a case where it is determined that the activity for the driver is the allowable activity corresponding to the current automated driving level, the processing is ended.

On the other hand, in a case where it is determined that the activity for the driver is not the allowable activity corresponding to the current automated driving level, the processing proceeds to step S143.
(Step S143)

In a case where it is determined in the determination processing of step S142 that the driver is executing an activity which is not the allowable activity corresponding to the current automated driving level, the processing proceeds to step S143.

In this case, the control unit 120 of the information processing device 100 executes emergency response processing in step S143.

For example, the emergency response processing is any one of (a) emergency stop of the mobile device 10;

(b) switching the mobile device 10 to slow driving; and (c) outputting a warning sound, or processing obtained by combining a plurality of the processing.

For example, in a case where it is determined that the driver is executing an activity which is not an allowable activity corresponding to the current automated driving level, the driving assistance processing unit 122 of the control unit 120 performs an emergency stop of the mobile device 10 and outputs a warning sound as the emergency response processing.

By executing such emergency response processing, it is possible to avoid a situation in which the mobile device 10 travels while the driver is performing an activity that is not allowed, and it is possible to prevent an accident in advance.
[6. Regarding Processing Sequence of Detecting Transition of Automated Driving Level and Executing Change Notification of Allowable Activity]

Next, as a processing example executed by the information processing device of the present disclosure, the processing sequence of detecting the transition of the automated driving level and executing the change notification of allowable activity will be described.

The description will be made with reference to the flowchart illustrated in FIG. 14.

Note that the processing according to the flow illustrated in FIG. 14 can be executed according to a program stored in the storage unit 132 of the information processing device 100, for example. For example, the processing is executed under the control of a data processing unit (control unit) including a CPU or the like having a program execution function.

Hereinafter, the processing of each step of the flowchart illustrated in FIG. 14 will be described in sequence.
(Step S201)

First, in step S201, the control unit 120 of the information processing device 100 specifies the level of the automated driving currently being executed by the mobile device 10.

This processing is executed by the data collection unit 121, the communication unit 110, and the driving assistance processing unit 122 in the control unit 120 of the information processing device 100.

For example, the data collected by the data collection unit 121, the data acquired from the outside by the communication unit 110, or the like is used for the specification processing of the automated driving level.

The driving assistance processing unit 122 inputs the data collected by the data collection unit 121 and the data acquired from the outside by the communication unit 110, and specifies the level of the automated driving currently being executed by the mobile device 10 on the basis of these pieces of data.

The data collection unit 121 collects sensor detection information of the sensor unit 131. As described above with reference to FIG. 6, the sensor unit 131 includes the position information sensor 151, the camera module 152, the LiDAR 153, the radar 154, and the sensor 155.

The data collection unit 121 acquires detection information of these various sensors of the sensor unit 131. The information acquired by the data collection unit 121 includes, for example, self-position information, a camera-imaged image, object distance information, and the like.

The information acquired by the data collection unit 121 is input to the driving assistance processing unit 122.

Furthermore, the communication unit 110 inputs the information acquired from other mobile devices, on-road infrastructures such as the base station 30 and the roadside communication unit (RSU) 20, and external servers, for example, the control device 50 and the map information provision server 50b, to the driving assistance processing unit 122.

For example, in a case where the control device 50 holds the automated driving management data of the mobile device 10, the information on the level of the automated driving currently being executed by the mobile device 10 can be acquired from the control device 50.

Furthermore, automated driving allowable level information for each road section registered in the map information provision server 50b may be acquired, and the level of the automated driving currently being executed by the mobile device 10 may be determined using the automated driving allowable level information.

Furthermore, in a case where the level information of the automated driving currently being executed by the mobile device 10 is set or recorded in the storage unit 131 or the memory in the mobile device 10, the information may be acquired.

For example, the driving assistance processing unit 122 can specify the level of the automated driving currently being executed by the mobile device 10 on the basis of any of the methods described above.

As described above, in step S201, the driving assistance processing unit 122 inputs the data collected by the data collection unit 121 and the data acquired from the outside by the communication unit 110, and specifies the level of the automated driving currently being executed by the mobile device 10 on the basis of these pieces of data.

(Step S202)

Next, in step S202, the control unit 120 of the information processing device 100 determines the presence or absence of the transition (change) of the automated driving level being executed by the mobile device 10.

This processing is executed by the determination unit 123 of the control unit 120 of the information processing device 100.

In step S203, the determination unit 123 of the control unit 120 of the information processing device 100 determines the presence or absence of the transition (change) of the automated driving level being executed by the mobile device 10.

The transition (change) of the automated driving level occurs due to, for example, a change in the allowable automated driving level set corresponding to the road section of the road on which the mobile device is traveling, or the like.

For example, in a case where the allowable automated driving level is level 3 in the road sections A and B of the road on which the mobile device 10 is traveling and the allowable automated driving level is level 4 in the next road sections B and C, the mobile device 10 automatically changes the automated driving level from level 3 to level 4.

Note that the change processing of the automated driving level in the mobile device 10 is executed under the control of the driving assistance processing unit 122 of the control unit 120 of the information processing device 100 in the mobile device 10.

The driving assistance processing unit 122 performs change processing of the automated driving level on the basis of, for example, an instruction from the control device 50.

Alternatively, the change processing of the automated driving level is performed on the basis of the allowable automated driving level information for each road section recorded in the map information received from the map information provision server 50b.

In a case where the determination unit 123 of the control unit 120 of the information processing device 100 determines in step S202 that the transition (change) of the automated driving level of the mobile device 10 is detected, the processing proceeds to step S203.

On the other hand, in step S202, in a case where the determination unit 123 determines that the transition (change) of the automated driving level of the mobile device 10 is not detected, the processing returns to step S201, and the processing of step S201 is continued.

(Step S203)

In a case where it is determined in step S202 that the transition (change) of the automated driving level of the mobile device 10 is detected, an allowable activity list in which the automated driving level and the activities allowed for the driver are associated with each other is acquired in step S203.

As described above with reference to FIG. 8, the allowable activity list is a table in which the automated driving level and the activities allowed for the driver are associated with each other.

The acquisition processing of the automated driving level-corresponding allowable activity list is executed by the driving assistance processing unit 122 of the control unit 120 of the information processing device 100.

In step S203, the driving assistance processing unit 122 of the control unit 120 of the information processing device 100 acquires the allowable activity list associated with the automated driving level.

The allowable activity list is a list in which the activities allowed for the driver are associated for each of the levels (levels 0 to 5) of the automated driving described above with reference to FIG. 2.

The driving assistance processing unit 122 of the control unit 120 of the information processing device 100 receives the automated driving level-corresponding allowable activity list from the control device 50 via the communication unit 110, for example.

Note that the automated driving level-corresponding allowable activity list can also be stored in the storage unit 131 in the information processing device 100 of the mobile device 10, and in this case, the driving assistance processing unit 122 of the control unit 120 of the information processing device 100 acquires the automated driving level-corresponding allowable activity list from the storage unit 131.

In step S203, the control unit 120 of the information processing device 100 acquires the automated driving level-corresponding allowable activity list in which the automated driving level and the activities allowed for the driver are associated as illustrated in FIG. 8.

(Step S204)

Next, in step S204, the control unit 120 of the information processing device 100 refers to the automated driving level-corresponding allowable activity list acquired in step S203, and analyzes a difference between the allowable activities before and after the transition of the automated driving level of the mobile device 10 detected in step S202.

This processing is executed by the driving assistance processing unit 122 of the control unit 120 of the information processing device 100.

The driving assistance processing unit 122 of the control unit 120 of the information processing device 100 analyzes a difference between the allowable activity before the transition of the automated driving level and the allowable activity after the transition.

For example, in a case where the automated driving level before the transition is level 3 and the automated driving level after the transition is level 4, the difference between the allowable activity corresponding to the automated driving level 3 and the allowable activity corresponding to the automated driving level 4 is analyzed.

(Step 205)

Next, in step S205, the control unit 120 of the information processing device 100 determines whether or not there is a difference in the allowable activities before and after the transition of the automated driving level as the difference analysis result in step S204.

This processing is executed by the driving assistance processing unit 122 of the control unit 120 of the information processing device 100.

In a case where the driving assistance processing unit 122 of the control unit 120 of the information processing device 100 determines in step S205 that there is a difference between the allowable activities before and after the transition of the automated driving level, the processing proceeds to step S206.

On the other hand, in a case where it is determined in step S205 that there is no difference between the allowable activities before and after the transition of the automated driving level, the processing is ended.

(Step S206)

The processing of step S206 is executed in a case where it is determined in step S205 that there is a difference between the allowable activities before and after the transition of the automated driving level.

This processing is executed by the driving assistance processing unit 122 of the control unit 120 of the information processing device 100.

In a case where the driving assistance processing unit 122 of the control unit 120 of the information processing device 100 determines in step S205 that there is a difference between the allowable activities before and after the transition of the automated driving level, in step S206, the allowable activity after the transition (change) of the automated driving level, that is, the allowable activity clearly indicating the difference due to the change of the automated driving level is output to the input and output unit 133 of the mobile device 10.

For example, a message describing an activity allowed for the driver is output via a display unit or a voice output unit constituting the input and output unit 133.

Note that it is preferable to provide notification of the difference between the allowable activities before and after the transition of the automated driving level so that the difference can be easily understood.

A notification example of the allowable activity corresponding to the automated driving level using the display unit will be described with reference to FIG. 15 and subsequent drawings.

Note that the change processing of the automated driving level has two different aspects of (a) level change processing of increasing the automated driving level, that is, level change processing of decreasing a ratio of human intervention regarding the driving operation, and (b) level change processing of decreasing the automated driving level, that is, level change processing of increasing the ratio of the human intervention regarding the driving operation.

In the following, the following cases will be described separately.

(a) Level change processing of increasing the automated driving level (b) Level change processing of decreasing the automated driving level In a case where the automated driving level is increased and the newly allowed activity is increased, it is necessary to notify the driver of at least the newly allowed activity.

First, with reference to FIGS. 15 and 16, an example of the display data of the display unit and the processing of the driving assistance processing unit 122 in a case where the automated driving level before the transition is level 3 and the automated driving level after the transition is level 4 will be described.

Figure 15:
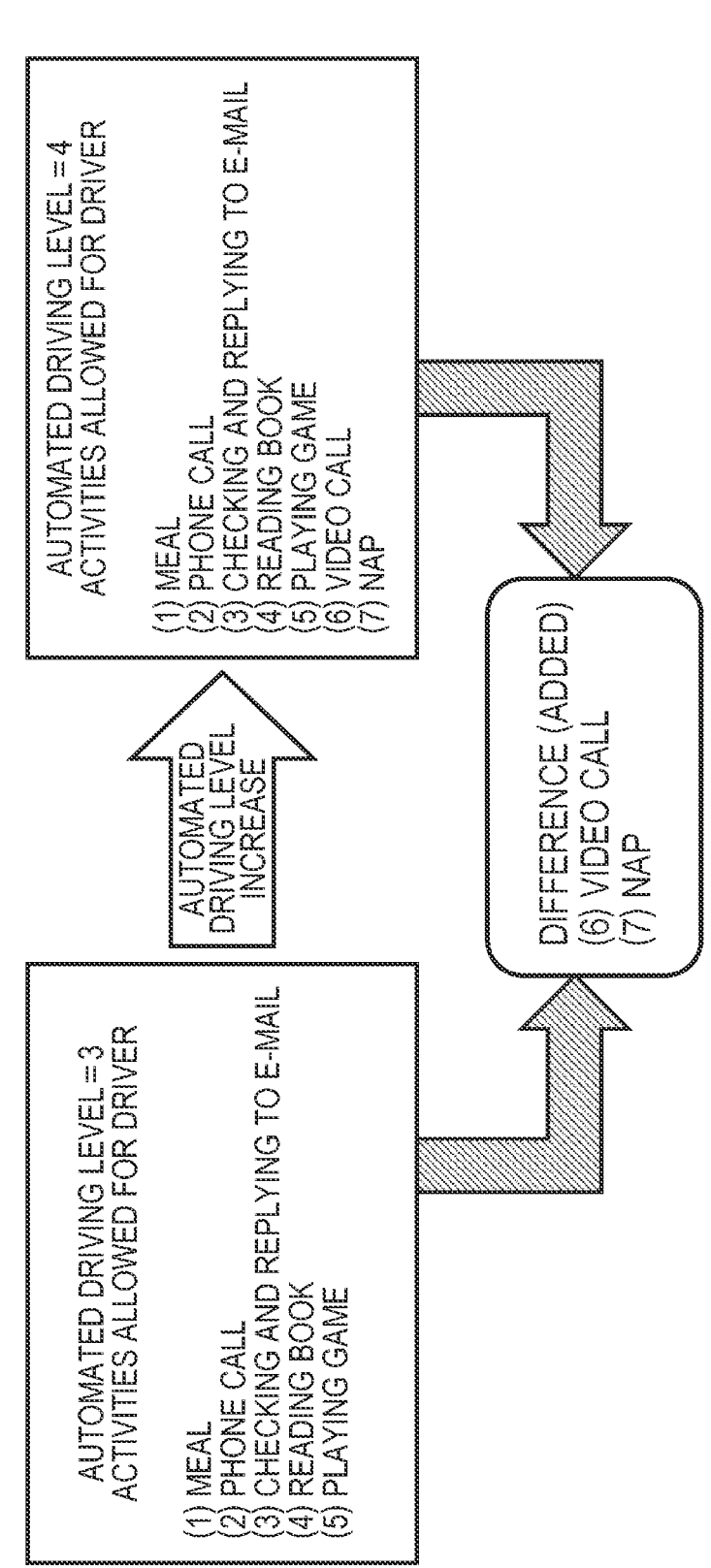
FIG. 15 is a diagram for describing an example of processing using an automated driving level-corresponding allowable activity list executed by an information processing device of the present disclosure.

FIG. 15 is a diagram illustrating a processing example executed by the driving assistance processing unit 122 of the control unit 120 of the information processing device 100 in steps S204 and S205 of the flow illustrated in FIG. 14.

In steps S204 and S205, the driving assistance processing unit 122 refers to the automated driving level-corresponding allowable activity list acquired in step S203, and analyzes a difference between the allowable activities before and after the transition of the automated driving level of the mobile device 10 detected in step S202.

The driving assistance processing unit 122 analyzes a difference between the allowable activity before the transition of the automated driving level and the allowable activity after the transition.

FIG. 15 illustrates the allowable activities of the automated driving level 3 and the allowable activities of the automated driving level 4 recorded in the automated driving level-corresponding allowable activity list.

As illustrated in FIG. 15, the allowable activities of the automated driving level 3 recorded in the automated driving level-corresponding allowable activity list are following five activities:

(1) a meal (2) a phone call (3) checking and replying to an e-mail (4) reading a book (5) playing a game On the other hand, the allowable activities of the automated driving level 4 recorded in the automated driving level-corresponding allowable activity list are following seven activities:

(1) a meal (2) a phone call (3) checking and replying to an e-mail (4) reading a book (5) playing a game (6) a video call (7) a nap In steps S204 and S205 of the flow illustrated in FIG. 14, the driving assistance processing unit 122 analyzes the difference between the allowable activities of the automated driving level 3 and the allowable activities of the automated driving level 4.

As can be understood from the data illustrated in FIG. 15, the difference between the allowable activities of the automated driving level 3 and the allowable activities of the automated driving level 4 is the following activities newly added as the allowable activities of the automated driving level 4, that is, following two activities.

(6) a video call (7) a nap

The driving assistance processing unit 122 determines that there is a difference between the allowable activities before and after the transition of the automated driving level to make the determination of Yes in the determination step of step S205 of the flow illustrated in FIG. 14, and the processing proceeds to step S206.

In step S206, the driving assistance processing unit 122 outputs the allowable activity after the transition (change) of the automated driving level, that is, the activity allowed for the driver associated with the automated driving level currently being executed by the mobile device 10, to the display unit of the mobile device 10.

For example, the driving assistance processing unit 122 generates display data that facilitates understanding of the difference between the allowable activities before and after the transition of the automated driving level, and displays the display data on the display unit.

FIG. 16 is a diagram illustrating an example of the display data generated by the driving assistance processing unit 122 and displayed on the display unit.

The display data illustrated in FIG. 16 is an example in which the following message is displayed.

"The automated driving level is changed from level 3 to level 4. The following (6) and (7) are added as the driver allowable activities at level 4.

(1) a meal (2) a phone call (3) checking and replying to an e-mail (4) reading a book (5) playing a game (6) a video call (7) a nap"

As illustrated in FIG. 16, newly added two activities of (6) a video call and (7) a nap are displayed in an emphasized manner, for example, by outputting the activities in a different color such as red, or by changing the size and displaying the activities in a larger size so that the activities stand out from the other activities (1) to (5). That is, different visual features are added to the display of these two activities.

For example, as illustrated in FIG. 16, the driving assistance processing unit 122 generates and outputs the display data for easy understanding of the difference between the allowable activities before and after the transition of the level.

The driver who is the user can see the display data of the display unit to check that the automated driving level of the mobile device 10 has transitioned from level 3 to level 4, and moreover, new activities of (6) a video call and (7) a nap are allowed in addition to the activities of (1) a meal, (2) a phone call, (3) checking and replying to an e-mail, (4) reading a book, and (5) playing a game which are allowed at level 3, as the activities allowed for the driver at the automated driving level 4 after the transition.

The user can check the allowable activities corresponding to the automated driving level 4 displayed on the display unit, and act in an effort to perform an action within a range of the displayed allowable activities.

Note that the notification processing of the allowable activity corresponding to the automated driving level is not limited to the display processing on the display unit as illustrated in FIG. 16, and the notification may be performed by voice information, for example.

Note that the example of the display data illustrated in FIG. 16 is an example, and other different display data may be generated and output.

An example in which display data different from the display data illustrated in FIG. 16 is generated and displayed will be described with reference to FIGS. 17 and 18.

Figure 17:
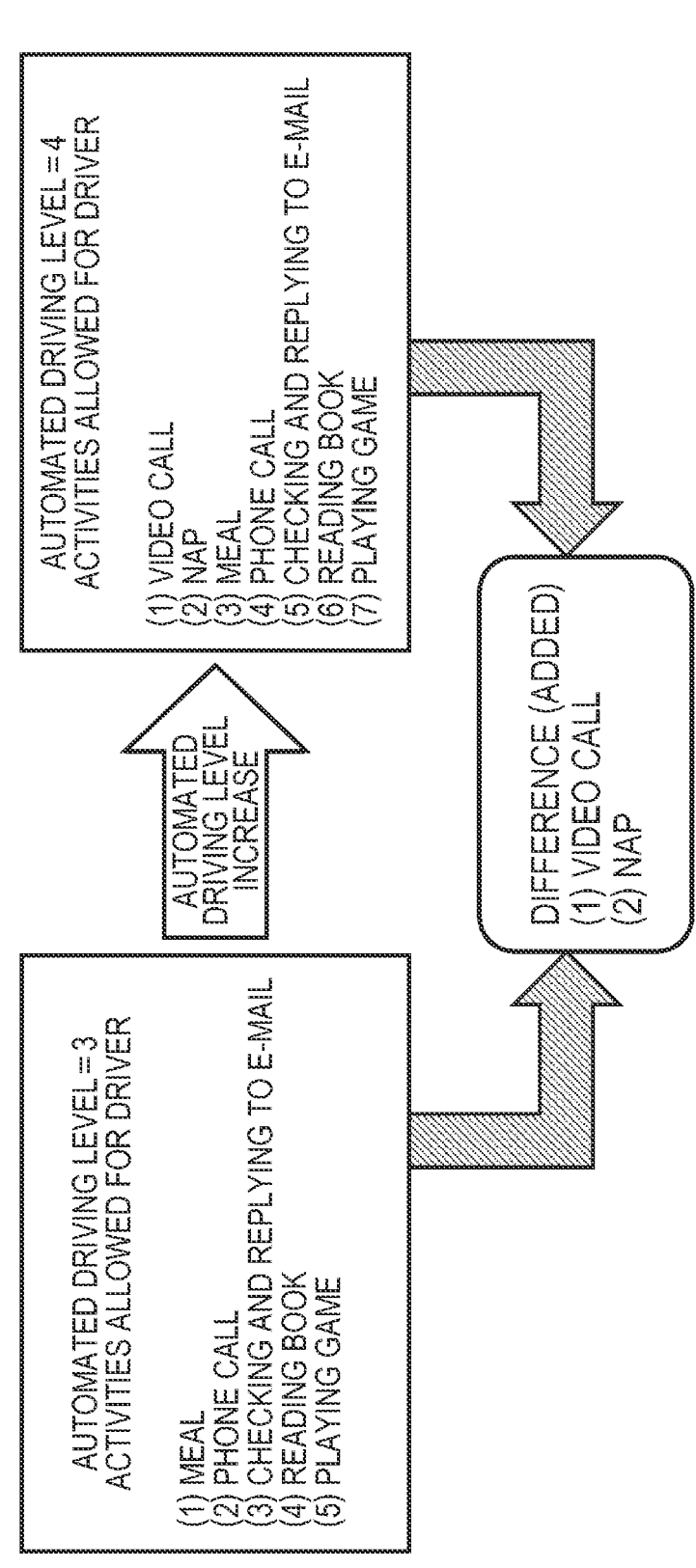
FIG. 17 is a diagram for describing an example of processing using an automated driving level-corresponding allowable activity list executed by an information processing device of the present disclosure.
Figure 18:
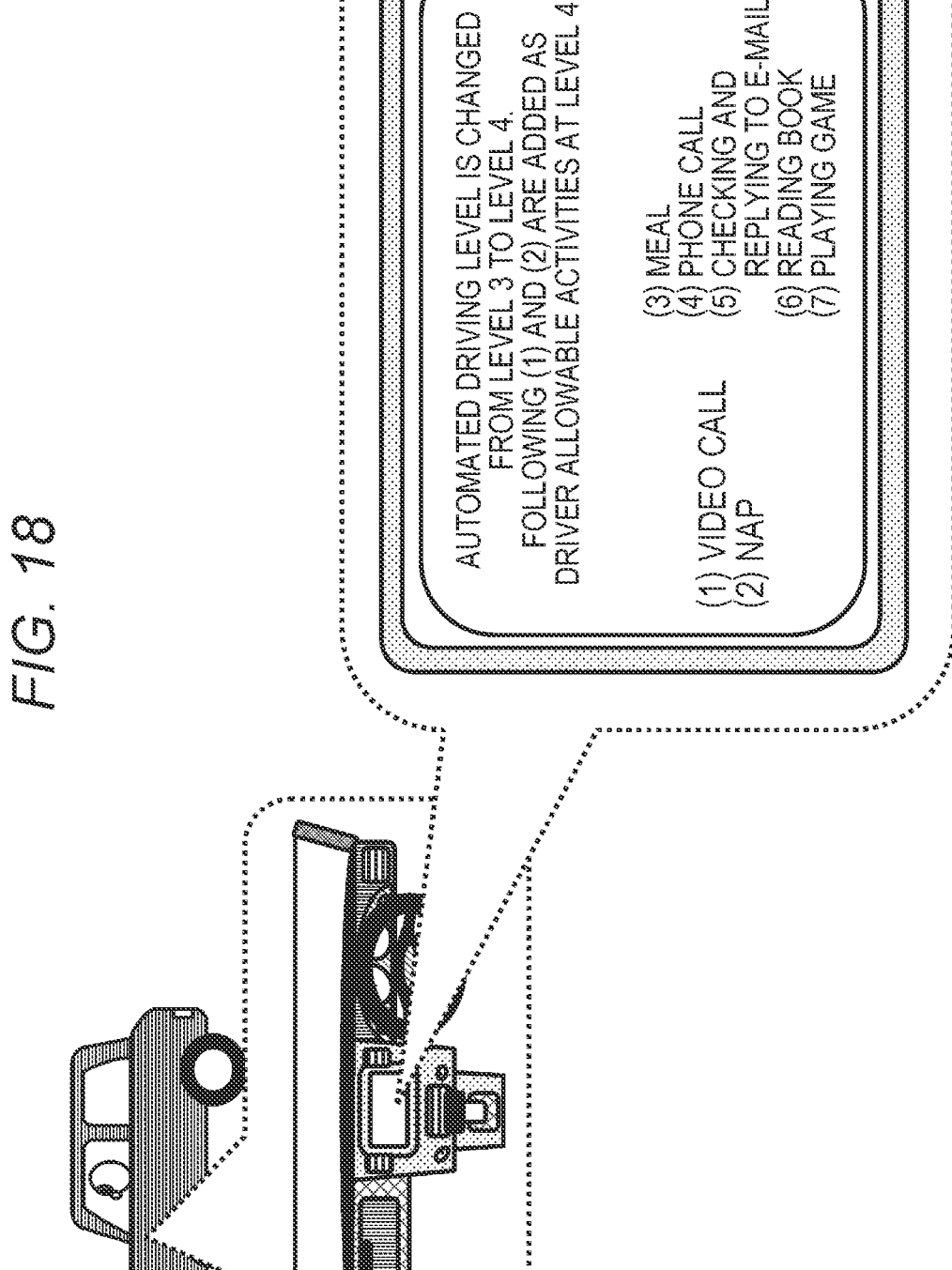
FIG. 18 is a diagram for describing an example of display data output by an information processing device of the present disclosure.

Similar to FIGS. 15 and 16, an example illustrated in FIGS. 17 and 18 is also an example of the display data of the display unit and the processing of the driving assistance processing unit 122 in a case where the automated driving level before the transition is level 3 and the automated driving level after the transition is level 4.

FIG. 17 is a diagram illustrating a processing example executed by the driving assistance processing unit 122 of the control unit 120 of the information processing device 100 in steps S204 and S205 of the flow illustrated in FIG. 14.

In steps S204 and S205, the driving assistance processing unit 122 refers to the allowable activity list associated with the automated driving level acquired in step S203, and analyzes a difference between the allowable activities before and after the transition of the automated driving level of the mobile device 10 detected in step S202.

The driving assistance processing unit 122 analyzes a difference between the allowable activity before the transition of the automated driving level and the allowable activity after the transition.

Although FIG. 17 illustrates the allowable activities of the automated driving level 3 and the allowable activities of the automated driving level 4 which are recorded in the allowable activity list associated with the automated driving level, unlike the example described above with reference to FIG. 15, activities ((1) a video call, (2) a nap) corresponding to the difference that is not included in the allowable activities at the automated driving level 3 and is newly added only to the allowable activities at the automated driving level 4 are set as the head data of the allowable activities at the driving level 4.

In this manner, after setting the difference data at the beginning, the driving assistance processing unit 122 generates display data that facilitates understanding of the difference between the allowable activities before and after the transition of the automated driving level, and displays the display data on the display unit, in step S206 of the flow illustrated in FIG. 14.

FIG. 18 is an example of the display data generated by the driving assistance processing unit 122 and displayed on the display unit.

The display data illustrated in FIG. 18 is an example in which the following message is displayed.

"The automated driving level is changed from level 3 to level 4. The following (1) and (2) are added as the driver allowable activities at level 4.

(1) a video call (2) a nap (3) a meal (4) a phone call (5) checking and replying to an e-mail (6) reading a book (7) playing a game"

As illustrated in FIG. 18, newly added two activities of (1) a video call and (2) a nap are displayed at a position preceding the other activities (3) to (7), and moreover, displayed in an emphasized manner, for example, by outputting the activities in a different color such as red, or by changing the size and displaying the activities in a larger size so that the activities stand out.

For example, as illustrated in FIG. 18, the driving assistance processing unit 122 generates and outputs the display data for easy understanding of the difference between the allowable activities before and after the transition of the level.

The driver who is the user can see the display data of the display unit to check that the automated driving level of the mobile device 10 has transitioned from level 3 to level 4, and moreover, new activities of (1) a video call and (2) a nap are allowed in addition to the activities which are allowed at level 3, as the activities allowed for the driver at the automated driving level 4 after the transition.

The user can check the allowable activities corresponding to the automated driving level 4 displayed on the display unit, and act in an effort to perform an action within a range of the displayed allowable activities.

Note that the notification processing of the allowable activity corresponding to the automated driving level is not limited to the display processing on the display unit as illustrated in FIG. 18, and the notification may be performed by voice information, for example.

The processing example described with reference to FIGS. 15 to 18 is an example of the display data of the display unit and the processing of the driving assistance processing unit 122 in a case where the automated driving level before the transition is level 3 and the automated driving level after the transition is level 4. Furthermore, "a video call" and "a nap" as the new activities are examples, and may be other activities.

Next, with reference to FIGS. 19 and 20, an example of the display data of the display unit and the processing of the driving assistance processing unit 122 in a case where the automated driving level before the transition is level 4 and the automated driving level after the transition is level 3, that is, in a case where the automated driving level is shifted to a lower level will be described.

Figure 19:
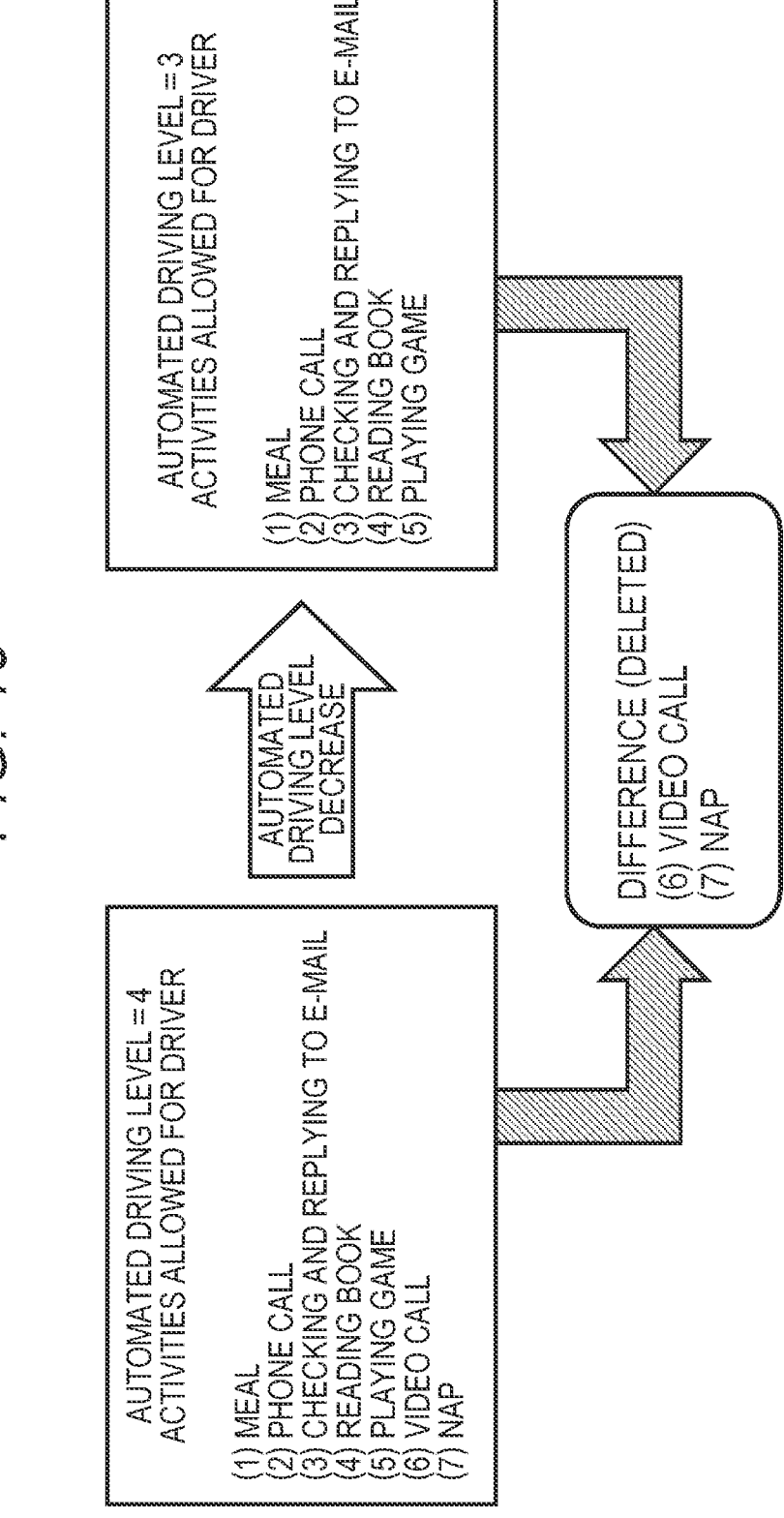
FIG. 19 is a diagram for describing an example of processing using an automated driving level-corresponding allowable activity list executed by an information processing device of the present disclosure.

FIG. 19 is a diagram illustrating a processing example executed by the driving assistance processing unit 122 of the control unit 120 of the information processing device 100 in steps S204 and S205 of the flow illustrated in FIG. 14.

In steps S204 and S205, the driving assistance processing unit 122 refers to the allowable activity list associated with the automated driving level acquired in step S203, and analyzes a difference between the allowable activities before and after the transition of the automated driving level of the mobile device 10 detected in step S202.

The driving assistance processing unit 122 analyzes a difference between the allowable activity before the transition of the automated driving level and the allowable activity after the transition.

FIG. 19 illustrates the allowable activities of the automated driving level 4 before the transition of the automated driving level and the allowable activities of the automated driving level 3 after the transition.

The allowable activities of the automated driving level 3 after the transition does not include (6) a video call and (7) a nap which are included in the allowed activities of the automated driving level 4 before the transition, and these activities are extracted as the difference.

In step S206 of the flow illustrated in FIG. 14, the driving assistance processing unit 122 generates display data that facilitates understanding of the difference data, and displays the generated display data on the display unit.

FIG. 20 is an example of the display data generated by the driving assistance processing unit 122 and displayed on the display unit.

The display data illustrated in FIG. 20 is an example in which the following message is displayed.

"The automated driving level is changed from level 4 to level 3. Due to the change from level 4 to level 3, the activities of the following items (NG) are deleted from the driver allowable activities.

(1) a meal
(2) a phone call
(3) checking and replying to an e-mail
(4) reading a book
(5) playing a game
(NG) a video call
(NG) a nap"

As illustrated in FIG. 20, the two allowable activities of (NG) a video call and
(NG) a nap that are deleted due to the level decrease of the automated driving level are displayed together with the other activities of (1) to (5), and are displayed as the display data to notify the user (driver) that the activities are not allowed at the current automated driving level.

For example, as illustrated in FIG. 20, the driving assistance processing unit 122 generates and outputs the display data for easy understanding of the difference between the allowable activities before and after the transition of the level. For example, the difference data is displayed in an emphasized manner by being output in a different color such as red, or by being displayed in a larger size by changing the size thereof. That is, different visual features are added to the display of the difference data.

Note that, in the example illustrated in FIG. 20, an example is illustrated in which the activity that is no longer allowed for the driver is set to (NG), but for example, a cross mark (X) is also displayed in addition to (NG). Alternatively, various notations that allow the driver to recognize prohibited activities, such as setting in which a mark including a red circle and an oblique line, which are marks generally indicating prohibition, are written together, are possible.

The driver who is the user can see the display data of the display unit to check that the automated driving level of the mobile device 10 is decreased from level 4 to level 3, and moreover, to check the types of activities allowed for the driver at the automated driving level 3 after the transition and the prohibited activities of (NG) a video call and
(NG) a nap which are activities no longer allowed for the driver according to the level transition from level 4 to level 3.

The user can check the allowable activities corresponding to the automated driving level 3 displayed on the display unit, and act in an effort to perform an action within a range of the displayed allowable activities.

Note that the notification processing of the allowable activity corresponding to the automated driving level is not limited to the display processing on the display unit as illustrated in FIG. 20, and the notification may be performed by voice information, for example.

[7. Regarding Processing Sequence of Analyzing Check State of Driver for Difference Notification of Allowable Activity Associated with Transition of Automated Driving Level and Performing Emergency Response in Case where Notification is not Checked]

Next, the processing sequence of analyzing the check state of the driver for the difference notification of the allowable activity associated with the transition of the automated driving level and performing the emergency response in a case where the notification is not checked will be described.

The processing sequence described with reference to the flowchart illustrated in FIG. 14 is a processing sequence that notifies the driver of the difference between the allowable activities according to the change in the automated driving level for easy understanding in a case where the automated driving level is changed.

However, an analysis as to whether or not the driver has checked this notification is not executed.

The processing described below is processing of analyzing the check state of the driver for the difference notification of the allowable activity and performing the emergency response in a case where the notification is not checked.

A sequence of the processing will be described with reference to the flowchart illustrated in FIG. 21.

Figure 21:
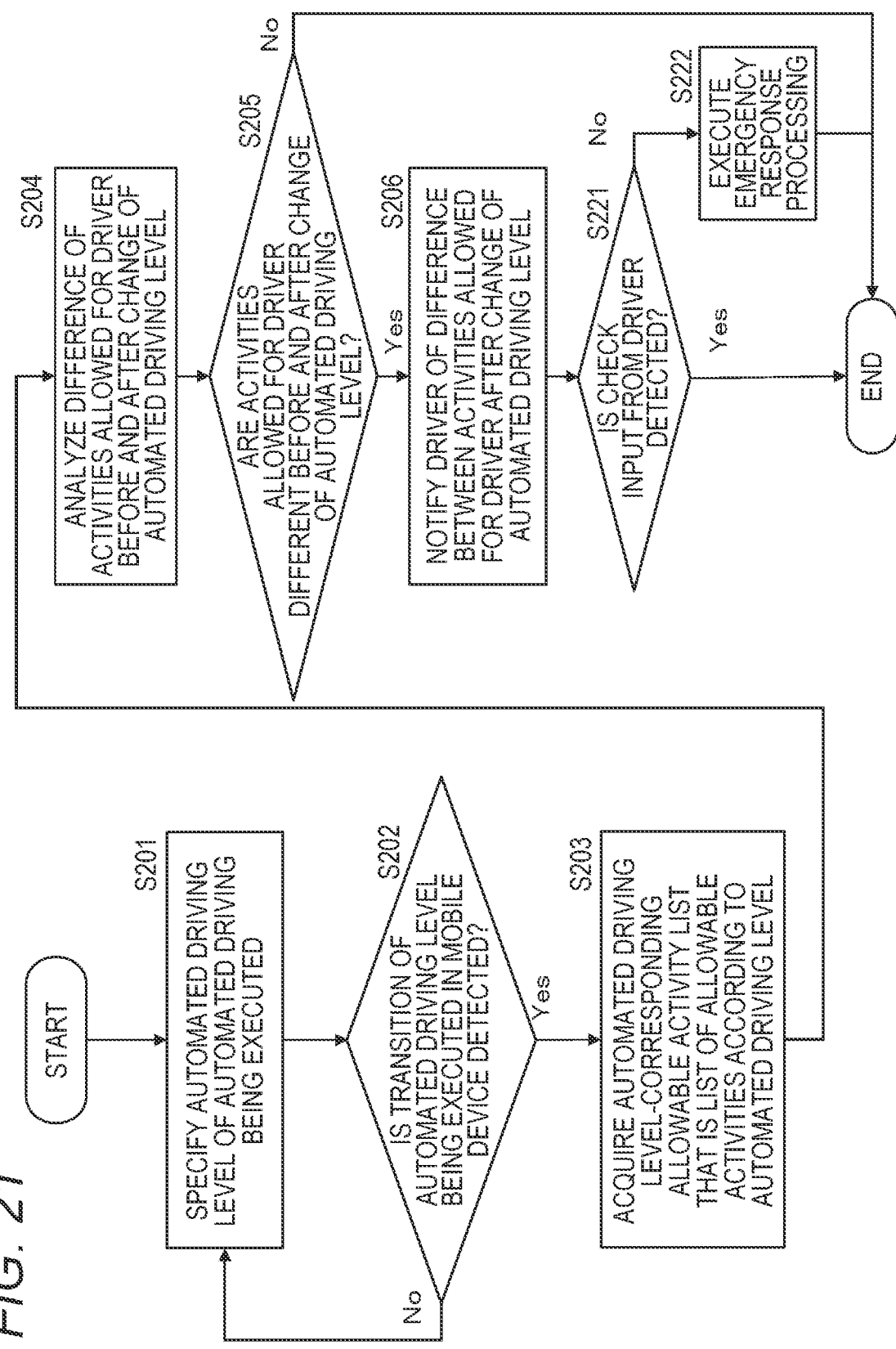
FIG. 21 is a diagram illustrating a flowchart for describing a processing sequence executed by an information processing device of the present disclosure.

The flowchart illustrated in FIG. 21 is a flow in which steps S221 and S222 are added after step S206 of the flowchart illustrated in FIG. 14 described above.

Hereinafter, the processing of each step of the flowchart illustrated in FIG. 21 will be described.

(Steps S201 to S206)

The processing of steps S201 to S206 is similar to the processing described with reference to FIG. 14.

The processing will be briefly described.

First, in step S201, the control unit 120 of the information processing device 100 specifies the level of the automated driving currently being executed by the mobile device 10.

Next, in step S202, the presence or absence of the transition (change) of the automated driving level being executed by the mobile device 10 is determined.

In a case where the determination unit 123 of the control unit 120 of the information processing device 100 determines in step S202 that the transition (change) of the automated driving level of the mobile device 10 is detected, the processing proceeds to step S203.

On the other hand, in step S202, in a case where the determination unit 123 determines that the transition (change) of the automated driving level of the mobile device 10 is not detected, the processing returns to step S201, and the processing of step S201 is continued.

In a case where it is determined in step S202 that the transition (change) of the automated driving level of the mobile device 10 is detected, an allowable activity list in which the automated driving level and the activities allowed for the driver are associated with each other is acquired in step S203.

Next, in step S204, the control unit 120 of the information processing device 100 refers to the allowable activity list acquired in step S203, and analyzes a difference between the allowable activities before and after the transition of the automated driving level of the mobile device 10 detected in step S202.

Next, in step S205, the control unit 120 of the information processing device 100 determines whether or not there is a difference in the allowable activities before and after the transition of the automated driving level as the difference analysis result in step S204.

In a case where it is determined that there is a difference between the allowable activities before and after the transition of the automated driving level, the processing proceeds to step S206.

On the other hand, in a case where it is determined in step S205 that there is no difference between the allowable activities before and after the transition of the automated driving level, the processing is ended.

The processing of step S206 is executed in a case where it is determined in step S205 that there is a difference between the allowable activities before and after the transition of the automated driving level.

This processing is executed by the driving assistance processing unit 122 of the control unit 120 of the information processing device 100.

In a case where the driving assistance processing unit 122 of the control unit 120 of the information processing device 100 determines in step S205 that there is a difference between the allowable activities before and after the transition of the automated driving level, in step S206, the allowable activity after the transition (change) of the automated driving level, that is, the allowable activity clearly indicating the difference due to the change of the automated driving level is output to the input and output unit 133 of the mobile device 10.

The processing up to this point is similar to the processing described with reference to FIG. 14.

(Step S221)

Next, in step S221, the control unit 120 of the information processing device 100 determines whether or not a check input from the driver is detected for the allowable activity clearly indicating the difference due to the change of the automated driving level notification of which is provided to the driver in step S206.

FIG. 22 illustrates an example of a user interface that enables detection of the check input from the driver.

FIG. 22 illustrates display data obtained by adding the check button 201 for the user's input to the display data similar to the notification example of the difference between the allowable activities due to the change of the automated driving level described above with reference to FIG. 16.

The display unit is a touch panel, and in a case where the user (driver) touches the check button 201, a detection signal indicating that check by the user has been performed is input to the control unit 120 of the information processing device 100.

In step S221 of the flow illustrated in FIG. 21, the presence or absence of the detection signal is determined.

In a case where the user (driver) touches the check button 201 and the detection signal is input to the control unit 120 of the information processing device 100, the determination in step S221 is Yes. That is, it is determined that the driver has checked the allowable activity clearly indicating the difference due to the change of the automated driving level displayed on the display unit, and the processing is ended.

On the other hand, in a case where the detection signal is not input to the control unit 120 of the information processing device 100 without the user (driver) touching the check button 201 within a predetermined time, for example, 10 seconds, the determination in step S221 is No. That is, it is determined that the driver has not checked the allowable activity clearly indicating the difference due to the change of the automated driving level displayed on the display unit.

In this case, the processing proceeds to step S222.

(Step S222)

In the determination processing of step S221, in a case where it is determined that the driver has not checked the allowable activity clearly indicating the difference due to the change of the automated driving level displayed on the display unit, the processing proceeds to step S222.

In this case, the control unit 120 of the information processing device 100 executes emergency response processing in step S222.

For example, the emergency response processing is any one of (a) emergency stop of the mobile device 10;

(b) switching the mobile device 10 to slow driving; and (c) outputting a warning sound, or processing obtained by combining a plurality of the processing.

For example, in a case where it is determined that the allowable activity clearly indicating the difference due to the change of the automated driving level displayed on the display unit has not been checked, the driving assistance processing unit 122 of the control unit 120 performs the emergency stop of the mobile device 10 and outputs the warning sound as the emergency response processing.

By executing such emergency response processing, it is possible to avoid a situation in which the mobile device 10 travels while the driver is performing an activity that is not allowed, and it is possible to prevent an accident in advance.

[8. Regarding Processing Sequence of Monitoring Action of Driver after Difference Notification of Allowable Activity Associated with Transition of Automated Driving Level and Performing Emergency Response in Case where Driver is Executing Non-Allowable Activity]

Next, the processing sequence of monitoring the action of the driver after the difference notification of the allowable activity associated with the transition of the automated driving level and performing the emergency response in a case where the driver is executing the non-allowable activity will be described.

A sequence of the processing will be described with reference to the flowchart illustrated in FIG. 23.

Figure 23:
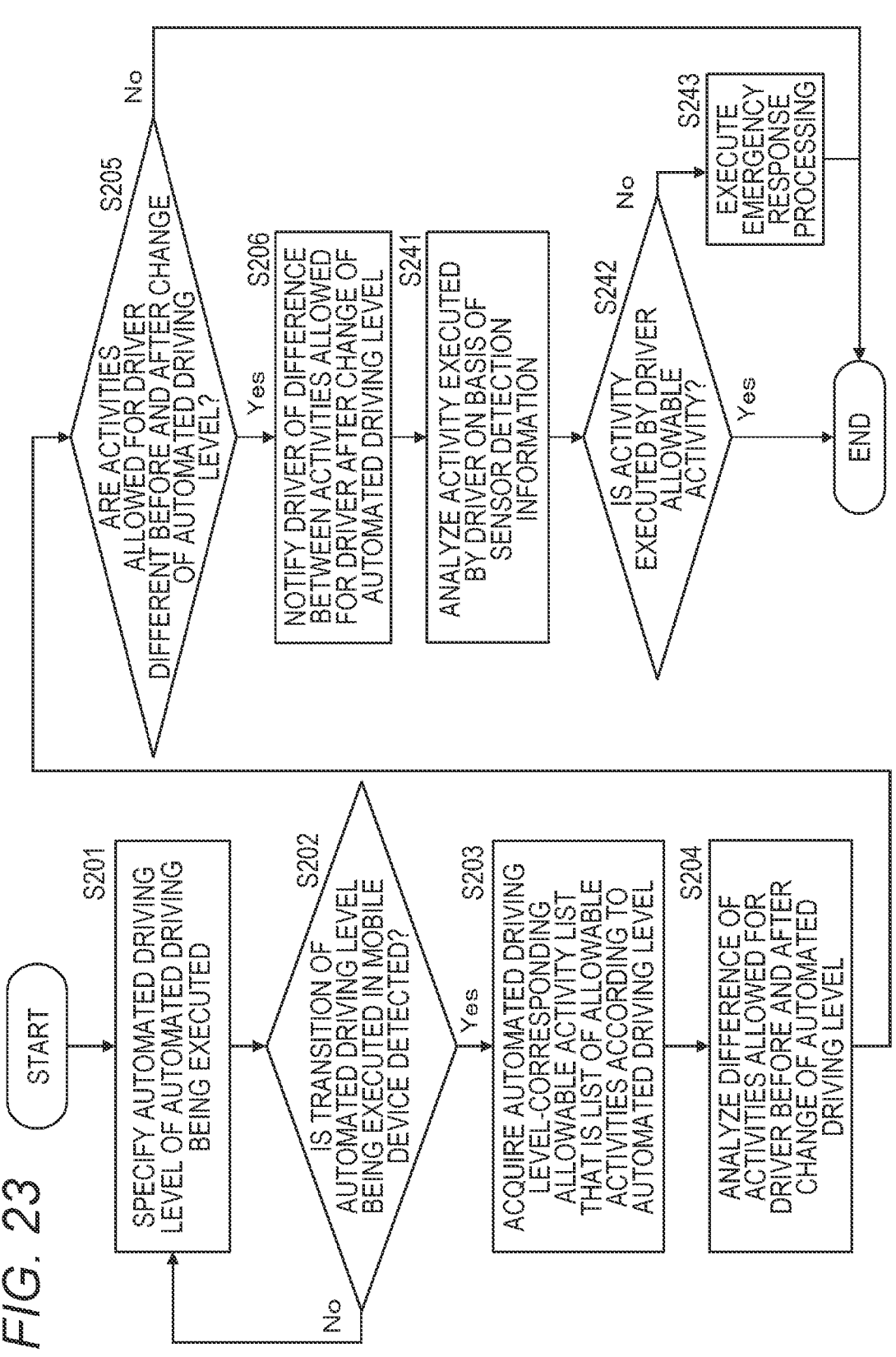
FIG. 23 is a diagram illustrating a flowchart for describing a processing sequence executed by an information processing device of the present disclosure.

The flowchart illustrated in FIG. 23 is a flow in which steps S241 to S243 are added after step S206 of the flowchart illustrated in FIG. 14 described above.

Hereinafter, the processing of each step of the flowchart illustrated in FIG. 23 will be described.
(Steps S201 to S206)

The processing of steps S201 to S206 is similar to the processing described with reference to FIG. 14.

The processing will be briefly described.

First, in step S201, the control unit 120 of the information processing device 100 specifies the level of the automated driving currently being executed by the mobile device 10.

Next, in step S202, the presence or absence of the transition (change) of the automated driving level being executed by the mobile device 10 is determined.

In a case where the determination unit 123 of the control unit 120 of the information processing device 100 determines in step S202 that the transition (change) of the automated driving level of the mobile device 10 is detected, the processing proceeds to step S203.

On the other hand, in step S202, in a case where the determination unit 123 determines that the transition (change) of the automated driving level of the mobile device 10 is not detected, the processing returns to step S201, and the processing of step S201 is continued.

In a case where it is determined in step S202 that the transition (change) of the automated driving level of the mobile device 10 is detected, an allowable activity list in which the automated driving level and the activities allowed for the driver are associated with each other is acquired in step S203.

Next, in step S204, the control unit 120 of the information processing device 100 refers to the allowable activity list acquired in step S203, and analyzes a difference between the allowable activities before and after the transition of the automated driving level of the mobile device 10 detected in step S202.

Next, in step S205, the control unit 120 of the information processing device 100 determines whether or not there is a difference in the allowable activities before and after the transition of the automated driving level as the difference analysis result in step S204.

In a case where it is determined that there is a difference between the allowable activities before and after the transition of the automated driving level, the processing proceeds to step S206.

On the other hand, in a case where it is determined in step S205 that there is no difference between the allowable activities before and after the transition of the automated driving level, the processing is ended.

The processing of step S206 is executed in a case where it is determined in step S205 that there is a difference between the allowable activities before and after the transition of the automated driving level.

This processing is executed by the driving assistance processing unit 122 of the control unit 120 of the information processing device 100.

In a case where the driving assistance processing unit 122 of the control unit 120 of the information processing device 100 determines in step S205 that there is a difference between the allowable activities before and after the transition of the automated driving level, in step S206, the allowable activity after the transition (change) of the automated driving level, that is, the allowable activity clearly indicating the difference due to the change of the automated driving level is output to the input and output unit 133 of the mobile device 10.

The processing up to this point is similar to the processing described with reference to FIG. 14.
(Step S241)

Next, in step S241, the control unit 120 of the information processing device 100 analyzes the action of the driver on the basis of the sensor detection information.

Note that, in a case where the processing of the present embodiment is performed, a sensor such as a camera that acquires information for analyzing the action of the driver in the vehicle is required.

The configuration of the sensor unit 131 in a case where the present embodiment is performed is the configuration described above with reference to FIG. 13. That is, the sensor unit 131 has a configuration in which the driver monitoring sensor 156 is added to the sensor unit 131 described above with reference to FIG. 6.

The driver monitoring sensor 156 is a sensor that acquires information for analyzing the action of the driver in the vehicle, and includes, for example, a camera, a microphone, an odor sensor, a distance sensor, and the like.

The data collection unit 121 of the control unit 120 inputs information acquired by the driver monitoring sensor 156, and inputs the acquired information to the determination unit 123.

The determination unit 123 analyzes the information acquired by the driver monitoring sensor 156, and estimates the activity that is being performed by the driver. This estimation may be performed on the basis of an output result obtained by inputting the information acquired by the driver monitoring sensor 156 to a neural network model generated by AI, for example, machine learning or deep learning.
(Step S242)

In step S242, it is determined whether or not the activity for the driver estimated in step S241 is an allowable activity corresponding to the current automated driving level.

This processing is executed by the determination unit 123 of the control unit 120.

The determination unit 123 determines whether or not the estimated activity for the driver is an allowable activity corresponding to the current automated driving level.

In a case where it is determined that the activity for the driver is the allowable activity corresponding to the current automated driving level, the processing is ended.

On the other hand, in a case where it is determined that the activity for the driver is not the allowable activity corresponding to the current automated driving level, the processing proceeds to step S243.
(Step S243)

In a case where it is determined in the determination processing of step S242 that the driver is executing an activity which is not the allowable activity corresponding to the current automated driving level, the processing proceeds to step S243.

In this case, the control unit 120 of the information processing device 100 executes emergency response processing in step S243.

For example, the emergency response processing is any one of (a) emergency stop of the mobile device 10;

(b) switching the mobile device 10 to slow driving; and (c) outputting a warning sound, or processing obtained by combining a plurality of the processing.

For example, in a case where it is determined that the driver is executing an activity which is not an allowable activity corresponding to the current automated driving level, the driving assistance processing unit 122 of the control unit 120 performs an emergency stop of the mobile device 10 and outputs a warning sound as the emergency response processing.

By executing such emergency response processing, it is possible to avoid a situation in which the mobile device 10 travels while the driver is performing an activity that is not allowed, and it is possible to prevent an accident in advance.

[9. Regarding Other Processing Examples Executed by Information Processing Device of Present Disclosure]

Next, other processing examples executed by the information processing device of the present disclosure will be described.

The following two processing examples will be described.

(Processing example a) Processing example of selecting and providing notification of allowable activity according to user's request (Processing example b) Processing example of selecting and providing notification of allowable activity in consideration of duration of automated driving level

[9-a. (Processing Example a) Processing Example of Selecting and Providing Notification of Allowable Activity According to User's Request]

First, as (processing example a), a processing example of selecting and providing notification of the allowable activity according to the user's request will be described.

As described above with reference to FIG. 8, all the allowable activities associated with each automated driving level are recorded in the automated driving level-corresponding allowable activity list in which the automated driving level and the activities allowed for the driver are associated with each other.

For example, the allowable activities in a case where the automated driving level is level 3 are following five activities:

(1) a meal (2) a phone call (3) checking and replying to an e-mail (4) reading a book (5) playing a game However, the driver who is the user hardly performs all of these five activities.

In a case where the driver wants to do one of these five allowable activities, for example, "a meal", it is sufficient that notification of "a meal" is provided as the allowable activity, and information on other allowable activities is unnecessary.

For example, a desired activity is displayed on the basis of the preference of the driver. The driver sets a desired action in advance, and only the activity belonging to the set action is displayed in a case where the activity allowed at a certain automated driving level is displayed. For example, the activities allowed for the driver in a case where the automated driving level is the automated driving level 3 include a meal, a phone call, replying to an e-mail, reading a book, and playing a game.

Here, by the driver setting the desired action in advance, only the activity belonging to the action desired by the driver is displayed in a case where the activity belonging to the action desired by the driver is included in the activity allowed for the driver at the current automated driving level.

For example, in a case where "the driver has a meal" is set as the desired action, only "a meal" is displayed as the activity allowed for the driver in a case where the automated driving level is the automated driving level 3. Alternatively, in a case where "the driver contacts someone" is set as the desired action, only "a phone call and replying to an e-mail" are displayed as the activities allowed for the driver in a case where the automated driving level is the automated driving level 3.

Alternatively, in a case where "the driver plays" is set as the desired action, only "playing a game" is displayed as the activity allowed for the driver in a case where the automated driving level is the automated driving level 3.

Note that in a case where an action desired by the driver is set, a priority order may be set. In a case where the activity allowed for the driver is displayed, the activity allowed for the driver may be displayed on the basis of a priority order of the set desired actions.

A specific example will be described with reference to FIG. 24 and subsequent drawings. The driver of the mobile device 10 executes such an utterance of "I want to have a meal"

toward an input unit, for example, a microphone, of the input and output unit 133 of the information processing device 100.

The driving assistance processing unit 122 of the control unit 120 of the information processing device 100 executes voice recognition of the user utterance and utterance semantic analysis processing, and interprets that the user (driver) wants to have a meal.

The driving assistance processing unit 122 outputs a message indicating the current automated driving level and whether or not meals are available at the level, to the display unit on the basis of the analysis result.

Figure 24:
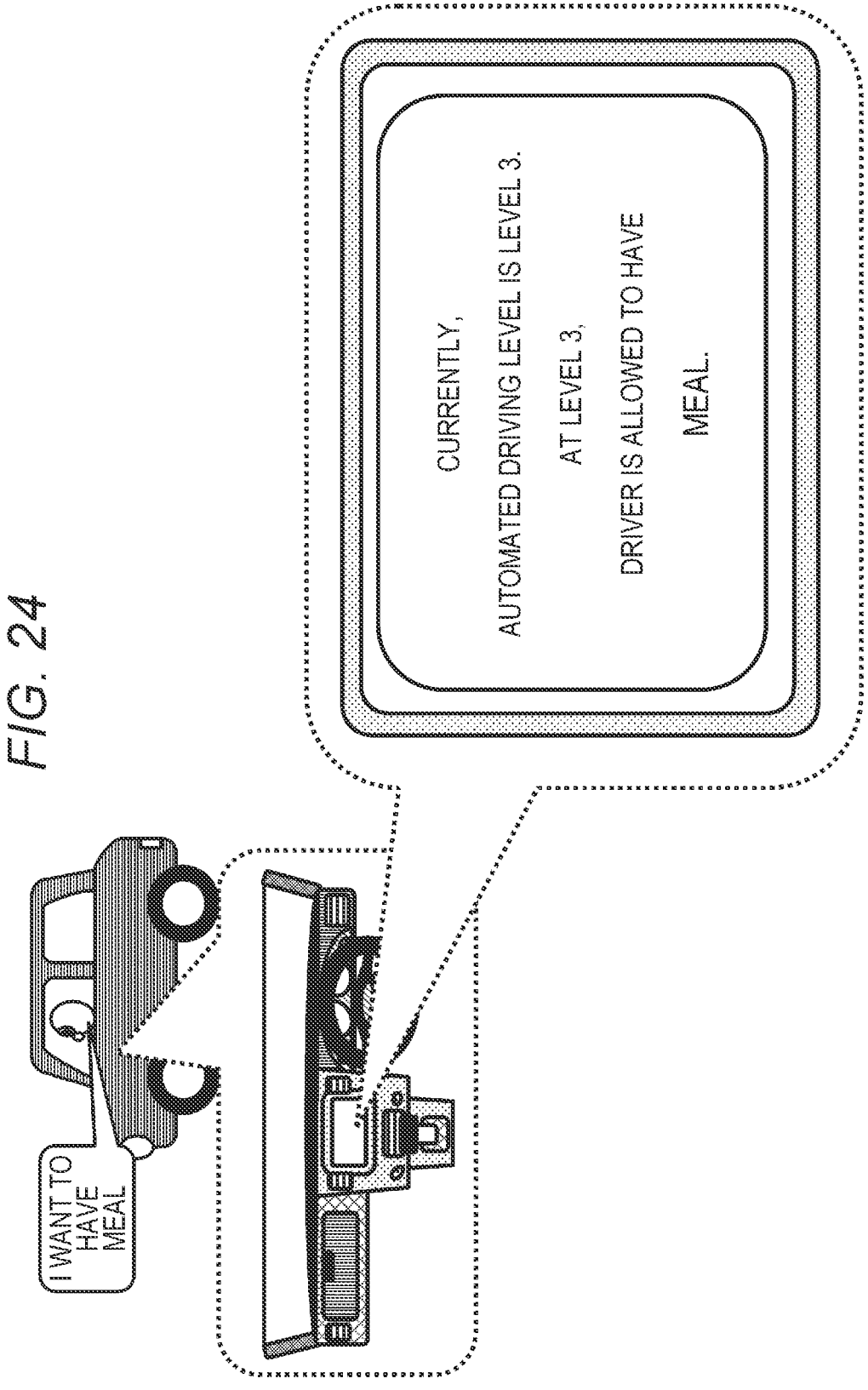
FIG. 24 is a diagram for describing an example of display data output by an information processing device of the present disclosure.

FIG. 24 illustrates an example of the display data generated by the driving assistance processing unit 122 and displayed on the display unit.

The display data illustrated in FIG. 24 is an example in which the following message is displayed.

"Currently, the automated driving level is level 3. At level 3, the driver is allowed to have a 'meal'."

For example, as illustrated in FIG. 24, the driving assistance processing unit 122 generates and outputs a message indicating whether or not the activity (=meal) requested by the user is allowed.

The driver who is the user can see the display data displayed on the display unit to check that the automated driving level of the mobile device 10 is level 3, and moreover, a "meal" is an activity allowed for the driver at the automated driving level 3.

The user can check that a "meal" is included as the allowable activity corresponding to the automated driving level 3 displayed on the display unit, and can start to have a "meal" with a sense of security.

Note that, in the example illustrated in FIG. 24, since the automated driving level of the mobile device 10 is level 3, a "meal" is allowed, but, for example, in a case where the automated driving level of the mobile device 10 is level 2 or less, a "meal" is not an allowable activity.

An example of the display data in this case will be described with reference to FIG. 25.

Figure 25:
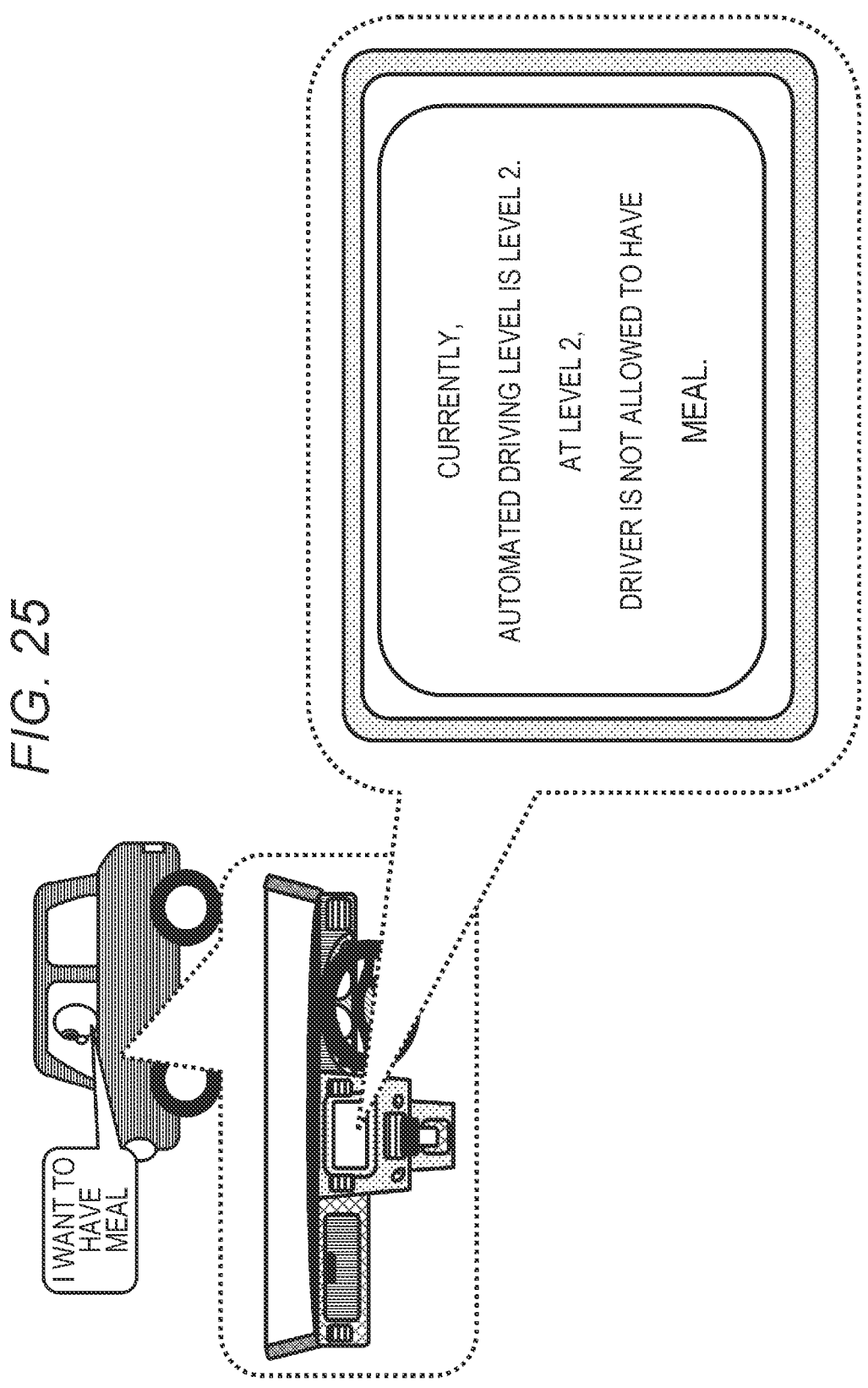
FIG. 25 is a diagram for describing an example of display data output by an information processing device of the present disclosure.

FIG. 25 is an example of the display data generated by the driving assistance processing unit 122 and displayed on the display unit.

The display data illustrated in FIG. 25 is an example in which the following message is displayed.

"Currently, the automated driving level is level 2. At level 2, the driver is not allowed to have a 'meal'."

For example, as illustrated in FIG. 25, the driving assistance processing unit 122 generates and outputs a message indicating that the activity (=meal) requested by the user is not allowed.

The driver who is the user can see the display data displayed on the display unit to check that the automated driving level of the mobile device 10 is level 2, and moreover, a "meal" is not an activity allowed for the driver at the automated driving level 2.

The user can check that a "meal" is not included as the allowable activity corresponding to the automated driving level 2 displayed on the display unit, and can stop having a "meal".

Note that means for providing notification of whether or not the activity (=meal) requested by the user is allowed is not limited to display on the display unit, and may be notification by voice information.

An example of the display data in a case where the driver's request is other than a "meal" will be described with reference to FIGS. 26 and 27.

Figure 26:
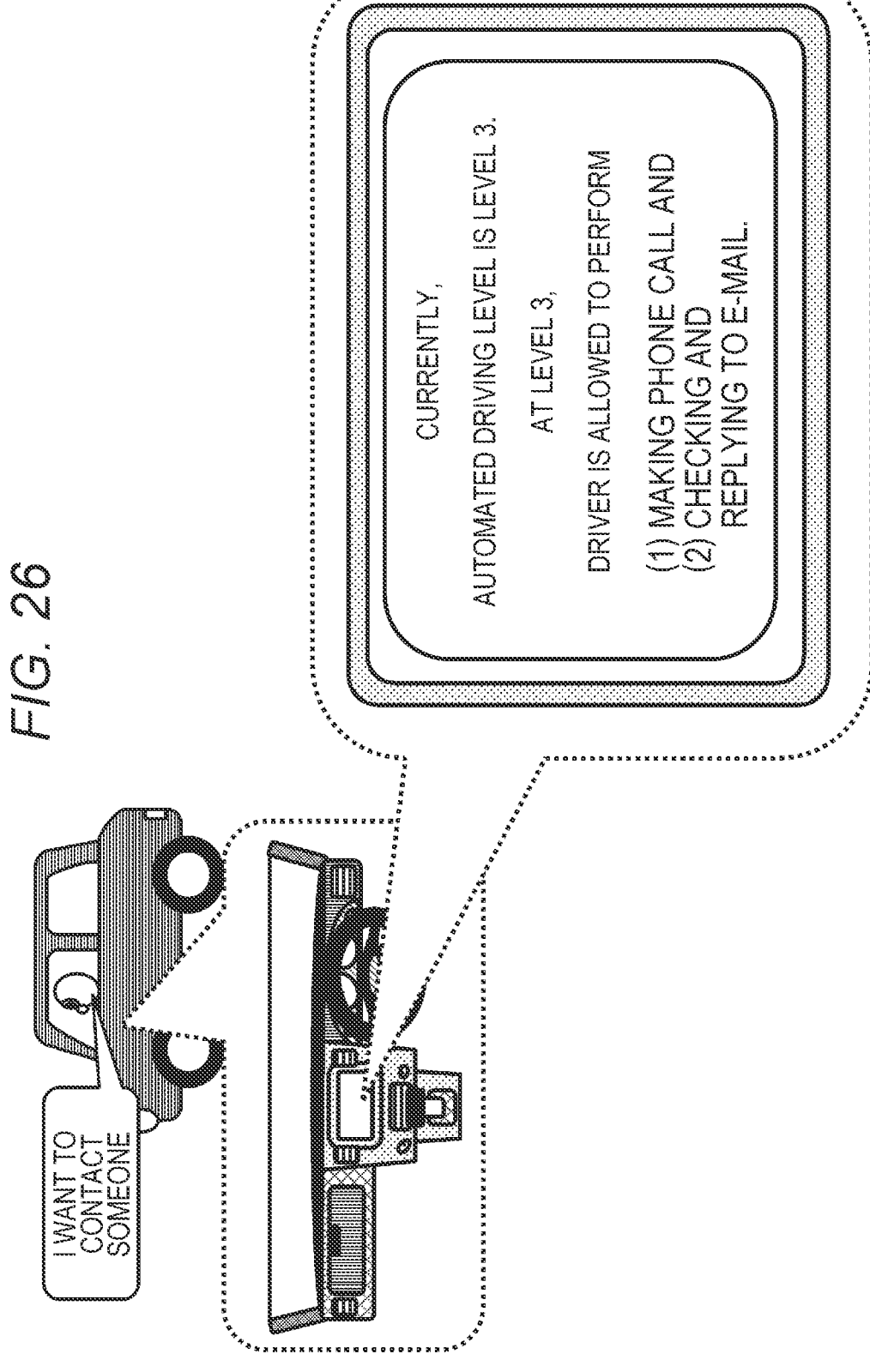
FIG. 26 is a diagram for describing an example of display data output by an information processing device of the present disclosure.

The example illustrated in FIG. 26 is an example of the display data in a case where the driver of the mobile device 10 executes such an utterance of "I want to contact someone"

toward an input unit, for example, a microphone, of the input and output unit 133 of the information processing device 100.

The driving assistance processing unit 122 of the control unit 120 of the information processing device 100 executes voice recognition of the user utterance and utterance semantic analysis processing, and interprets that the user (driver) wants to contact someone.

The driving assistance processing unit 122 outputs a message indicating the current automated driving level and whether or not "contact with someone" is available at the level, to the display unit on the basis of the analysis result.

FIG. 26 illustrates an example of the display data generated by the driving assistance processing unit 122 and displayed on the display unit.

The display data illustrated in FIG. 26 is an example in which the following message is displayed.

"Currently, the automated driving level is level 3. At level 3, the driver is allowed to perform '(1) a phone call and (2) checking and replying to an e-mail'."

For example, as illustrated in FIG. 26, the driving assistance processing unit 122 generates and outputs a message indicating whether or not the activity (=contact with someone) requested by the user is allowed.

The driver who is the user can see the display data displayed on the display unit to check that the automated driving level of the mobile device 10 is level 3, and moreover, "(1) a phone call and (2) checking and replying to an e-mail" are activities allowed for the driver at the automated driving level 3.

The user can check that "(1) a phone call and (2) checking and replying to an e-mail" are included as the allowable activities corresponding to the automated driving level 3 displayed on the display unit, and can start to make a phone call or perform checking and replying to an e-mail with a sense of security.

Note that means for providing notification of whether or not the activity (=contact with someone) requested by the user is allowed is not limited to display on the display unit, and may be notification by voice information.

Figure 27:
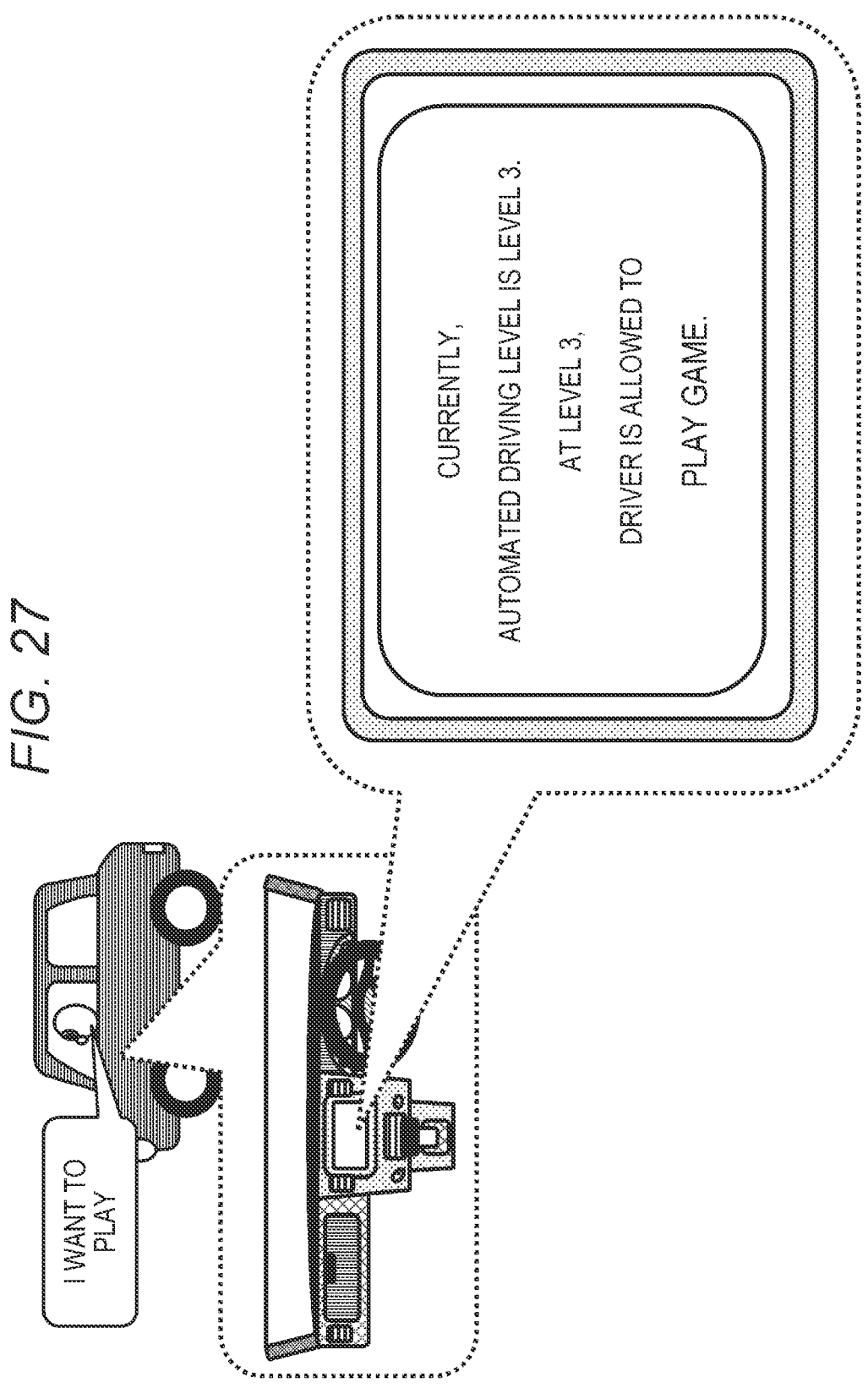
FIG. 27 is a diagram for describing an example of display data output by an information processing device of the present disclosure.

The example illustrated in FIG. 27 is an example of the display data in a case where the driver of the mobile device 10 executes such an utterance of "I want to play"

toward an input unit, for example, a microphone, of the input and output unit 133 of the information processing device 100.

The driving assistance processing unit 122 of the control unit 120 of the information processing device 100 executes voice recognition of the user utterance and utterance semantic analysis processing, and interprets that the user (driver) wants to play.

The driving assistance processing unit 122 outputs a message indicating the current automated driving level and whether or not "play" is available at the level, to the display unit on the basis of the analysis result.

FIG. 27 illustrates an example of the display data generated by the driving assistance processing unit 122 and displayed on the display unit.

The display data illustrated in FIG. 27 is an example in which the following message is displayed.

"Currently, the automated driving level is level 3. At level 3, the driver is allowed to 'play a game'."

For example, as illustrated in FIG. 26, the driving assistance processing unit 122 generates and outputs a message indicating whether or not the activity (=play) requested by the user is allowed.

The driver who is the user can see the display data displayed on the display unit to check that the automated driving level of the mobile device 10 is level 3, and moreover, "playing a game" is an activity allowed for the driver at the automated driving level 3.

The user can check that "playing a game" is included as the allowable activity corresponding to the automated driving level 3 displayed on the display unit, and can start to play a game with a sense of security.

Note that means for providing notification of whether or not the activity (=play) requested by the user is allowed is not limited to display on the display unit, and may be notification by voice information.

[9-b. (Processing Example b) Processing Example of Selecting and Providing Notification of Allowable Activity in Consideration of Duration of Automated Driving Level]

Next, as (processing example b), a processing example of selecting and providing notification of the allowable activity in consideration of the duration of the automated driving level will be described.

Even in the case of the activity allowed for the driver at the same automated driving level, it is considered that the activity allowed for the driver differs depending on the duration of the automated driving level. For example, in the case of the automated driving level 4, the activities allowed for the driver include a meal, a phone call, replying to an e-mail, reading a book, playing a game, a conference call, and a nap, but, in a case where the duration of the automated driving level 4 is short, even in a case where there is an activity allowed for the driver, the activity may not be actually performed, or safe traveling may not be performed in a case where the activity is executed.

The processing example described below solves such a problem, and is a processing example of selecting and providing notification of an allowable activity in consideration of the duration of the automated driving level.

As described above, while the mobile device 10 is traveling, the automated driving level is changed according to a travel section. However, the same level may continue for a certain period of time, for example, about one hour.

Note that how long the same automated driving level continues is acquired by the driving assistance processing unit 122 of the mobile device 10 from the outside or calculated on the basis of the acquired information.

For example, it is acquired from the control device 50 that performs automated driving management of the mobile device 10. Alternatively, it is possible to perform processing of performing calculation on the basis of the map information provided by the map information provision server 50b and the speed information of the mobile device 10.

The driving assistance processing unit 122 of the mobile device 10 changes the allowable activity and notifies the driver of the allowable activity according to the duration of the same level of the automated driving level that is acquired from the outside or calculated on the basis of the acquired information.

This is because even in a case where the automated driving level is the same level, for example, level 4, it is considered that the activity that the driver can perform differs depending on the duration of the level 4.

For example, as described in the allowable activity list associated with the automated driving level described above with reference to FIG. 8, the allowable activities in the case of the automated driving level 4 are following seven activities:

(1) a meal (2) a phone call (3) checking and replying to an e-mail (4) reading a book (5) playing a game (6) a video call (7) a nap However, for example, in a case where, in the travel section of the mobile device 10, a section in which traveling at the automated driving level 4 can be performed is short and the mobile device 10 is traveling on a road where the automated driving level is immediately changed to the level 3, among the seven activities described above, the activities that are not allowed at the automated driving level 3 have to be canceled in a case where the automated driving level is changed to the level 3.

In order to solve such a problem, the driving assistance processing unit 122 of the mobile device 10 calculates or acquires the duration of the automated driving level, and notifies the driver of a recommended activity and a non-recommended activity according to the calculated or acquired duration.

Note that the duration of one automated driving level is calculated by the control unit 120 on the basis of, for example, route information set for a destination input by the driver via the input and output unit 133 of the information processing device 100.

Furthermore, for example, in a case where there is a level change such as the automated driving level 3 and the automated driving level 4 in the route, regarding the activities allowed in both automated driving levels, for example, a meal, a phone call, replying to an e-mail, reading a book, and playing a game, the duration is calculated assuming that the duration continues after the change of the automated driving level.

Furthermore, the driver can select an activity to be actually performed from among the allowable activities of the current automated driving level, and input the selected activity to the information processing device 100. For example, the driver uses a touch panel type display constituting the input and output unit 133 to select and input an activity to be executed from among the displayed activities. The driving assistance processing unit 122 of the control unit 120 determines whether or not the selected activity is allowed on the basis of the selection information, and notifies the driver who is the user of the determination.

Furthermore, the driving assistance processing unit 122 may detect the activity selected by the driver on the basis of the information acquired by the data collection unit 121 from the sensor unit 131.

For example, imaging information of the camera that captures a moving image including the driver is analyzed using artificial intelligence (AI), and it is possible to analyze which activity the driver is executing, such as having a meal, operating a smartphone, reading a book, playing a game, or taking a nap. Furthermore, by analyzing the information obtained from the speaker or the microphone of the sensor unit 131 using AI, it is also possible to detect that the driver is executing activities such as a phone call and a conference call.

Note that the driving assistance processing unit 122 inputs the sensor information acquired by the data collection unit to a neural network model trained by a method called machine learning, deep learning, or reinforcement learning, for example, and specifies an activity being executed by the driver.

As described above, the driving assistance processing unit 122 analyzes the activity being executed by the driver, and thereby it is possible to issue a warning in a case where the driver is executing an activity that is not allowed at the automated driving level after the level transition, at the time of the transition of the automated driving level. Note that notification of the warning can be provided by a warning display on the display unit or by voice. Moreover, in a case where the driver does not end the activity that is not allowed at the changed automated driving level within a set period, the driving assistance processing unit 122 may execute emergency processing such as stopping the mobile device 10.

A specific example of the processing example of selecting and providing notification of the allowable activity in consideration of the duration of the automated driving level will be described with reference to FIG. 28 and subsequent drawings.

The driving assistance processing unit 122 notifies the driver of the non-recommended activity and the recommended activity selected according to the duration of the automated driving level in consideration of the duration of the automated driving level.

FIG. 28 is an example of the data generated by the driving assistance processing unit 122 and displayed on the display unit in a case where the driving assistance processing unit 122 determines that the automated driving level 4 continues for 2 hours from the current point of time.

The display data illustrated in FIG. 28 is the following display data.

"The current automated driving level is level 4, and the duration of level 4 in the future is scheduled to be about 2 hours. Under the conditions of level 4 and duration=2 hours, the activities allowed for the driver are as follows:

(1) a meal (2) a phone call (3) checking and replying to an e-mail (4) reading a book (5) playing a game (6) a video call (7) a nap"

For example, as illustrated in FIG. 28, the driving assistance processing unit 122 provides notification of the information of the current automated driving level (level 4) and the duration (about 2 hours) of the same level 4 in the future, and selects and displays the allowable activity considered to be sufficient for the user (driver) to execute under the conditions of level 4 and duration=2 hours.

In the example illustrated in FIG. 28, since the duration of the current automated driving level (level 4) is as long as about 2 hours, all the allowable activities corresponding to the automated driving level 4 recorded in the allowable activity list associated with the automated driving level are displayed.

The driver who is the user can see the display data displayed on the display unit to check that the automated driving level of the mobile device 10 is level 4 and the automated driving at level 4 is to be performed for about 2 hours in the future, and moreover, there are activities of (1) to (7) as the activities allowed for the driver at the automated driving level 4.

The user can check the allowable activities corresponding to the automated driving level 4 displayed on the display unit, and act in an effort to perform an action within a range of the displayed allowable activities.

Note that means for notifying the driver of the recommended activity and the non-recommended activity selected according to the duration of the automated driving level is not limited to display on the display unit, and may be notification by voice information.

Next, an example of the display data in a case where the duration of the current automated driving level (level 4) is short will be described.

Figure 29:
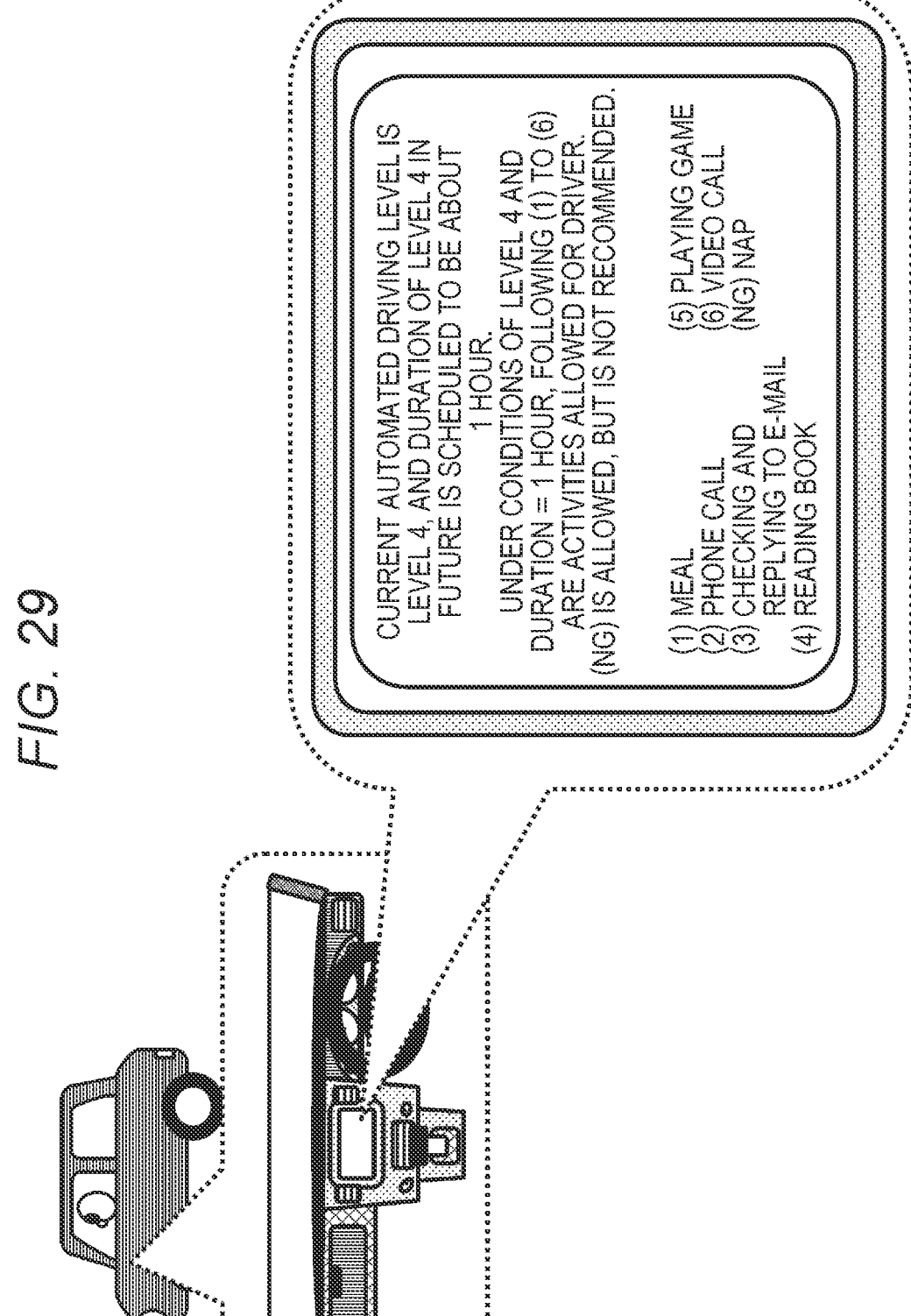
FIG. 29 is a diagram for describing an example of display data output by an information processing device of the present disclosure.

FIG. 29 is an example of the data generated by the driving assistance processing unit 122 and displayed on the display unit in a case where the driving assistance processing unit 122 determines that the automated driving level 4 continues for 1 hour from the current point of time.

The display data illustrated in FIG. 29 is the following display data.

"The current automated driving level is level 4, and the duration of level 4 in the future is scheduled to be about 1 hour. Under the conditions of level 4 and duration=1 hour, following (1) to (6) are the activities allowed for the driver. (NG) is allowed, but is not recommended.

(1) a meal
(2) a phone call
(3) checking and replying to an e-mail
(4) reading a book
(5) playing a game
(6) a video call
(NG) a nap"

For example, as illustrated in FIG. 29, the driving assistance processing unit 122 provides notification of the information of the current automated driving level (level 4) and the duration (about 1 hour) of the same level 4 in the future, and displays, in a distinguishable manner, the allowable activities (1) to (6) considered to be sufficient for the user (driver) to execute and an activity (NG) that is allowed but is not recommended, under the conditions of level 4 and duration=1 hour.

That is, the allowable activities (1) to (6) are displayed as the recommended activities, and the activity (NG) is displayed as the non-recommended activity.

Note that, in the example illustrated in FIG. 29, an example is illustrated in which the non-recommended activity for the driver is set to (NG), but for example, a cross mark (X) is also displayed in addition to (NG). Alternatively, various notations that allow the driver to recognize the non-recommended activity, such as setting in which a mark including a red circle and an oblique line, which are marks generally indicating prohibition, are written together, are possible.

In the example illustrated in FIG. 29, the duration of the current automated driving level (level 4) is about 1 hour, and
(1) a meal
(2) a phone call
(3) checking and replying to an e-mail
(4) reading a book
(5) playing a game
(6) a video call
Notification of these six activities is provided as the recommended allowable activities.

On the other hand,
(NG) a nap
The activity is displayed as an activity (NG) that is allowed but is not recommended, in a distinguishable manner.

The driver who is the user can see the display data displayed on the display unit to check that the automated driving level of the mobile device 10 is level 4 and the automated driving at level 4 is to be performed for about 1 hour in the future, and moreover, there are activities of (1) to (6) and (NG) as the activities allowed for the driver at the automated driving level 4, and (NG) a nap is an activity that is allowed but is not recommended.

The user can check the allowable activity corresponding to the automated driving level 4 displayed on the display unit and the activity that is not recommended, and can act in an effort to perform an action within a range of the activities of (1) to (6) excluding (NG) from among the displayed allowable activities (1) to (6) and (NG).

Note that means for notifying the driver of the recommended activity and the non-recommended activity selected according to the duration of the automated driving level is not limited to display on the display unit, and may be notification by voice information.

FIG. 30 is an example of the data generated by the driving assistance processing unit 122 and displayed on the display unit in a case where the driving assistance processing unit 122 determines that the automated driving level 4 continues for 30 minutes from the current point of time.

The display data illustrated in FIG. 30 is the following display data.

"The current automated driving level is level 4, and the duration of level 4 in the future is scheduled to be about 30 minutes. Under the conditions of level 4 and duration=30 minutes, following (2) and (3) are the activities allowed for the driver. (NG) is allowed, but is not recommended.

(NG) a meal
(2) a phone call
(3) checking and replying to an e-mail
(NG) reading a book
(NG) playing a game
(NG) a video call
(NG) a nap"

For example, as illustrated in FIG. 30, the driving assistance processing unit 122 provides notification of the information of the current automated driving level (level 4) and the duration (about 30 minutes) of the same level 4 in the future, and displays, in a distinguishable manner, the allowable activities (2) and (3) considered to be sufficient for the user (driver) to execute as the recommended activities and the activity (NG) that is allowed but is not recommended as the non-recommended activity, under the conditions of level 4 and duration=minutes.

In the example illustrated in FIG. 30, the duration of the current automated driving level (level 4) is about minutes, and (2) a phone call (3) checking and replying to an e-mail Notification of these two activities is provided as the recommended allowable activities.

On the other hand, (NG) a meal (NG) reading a book (NG) playing a game (NG) a video call (NG) a nap These activities are displayed as the activities (NG) that are allowed but are not recommended, in a distinguishable manner.

Note that, also in FIG. 30, the non-recommended activity for the driver is set to (NG), but similar to FIG. 29 described above, for example, a cross mark (X) is also displayed in addition to (NG). Alternatively, various notations that allow the driver to recognize the non-recommended activity, such as setting in which a mark including a red circle and an oblique line, which are marks generally indicating prohibition, are written together, are possible.

The driver who is the user can see the display data displayed on the display unit to check that the automated driving level of the mobile device 10 is level 4 and the automated driving at level 4 is to be performed for about minutes in the future, and moreover, there are activities of (2), (3), and (NG) as the activities allowed for the driver at the automated driving level 4, and the activities of (NG) are activities that are allowed but are not recommended.

The user can check the allowable activity corresponding to the automated driving level 4 displayed on the display unit and the activity that is not recommended, and can act in an effort to perform an action within a range of the activity of (2) or (3) excluding (NG) from among the displayed allowable activities (2), (3), and (NG).

Note that means for notifying the driver of the recommended activity and the non-recommended activity selected according to the duration of the automated driving level is not limited to display on the display unit, and may be notification by voice information.

[10. Regarding Hardware Configuration Example of Information Processing Device of Present Disclosure]

Next, a specific hardware configuration example of the information processing device of the present disclosure will be described with reference to FIG. 31.

Figure 31:
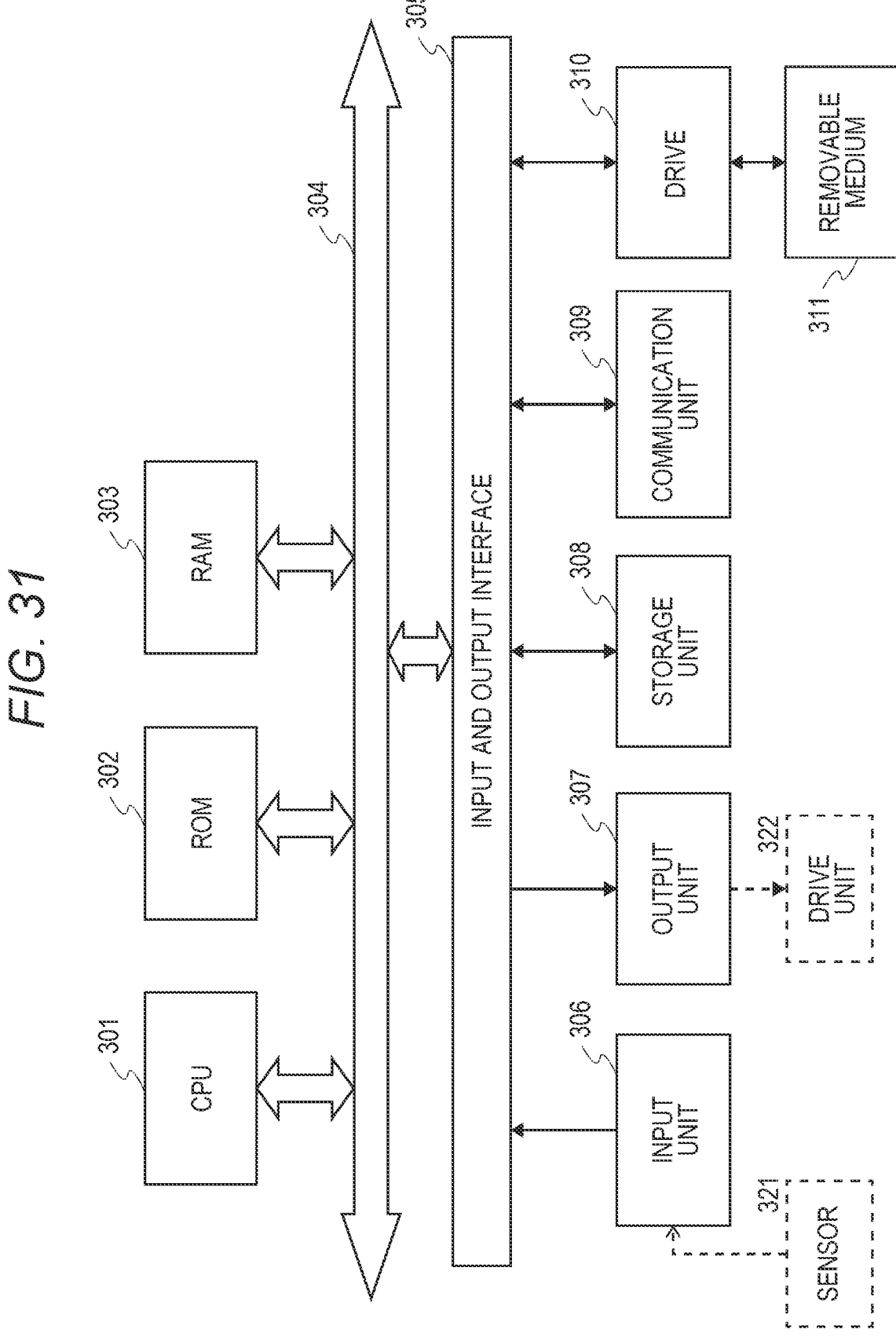
FIG. 31 is a diagram for describing a hardware configuration example of an information processing device of the present disclosure.

FIG. 31 is a diagram illustrating an example of a hardware configuration of the information processing device 100 of the present disclosure described above with reference to FIG. 5.

Hereinafter, each component of the hardware configuration illustrated in FIG. 31 will be described.

A central processing unit (CPU) 301 functions as a data processing unit that executes various kinds of processing according to a program stored in a read only memory (ROM) 302 or a storage unit 308. For example, the processing according to the sequence described in the above-described embodiments is executed. A random access memory (RAM) 303 stores programs executed by the CPU 301, data, and the like. These CPU 301, ROM 302, and RAM 303 are connected to each other by a bus 304.

The CPU 301 is connected to an input and output interface 305 via the bus 304, and an input unit 306 including various switches, a keyboard, a touch panel, a mouse, a microphone, and moreover, a status data acquisition unit such as a sensor, a camera, and a GPS, and an output unit 307 including a display, a speaker, and the like are connected to the input and output interface 305.

Note that, input information from a sensor 321 is also input to the input unit 306.

Furthermore, the output unit 307 also outputs drive information for a drive unit 322 of the mobile device.

The CPU 301 inputs a command, status data, and the like input from the input unit 306, executes various kinds of processing, and outputs the processing result to, for example, the output unit 307.

The storage unit 308 connected to the input and output interface 305 includes, for example, a hard disk or the like, and stores programs executed by the CPU 301 and various kinds of data. A communication unit 309 functions as a transmission and reception unit for data communication via a network such as the Internet, a local area network, and a wide area network, and communicates with an external device.

Furthermore, a graphics processing unit (GPU) may be provided in addition to or instead of the CPU. For example, the GPU processes image information input from the camera. That is, the CPU or the GPU can be selectively used according to the input information to be handled and the data processing executed according to the program.

A drive 310 connected to the input and output interface 305 drives a removable medium 311 such as a magnetic disk, an optical disk, a magneto-optical disk, or a semiconductor memory such as a memory card, and executes recording or reading of data.

[11. Summary of Configuration of Present Disclosure]

The embodiments of the present disclosure have been described above in detail with reference to the specific embodiments. However, it is obvious that those skilled in the art can modify or substitute the embodiments without departing from the scope of the present disclosure. That is, the present invention has been disclosed in the form of exemplification and should not be limitedly interpreted. In order to determine the scope of the present disclosure, the claims should be taken into consideration.

Note that, the technology disclosed in this specification can have the following configurations.

(1) An information processing device including a control unit that acquires an automated driving level of automated driving being executed by a mobile device, and notifies a driver of an allowable activity for the driver according to the acquired automated driving level.

(2) The information processing device described in (1), in which the control unit executes at least any processing of processing of displaying the allowable activity on a display unit or processing of outputting voice.

(3) The information processing device described in (1) or (2), in which the control unit refers to an automated driving level-corresponding allowable activity list in which the automated driving level and the allowable activity are associated with each other, acquires the allowable activity corresponding to the automated driving level being executed by the mobile device, and notifies the driver of the acquired allowable activity.

(4) The information processing device described in any one of (1) to (3), in which the control unit acquires an automated driving level-corresponding allowable activity list in which the automated driving level and the allowable activity are associated with each other from an external server or a storage unit, refers to the acquired automated driving level-corresponding allowable activity list, acquires the allowable activity corresponding to the automated driving level being executed by the mobile device, and notifies the driver of the acquired allowable activity.

(5) The information processing device described in any one of (1) to (4), in which in a case where the automated driving level of the mobile device is changed, the control unit analyzes a difference between the allowable activities according to the change of the automated driving level, and in a case where there is a difference, the control unit notifies the driver of difference information.

(6) The information processing device described in (5), in which the control unit generates display data in which the difference information is displayed in an emphasized manner, and outputs the display data on a display unit.

(7) The information processing device described in (5) or (6), in which in a case where the automated driving level of the mobile device is decreased, the control unit generates display data in which the allowable activity deleted due to a level decrease of the automated driving level is displayed in an emphasized manner, and outputs the display data on a display unit.

(8) The information processing device described in any one of (1) to (7), in which the control unit analyzes presence or absence of a check response from the driver for the allowable activity notification of which is provided, and executes emergency response processing in a case where there is no check response.

(9) The information processing device described in (8), in which the emergency response processing is processing of stopping the mobile device.

(10) The information processing device described in any one of (1) to (9), in which the control unit estimates an activity executed by the driver on the basis of sensor detection information, determines whether or not the estimated activity executed by the driver is the allowable activity of the driver according to the automated driving level of the mobile device, and executes emergency response processing in a case where the estimated activity executed by the driver is not the allowable activity of the driver according to the automated driving level of the mobile device.

(11) The information processing device described in (10), in which the emergency response processing is processing of stopping the mobile device.

(12) The information processing device described in any one of (1) to (11), in which the control unit specifies the automated driving level being executed by the mobile device on the basis of information acquired from at least any one of a storage unit or a sensor of the mobile device, an external server, a base station, or a roadside communication unit.

(13) The information processing device described in any one of (1) to (12), in which the control unit specifies the automated driving level being executed by the mobile device on the basis of automated driving allowable level information for each road section registered in map information acquired from a map information provision server.

(14) The information processing device described in any one of (1) to (13), in which the control unit executes processing of notifying the driver whether or not an action according to a request from the driver of the mobile device is the allowable activity corresponding to the automated driving level being executed by the mobile device.

(15) The information processing device described in any one of (1) to (14), in which the control unit calculates or acquires duration for which the automated driving level of the mobile device is the same level, determines a non-recommended activity according to the calculated or acquired duration, and notifies the driver of the determined non-recommended activity.

(16) The information processing device described in any one of (1) to (15), in which the control unit calculates or acquires duration for which the automated driving level of the mobile device is the same level, and notifies the driver of a recommended activity and a non-recommended activity according to the calculated or acquired duration.

(17) An information processing system including: a mobile device; and a control device, in which the mobile device acquires an automated driving level of automated driving being executed by the mobile device, the control device provides an automated driving level-corresponding allowable activity list in which an automated driving level and an allowable activity are associated with each other, to the mobile device, and the mobile device refers to the automated driving level-corresponding allowable activity list, acquires the allowable activity corresponding to the automated driving level being executed by the mobile device, and notifies the driver of the acquired allowable activity.

(18) The information processing system described in (17), in which the mobile device acquires the automated driving level of the automated driving being executed by the mobile device, from the control device.

(19) An information processing method executed in an information processing device, in which a control unit acquires an automated driving level of automated driving being executed by a mobile device, and notifies a driver of an allowable activity for the driver according to the acquired automated driving level.

(20) A program causing an information processing device to execute information processing, the program causing a control unit to:

acquire an automated driving level of automated driving being executed by a mobile device, and notify a driver of an allowable activity for the driver according to the acquired automated driving level.

Furthermore, the series of processing described in the specification can be executed by hardware, software, or a combined configuration of hardware and software. In a case of executing the processing by software, the program in which the processing sequence is recorded can be executed by being installed in the memory in the computer incorporated in the dedicated hardware, or the program can be executed by being installed in a general-purpose computer capable of executing various kinds of processing. For example, the program can be recorded in a recording medium in advance. In addition to the installing of the program in the computer from the recording medium, the program can be installed in the recording medium such as a built-in hard disk by being received via a network such as a local area network (LAN), the Internet, or a wide area network (WAN) including cellular.

Note that, the various kinds of processing described in the specification may be executed not only in time series according to the description but also in parallel or individually according to the processing capability of the device that executes the processing or as needed. Furthermore, in the present specification, the system is a logical set configuration of a plurality of devices, and is not limited to a system in which the devices of the respective configurations are in the same housing.

INDUSTRIAL APPLICABILITY

As described above, according to the configuration of one embodiment of the present disclosure, a configuration for notifying the driver of the allowable activity for the driver according to the automated driving level is realized.

Specifically, for example, the automated driving level of the automated driving being executed by the mobile device is acquired, and the driver is notified of the allowable activity for the driver according to the acquired automated driving level. The control unit acquires the automated driving level-corresponding allowable activity list in which the automated driving level and the allowable activity are associated with each other from an external server or the storage unit, refers to the automated driving level-corresponding allowable activity list, acquires the allowable activity corresponding to the automated driving level, and notifies the driver of the acquired allowable activity. Furthermore, in a case where the automated driving level of the mobile device is changed, a difference between the allowable activities according to the change of the automated driving level is analyzed, and in a case where there is a difference, notification of difference information is provided.

With the present configuration, a configuration for notifying the driver of the allowable activity for the driver according to the automated driving level is realized.

REFERENCE SIGNS LIST

10 Mobile device
20 Roadside communication unit (RSU)
30 Base station
40 Communication network
50 Control device
50b Map information provision server
70 Information processing system
100 Information processing device
110 Communication unit
111 Reception unit
112 Transmission unit
120 Control unit
121 Data collection unit
122 Driving assistance processing unit 123 Determination unit
124 Communication control unit
131 Sensor unit
132 Storage unit
133 Input and output unit
151 Position information sensor
152 Camera module
153 LiDAR
154 Radar
155 Sensor
156 Driver monitoring sensor
201 Check button
301 CPU
302 ROM
303 RAM
304 Bus
305 Input and output interface
306 Input unit
307 Output unit
308 Storage unit
309 Communication unit
310 Drive
311 Removable medium
321 Sensor
322 Drive unit

The invention claimed is:

1. An information processing device, comprising:
a control unit configured to:
    acquire a first automated driving level of an automated driving process executed by a mobile device, wherein
        the first automated driving level corresponds to a first set of allowable activities associated with a driver of the mobile device;
    control output of a first notification to the driver based on the acquired first automated driving level, wherein the first notification indicates the first set of allowable activities;
    detect a change of the first automated driving level to a second automated driving level, wherein
        the second automated driving level corresponds to a second set of allowable activities different from the first set of allowable activities;
    determine a difference between the first set of allowable activities and the second set of allowable activities based on the change of the first automated driving level to the second automated driving level; and
    control output of a second notification, to the driver, based on the difference.

2. The information processing device according to claim 1, wherein the control unit is further configured to control one of
    a display unit to display the first set of allowable activities, or
    a voice output unit to output voice associated with the first set of allowable activities.

3. The information processing device according to claim 1, wherein
    the control unit is further configured to acquire the first set of allowable activities based on an automated driving level-corresponding allowable activity list,
    the automated driving level-corresponding allowable activity list includes a plurality of automated driving levels and a plurality of allowable activities,
    the plurality of automated driving levels includes the first automated driving level and the second automated driving level, the plurality of allowable activities includes the first set of allowable activities and the second set of allowable activities, and each of the plurality of automated driving levels corresponds to a respective set of allowable activities of the plurality of allowable activities.

4. The information processing device according to claim 3, wherein the control unit is further configured to:

acquire, from one of an external server or a storage unit, the first set of allowable activities based on the automated driving level-corresponding allowable activity list; and control the output of the first notification to the driver based on the acquired first set of allowable activities.

5. The information processing device according to claim 1, wherein the control unit is further configured to:

generate display data that includes the difference information; and control a display unit to output the display data.

6. The information processing device according to claim 1, wherein the control unit is further configured to:

determine difference information based on the difference between the first set of allowable activities and the second set of allowable activities;

detect a decrement of the first automated driving level to a third automated driving level;

delete, based on the decrement, a specific allowable activity from the first set of allowable activities;

generate display data that indicates the deletion of the specific allowable activity from the first set of allowable activities; and control a display unit to output the display data.

7. The information processing device according to claim 1, wherein the control unit is further configured to:

determine, based on the first notification, one of a presence of a check response from the driver or an absence of the check response from the driver; and execute an emergency response process based on the absence of the check response from the driver.

8. The information processing device according to claim 7, wherein the control unit is further configured to stop the mobile device in the emergency response process.

9. The information processing device according to claim 1, wherein the control unit is further configured to:

determine an activity of the driver based on sensor detection information;

determine the determined activity of the driver is different from the first set of allowable activities; and execute an emergency response process based on the determination that the determined activity of the driver is different from the first set of allowable activities.

10. The information processing device according to claim 9, wherein the control unit is further configured to stop the mobile device in the emergency response process.

11. The information processing device according to claim 1, wherein the control unit is further configured to:

acquire specific information from at least one of a storage unit, a sensor of the mobile device, an external server, a base station, or a roadside communication unit; and specify the first automated driving level based on the acquired specific information.

12. The information processing device according to claim 1, wherein the control unit is further configured to:

acquire map information from a map information provision server:

determine, based on the map information, automated driving allowable level information for each road section of a plurality of road sections; and specify the first automated driving level based on the automated driving allowable level information.

13. The information processing device according to claim 1, wherein the control unit is further configured to:

acquire, from the driver, a request that indicates a specific action; and control output of a third notification to the driver, wherein the third notification indicates one of the specific action corresponds to an allowable activity of the first set of allowable activities, or the specific action is different from the first set of allowable activities.

14. The information processing device according to claim 1, wherein the control unit is further configured to:

determine a duration for which the mobile device executes the first automated driving level;

determine a non-recommended activity based on the determined duration; and control output of a third notification, to the driver, that indicates the determined non-recommended activity.

15. The information processing device according to claim 1, wherein the control unit is further configured to:

determine a duration for which the mobile device executes the first automated driving level;

determine at least one of a recommended activity or a non-recommended activity based on the determined duration; and control output of a third notification, to the driver, that indicates the at least one of the recommended activity or the non-recommended activity.

16. An information processing system, comprising:

a mobile device configured to:

execute an automated driving process; and acquire a first automated driving level of the automated driving process; and a control device configured to:

provide an automated driving level-corresponding allowable activity list to the mobile device, wherein the automated driving level-corresponding allowable activity list includes a plurality of automated driving levels and a plurality of allowable activities;

acquire a first set of allowable activities of the plurality of allowable activities corresponding to the first automated driving level of the mobile device, wherein the first set of allowable activities is associated with a driver of the mobile device, and the plurality of automated driving levels includes the first automated driving level; and control output of a first notification to the driver based on the acquired first automated driving level, wherein the first notification indicates the first set of allowable activities;

detect a change of the first automated driving level to a second automated driving level of the plurality of automated driving levels, wherein the second automated driving level corresponds to a second set of allowable activities of the plurality of allowable activities, and the second set of allowable activities is different from the first set of allowable activities;

determine a difference between the first set of allowable activities and the second set of allowable activities based on the change of the first automated driving level to the second automated driving level; and control output of a second notification, to the driver, based on the difference.

17. The information processing system according to claim 16, wherein the mobile device is further configured to acquire the first automated driving level from the control device.

18. An information processing method comprising:

in an information processing device:

acquiring a first automated driving level of an auto-mated driving process executed by a mobile device, wherein the first automated driving level corresponds to a first set of allowable activities associated with a driver of the mobile device:

controlling output of a first notification to the driver based on the acquired first automated driving level, wherein the first notification indicates the first set of allowable activities;

detecting a change of the first automated driving level to a second automated driving level, wherein the second automated driving level corresponds to a second set of allowable activities different from the first set of allowable activities;

determining a difference between the first set of allow-able activities and the second set of allowable activi-ties based on the change of the first automated driving level to the second automated driving level; and controlling output of a second notification, to the driver, based on the difference.

\* \* \* \* \*